(12) United States Patent
Bhargava et al.

(10) Patent No.: US 10,952,254 B2
(45) Date of Patent: *Mar. 16, 2021

(54) NETWORK ROUTING SYSTEM, METHOD, AND COMPUTER PROGRAM PRODUCT

(71) Applicant: Board of Regents, The University of Texas System, Austin, TX (US)

(72) Inventors: Vidur Bhargava, Austin, TX (US); Sriram Vishwanath, Austin, TX (US); Jubin Jose, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/899,352

(22) Filed: Jun. 11, 2020

(65) Prior Publication Data
US 2020/0305194 A1    Sep. 24, 2020

Related U.S. Application Data

(63) Continuation of application No. 16/728,878, filed on Dec. 27, 2019, which is a continuation of application
(Continued)

(51) Int. Cl.
*H04B 7/14*    (2006.01)
*H04J 1/10*    (2006.01)
(Continued)

(52) U.S. Cl.
CPC ....... *H04W 74/0816* (2013.01); *H04W 40/12* (2013.01); *H04W 40/22* (2013.01);
(Continued)

(58) Field of Classification Search
CPC ............. H04W 16/14; H04W 52/0238; H04W 52/243; H04W 88/04; H04W 88/06;
(Continued)

(56) References Cited

U.S. PATENT DOCUMENTS 6,680,907 B1   1/2004   Bonaventure
6,980,537 B1  12/2005   Liu
(Continued)

FOREIGN PATENT DOCUMENTS

CN        1897758      1/2007
DE     10309228 A1     9/2004
(Continued)

OTHER PUBLICATIONS

Non-Final Office Action in related U.S. Appl. No. 15/223,761 dated Jan. 29, 2018 (19 pages).
(Continued)

*Primary Examiner* — Joseph Arevalo
(74) *Attorney, Agent, or Firm* — Pillsbury Winthrop Shaw Pittman, LLP

(57) ABSTRACT

A method, system, or computer program product to enhance the performance of multi-hop cellular networks or other wireless networks is provided. A wireless device (e.g., cellular telephone) is able to communicate with a base-station in a cell of the cellular network over a non-cellular interface via another wireless device in the cell through the use of multi-hopping. By enabling wireless devices to communicate with a base station in such a manner, the effective coverage area of the cellular network is expanded and the effective capacity of the cellular network is improved. Distributed routing, device management, adaptive scheduling, and distributed algorithms can be used to enhance the overall performance of multi-hop cellular networks.

24 Claims, 21 Drawing Sheets

Related U.S. Application Data

No. 16/235,890, filed on Dec. 28, 2018, now Pat. No. 10,568,139, which is a continuation of application No. 15/913,238, filed on Mar. 6, 2018, now Pat. No. 10,206,228, which is a continuation of application No. 15/399,168, filed on Jan. 5, 2017, now Pat. No. 9,942,921, which is a continuation of application No. 14/020,511, filed on Sep. 6, 2013, now Pat. No. 9,578,591, which is a continuation of application No. PCT/US2012/028571, filed on Mar. 9, 2012, which is a continuation-in-part of application No. PCT/US2011/045967, filed on Jul. 29, 2011, and a continuation-in-part of application No. PCT/US2011/039180, filed on Jun. 3, 2011.

(60) Provisional application No. 61/451,039, filed on Mar. 9, 2011.

(51) Int. Cl.

| | | |
|---|---|---|
| *H04J 3/08* | (2006.01) | |
| *H04W 74/08* | (2009.01) | |
| *H04W 40/12* | (2009.01) | |
| *H04W 40/22* | (2009.01) | |
| *H04W 74/02* | (2009.01) | |
| *H04W 80/06* | (2009.01) | |

(52) U.S. Cl.
CPC ............ *H04W 74/02* (2013.01); *H04W 80/06* (2013.01); *Y02D 30/70* (2020.08)

(58) Field of Classification Search
CPC ............... H04W 28/021; H04W 48/20; H04W 52/0209; H04W 52/245; H04W 52/343; H04W 52/46; H04W 72/085; H04W 74/0816; H04W 84/047; H04W 84/18; H04W 40/22; H04W 76/14; H04W 92/20
USPC .... 455/422.1, 10, 11.1, 450, 414.1, 68, 101, 455/7; 370/315, 329, 252
See application file for complete search history.

(56) References Cited

U.S. PATENT DOCUMENTS

| | | | |
|---|---|---|---|
| 7,639,663 | B1 | 12/2009 | Nerses et al. |
| 7,742,497 | B2 | 6/2010 | Ganti et al. |
| 7,746,827 | B2 | 6/2010 | Xue et al. |
| 7,969,910 | B2 | 6/2011 | Barak et al. |
| 8,018,893 | B2 | 9/2011 | Sartori et al. |
| 8,224,236 | B2 | 7/2012 | Sukiasyan |
| 8,284,721 | B2 * | 10/2012 | Chen ............... H04B 1/406 370/329 |
| 8,437,286 | B2 | 5/2013 | Cai et al. |
| 8,478,283 | B2 * | 7/2013 | Periyalwar ........... H04B 1/715 455/452.1 |
| 8,520,630 | B2 | 8/2013 | Ergen et al. |
| 8,737,912 | B2 | 5/2014 | Ma |
| 8,743,758 | B1 | 6/2014 | Bhargava et al. |
| 8,908,609 | B1 | 12/2014 | Naden et al. |
| 9,072,039 | B2 | 6/2015 | Hu |
| 9,148,908 | B2 | 9/2015 | Bhargava et al. |
| 9,155,124 | B2 | 10/2015 | Bhargava et al. |
| 9,363,006 | B2 | 6/2016 | Bhargava et al. |
| 9,369,943 | B2 | 6/2016 | Li |
| 9,414,434 | B2 | 8/2016 | Bhargava et al. |
| 9,451,514 | B1 | 9/2016 | Michel et al. |
| 9,578,591 | B2 | 2/2017 | Bhargava et al. |
| 9,794,949 | B2 | 10/2017 | Bhargava et al. |
| 9,806,791 | B2 | 10/2017 | Bhargava et al. |
| 9,942,921 | B2 | 4/2018 | Bhargava et al. |
| 9,986,480 | B2 | 5/2018 | Ta et al. |
| 10,123,268 | B2 | 11/2018 | Bhargava et al. |
| 10,136,311 | B2 | 11/2018 | Bhargava et al. |
| 10,205,505 | B2 | 2/2019 | Michel et al. |
| 10,206,228 | B2 | 2/2019 | Bhargava et al. |
| 10,292,019 | B2 | 5/2019 | Ta et al. |
| 10,333,612 | B2 | 6/2019 | Bhargava et al. |
| 10,517,027 | B2 | 12/2019 | Ta et al. |
| 10,568,139 | B2 | 2/2020 | Bhargava et al. |
| 10,575,170 | B2 | 2/2020 | Bhargava et al. |
| 2002/0042274 | A1 | 4/2002 | Ades |
| 2002/0058502 | A1 | 5/2002 | Stanforth |
| 2002/0077104 | A1 | 6/2002 | Chen et al. |
| 2002/0136183 | A1 | 9/2002 | Chen et al. |
| 2004/0023652 | A1 | 2/2004 | Shah et al. |
| 2004/0192288 | A1 | 9/2004 | Vishwanath |
| 2004/0196871 | A1 | 10/2004 | Terry |
| 2004/0258092 | A1 | 12/2004 | Sugaya |
| 2005/0002364 | A1 | 1/2005 | Ozer et al. |
| 2005/0068229 | A1 | 3/2005 | Moilanen |
| 2005/0148315 | A1 | 7/2005 | Sawada |
| 2005/0163144 | A1 | 7/2005 | Srikrishna |
| 2005/0239491 | A1 | 10/2005 | Feder et al. |
| 2006/0002296 | A1 | 1/2006 | Choi |
| 2006/0052099 | A1 | 3/2006 | Parker |
| 2006/0133338 | A1 | 6/2006 | Reznik |
| 2006/0159053 | A1 | 7/2006 | Donovan |
| 2006/0221999 | A1 | 10/2006 | Bachrach et al. |
| 2007/0010196 | A1 * | 1/2007 | Periyalwar ........... H04B 7/0452 455/7 |
| 2007/0015461 | A1 | 1/2007 | Park et al. |
| 2007/0038743 | A1 | 2/2007 | Hellhake |
| 2007/0087756 | A1 | 4/2007 | Hoffberg |
| 2007/0189256 | A1 | 8/2007 | Oh et al. |
| 2007/0206551 | A1 | 9/2007 | Moorti |
| 2007/0238480 | A1 | 10/2007 | Lin et al. |
| 2007/0248038 | A1 | 10/2007 | Yamasaki |
| 2007/0264932 | A1 | 11/2007 | Suh et al. |
| 2007/0280172 | A1 | 12/2007 | Tan et al. |
| 2007/0280188 | A1 | 12/2007 | Kang |
| 2007/0291715 | A1 | 12/2007 | Laroia et al. |
| 2008/0031197 | A1 | 2/2008 | Wang et al. |
| 2008/0043711 | A1 | 2/2008 | Hart |
| 2008/0070510 | A1 | 3/2008 | Doppler |
| 2008/0080436 | A1 | 4/2008 | Sandhu |
| 2008/0108369 | A1 | 5/2008 | Visotsky et al. |
| 2008/0165748 | A1 | 7/2008 | Visotsky et al. |
| 2008/0170699 | A1 | 7/2008 | Fratti et al. |
| 2008/0186900 | A1 | 8/2008 | Chang et al. |
| 2008/0188177 | A1 | 8/2008 | Tan et al. |
| 2008/0222250 | A1 | 9/2008 | Datta |
| 2008/0239977 | A1 | 10/2008 | Xue et al. |
| 2008/0260000 | A1 | 10/2008 | Periyalwar et al. |
| 2008/0285495 | A1 | 11/2008 | Wentink et al. |
| 2008/0285500 | A1 | 11/2008 | Zhang |
| 2008/0304555 | A1 | 12/2008 | Larsson |
| 2009/0003216 | A1 | 1/2009 | Radunovic |
| 2009/0034458 | A1 | 2/2009 | Horn |
| 2009/0059949 | A1 | 3/2009 | Singh et al. |
| 2009/0073916 | A1 | 3/2009 | Zhang et al. |
| 2009/0075587 | A1 | 3/2009 | Yu et al. |
| 2009/0088070 | A1 | 4/2009 | Aaron |
| 2009/0168703 | A1 | 7/2009 | Pandey et al. |
| 2009/0175214 | A1 | 7/2009 | Sfar |
| 2009/0196177 | A1 | 8/2009 | Teyeb |
| 2009/0213815 | A1 | 8/2009 | Sherman et al. |
| 2009/0247214 | A1 | 10/2009 | Cai |
| 2009/0252065 | A1 | 10/2009 | Zhang et al. |
| 2009/0260000 | A1 | 10/2009 | Periyalwar |
| 2009/0285178 | A1 | 11/2009 | Chin et al. |
| 2009/0296602 | A1 | 12/2009 | Bange et al. |
| 2009/0310572 | A1 | 12/2009 | Wang et al. |
| 2009/0323652 | A1 | 12/2009 | Chen et al. |
| 2009/0325479 | A1 * | 12/2009 | Chakrabarti .......... H04W 76/14 455/7 |
| 2010/0022261 | A1 | 1/2010 | Meier et al. |
| 2010/0103862 | A1 | 4/2010 | Ulupinar et al. |
| 2010/0103869 | A1 * | 4/2010 | Naden .................. H04W 92/20 370/328 |
| 2010/0121974 | A1 | 5/2010 | Einarsson |
| 2010/0124200 | A1 | 5/2010 | Ergen et al. |
| 2010/0128701 | A1 | 5/2010 | Nagendra |

(56) References Cited

U.S. PATENT DOCUMENTS

| | | | |
|---|---|---|---|
| 2010/0142448 | A1 | 6/2010 | Schlicht |
| 2010/0159936 | A1 | 6/2010 | Brisebois et al. |
| 2010/0265842 | A1 | 10/2010 | Khandekar |
| 2010/0267344 | A1 | 10/2010 | Guner et al. |
| 2010/0278110 | A1 | 11/2010 | Ozawa |
| 2010/0323614 | A1 | 12/2010 | Yu et al. |
| 2011/0228749 | A1 | 9/2011 | Taghavi |
| 2011/0261708 | A1 | 10/2011 | Grandhi |
| 2011/0261709 | A1 | 10/2011 | Barghi et al. |
| 2011/0317633 | A1 | 12/2011 | Tan et al. |
| 2012/0083203 | A1 | 4/2012 | Truong |
| 2012/0106428 | A1 | 5/2012 | Schlicht |
| 2012/0127937 | A1 | 5/2012 | Singh et al. |
| 2012/0164948 | A1 | 6/2012 | Narasimha et al. |
| 2012/0195226 | A1 | 8/2012 | Liu |
| 2012/0322362 | A1 | 12/2012 | Coon |
| 2013/0039262 | A1 | 2/2013 | Lim |
| 2013/0040558 | A1 | 2/2013 | Kazmi |
| 2013/0059585 | A1 | 3/2013 | Giloh |
| 2013/0083722 | A1 | 4/2013 | Bhargava |
| 2013/0163440 | A1 | 6/2013 | Issakov |
| 2013/0295921 | A1 | 11/2013 | Bhargava et al. |
| 2013/0335528 | A1 | 12/2013 | Vishwanath et al. |
| 2014/0171062 | A1* | 6/2014 | Fallgren .............. H04W 40/22 455/422.1 |
| 2014/0220970 | A1 | 8/2014 | Yang |
| 2015/0237556 | A1 | 8/2015 | Giloh |
| 2015/0334629 | A1 | 11/2015 | Patil |
| 2016/0315688 | A1 | 10/2016 | Bhargava et al. |
| 2016/0337971 | A1 | 11/2016 | Bhargava |
| 2018/0014311 | A1 | 1/2018 | Bhargava et al. |
| 2019/0253844 | A1 | 8/2019 | Ta et al. |
| 2020/0145493 | A1 | 5/2020 | Wang |

FOREIGN PATENT DOCUMENTS

| | | | |
|---|---|---|---|
| EP | 986218 | A1 | 3/2000 |
| EP | 1742425 | A2 | 1/2007 |
| EP | 1744502 | A1 | 1/2007 |
| EP | 2157806 | A1 | 2/2010 |
| EP | 2192699 | A1 | 6/2010 |
| JP | 2001298391 | A | 10/2001 |
| JP | 2008022558 | A | 1/2008 |
| JP | 2008199131 | A | 8/2008 |
| JP | 2009512389 | A | 3/2009 |
| WO | 03/085891 | A1 | 10/2003 |
| WO | 2003085891 | A1 | 10/2003 |
| WO | 2004068742 | A1 | 8/2004 |
| WO | 2008124987 | A1 | 10/2008 |
| WO | 2009031184 | A1 | 3/2009 |
| WO | 2009031282 | A1 | 3/2009 |
| WO | 2011153507 | A2 | 12/2011 |
| WO | 2012016187 | A2 | 2/2012 |
| WO | 2012122508 | A1 | 9/2012 |

OTHER PUBLICATIONS

Notice of Allowance and Fees Due in related U.S. Appl. No. 15/223,761 dated Jul. 2, 2018 (5 pages).
Notice of Allowance and Fees Due in related U.S. Appl. No. 15/399,168 dated Dec. 6, 2017 (17 pages).
Non-Final Office Action in related U.S. Appl. No. 15/714,551 dated Mar. 5, 2018 (16 pages).
Final Office Action in related U.S. Appl. No. 15/714,551 dated Nov. 15, 2018 (16 pages).
Non-Final Office Action in related U.S. Appl. No. 15/714,551 dated Jun. 17, 2019 (15 pages).
Final Office Action in related U.S. Appl. No. 15/714,551 dated Feb. 13, 2020 (8 pages).
Non-Final Office Action in related U.S. Appl. No. 15/714,500 dated Apr. 18, 2018 (25 pages).
Notice of Allowance and Fees Due in related U.S. Appl. No. 15/714,500 dated Feb. 4, 2019 (12 pages).
Notice of Allowance and Fees Due in related U.S. Appl. No. 15/913,238 dated Sep. 28, 2018 (17 pages).
Notice of Allowance and Fees Due in related U.S. Appl. No. 16/235,890 dated Sep. 30, 2019 (22 pages).
Corrected Notice of Allowance in related U.S. Appl. No. 16/235,890 dated Dec. 19, 2019 (5 pages).
Croft, "Wi-Fi Service Discovery over 802.11u Using Non-Native Generic Advertising Services (GAS-SD)" May 2014 (50 pages).
Balraj, "Qualcomm Research San Diego: LTE Direct Overview", 2012 (23 pages).
Non-Final Office Action dated Jun. 10, 2015 for related U.S. Appl. No. 14/020,511.
Non-Final Office Action dated Feb. 23, 2015 for related U.S. Appl. No. 13/813,349 pp. 1 to 13.
English translation of Japanese Office Action for related Application 2013-513400 dated Mar. 24, 2015, pp. 1-2.
English translation of Korean Office Action for related Application 10-2013-7000301 dated Apr. 20, 2015, pp. 1-6.
Jose et al., Distributed Rate Allocation for Wireless Networks, Apr. 6, 2010, pp. 1-39, XP055015975.
Search Report and Written Opinion in related International Application No. PCT/US11/39180 dated Jan. 11, 2012.
Search Report and Written Opinion in related International Application No. PCT/US11/45967 dated Mar. 19, 2012.
Search Report and Written Opinion in related International Application No. PCT/US12/28571 dated Aug. 24, 2012.
Final Office Action dated Mar. 1, 2016 in related U.S. Appl. No. 14/020,511, pp. 1 to 14.
Non-Final Office Action dated Oct. 22, 2015 for related U.S. Appl. No. 14/823,506, pp. 1 to 23.
Non-Final Office Action dated Jun. 10, 2015 for related U.S. Appl. No. 14/020,511 pp. 1 to 21.
Office Action in related Japanese application 2013-513400 dated Mar. 24, 2015, pp. 1-2.
Office Action in related Korean application 10-2013-7000301 dated Apr. 20, 2015, pp. 1-2.
Jubin et al., Distributed Rate Allocation for Wireless Networks, http:arxiv.org/abs/100232813 Apr. 6, 2010.
Non-Final Office Action dated Oct. 22, 2015 for related U.S. Appl. No. 15/823,506, pp. 1 to 23.
Final Office Action dated Oct. 26, 2015 for related U.S. Appl. No. 13/813,349.
International Search Report and Written Opinion issued in related PCT Application No. PCT/US2012/028571 dated Aug. 24, 2012, 13 pages.
Office Action in related Chinese patent application 201180038261.7 dated Sep. 15, 2015.
Office Action in related Chinese patent application 201180038261.7 dated Aug. 5, 2016.
Examination Report for related European Patent Application 11725847.5 dated Dec. 12, 2017.
International Preliminary Report on Patentability in related International Application No. PCT/US2012/028571 dated Sep. 10, 2013.
European Search Report in related EP Application No. 19152331.5 dated Apr. 2, 2019.
Office Action issued in Chinese Application No. 201180038261.7 dated Sep. 15, 2015.
Office Action issued in Chinese Application No. 201180038261.7 dated Aug. 5, 2016.
Singapore Search and Examination Report in SG Application No. 201301586-2 dated Jan. 23, 2014.
International Preliminary Report on Patentability in related International Application No. PCT/US2011/039180 dated Dec. 4, 2012.
Office Action for related Indian Patent Application No. 33/CHENP/2013 dated Apr. 30, 2019.
International Preliminary Report on Patentability in related International Application No. PCT/US2011/045967 dated Feb. 5, 2013.
Jose et al., Distributed Rate Allocation for Wireless Networks, Feb. 15, 2010, pp. 1-24, arXiv: 1002.2813v1.
Extended European Search Report in related EP Application No. 19152331.5 dated Apr. 2, 2019 (8 pages).
Office Action in related EP Application No. 19152331.5 dated Jun. 19, 2020 (5 pages).

(56) References Cited

OTHER PUBLICATIONS

Non-Final Office Action in related U.S. Appl. No. 14/823,506 dated Oct. 22, 2015 (23 pages).
Notice of Allowance and Fees Due in related U.S. Appl. No. 14/823,506 dated Feb. 4, 2016 (33 pages).
Non-Final Office Action in related U.S. Appl. No. 13/701,449 dated Aug. 27, 2014 (23 pages).
Final Office Action in related U.S. Appl. No. 13/701,449 dated Apr. 13, 2015 (7 pages).
Notice of Allowance and Fees Due in related U.S. Appl. No. 13/701,449 dated May 11, 2015 (19 pages).
Non-Final Office Action in related U.S. Appl. No. 13/852,007 dated Oct. 23, 2014 (25 pages).
Final Office Action in related U.S. Appl. No. 13/852,007 dated Apr. 8, 2015 (8 pages).
Notice of Allowance Fees Due in related U.S. Appl. No. 13/852,007 dated Jun. 17, 2015 (14 pages).
Non-Final Office Action in related U.S. Appl. No. 13/813,349 dated Feb. 23, 2015 (13 pages).
Final Office Action in related U.S. Appl. No. 13/813,349 dated Oct. 26, 2015.
Non-Final Office Action in related U.S. Appl. No. 13/813,349 dated Jun. 9, 2016 (16 pages).
Final Office Action in related U.S. Appl. No. 13/813,349 dated Jan. 27, 2017 (9 pages).
Notice of Allowance and Fees Due in related U.S. Appl. No. 13/813,349 dated Jun. 5, 2017 (5 pages).
Non-Final Office Action in related U.S. Appl. No. 14/020,511 dated Jun. 10, 2015 (11 pages).
Final Office Action in related U.S. Appl. No. 14/020,511 dated Mar. 1, 2016 (11 pages).
Notice of Allowance and Fees Due in related U.S. Appl. No. 14/020,511 dated Oct. 5, 2016 (13 pages).
Non-Final Office Action in related U.S. Appl. No. 15/172,736 dated Mar. 9, 2017 (8 pages).
Notice of Allowance and Fees Due in related U.S. Appl. No. 15/172,736 dated Jun. 21, 2017 (20 pages).
Notice of Allowance in related U.S. Appl. No. 15/714,551 dated Jul. 1, 2020 (6 pages).
Non-Final Office Action in related U.S. Appl. No. 16/728,878 dated Aug. 12, 2020 (24 pages).
Notice of Allowance and Fees Due in related U.S. Appl. No. 15/714,551 dated Nov. 16, 2020 (5 pages).

\* cited by examiner

NETWORK ROUTING SYSTEM, METHOD, AND COMPUTER PROGRAM PRODUCT

CROSS-REFERENCE TO RELATED APPLICATIONS

The present application is a continuation of U.S. patent application Ser. No. 16/728,878 filed on Dec. 27, 2019, which is a continuation of Ser. No. 16/235,890 filed on Dec. 28, 2018, which is a continuation of U.S. patent application Ser. No. 15/913,238 filed on Mar. 6, 2018, which is a continuation of U.S. patent application Ser. No. 15/399,168, filed on Jan. 5, 2017, which is a continuation of U.S. patent application Ser. No. 14/020,511, filed on Sep. 6, 2013, now U.S. Pat. No. 9,578,591, which is a continuation of PCT application PCT/US2012/028571 filed Mar. 9, 2012, which claims the benefit of U.S. provisional patent application 61/451,039 filed Mar. 9, 2011, and is a continuation-in-part of and claims priority to PCT application PCT/US2011/045967, filed Jul. 29, 2011, is a continuation-in-part of and claims priority to PCT application, PCT/US2011/039180, filed Jun. 3, 2011. Each of the parent applications are incorporated by reference herein in their entirety for all purposes

BACKGROUND OF THE INVENTION

Technical Field

The present invention relates to wireless communication networks, and more particularly to routing signals through wireless networks.

Background

In some wireless communication systems, such as cellular communication systems, a geographic area of the network is broken up into sub-areas referred to as "cells." Each cell may, for example, be about ten square miles in area in a larger area of 50 square miles. Each cell may include a device referred to as "base station," which, in some systems, has a tower for receiving/transmitting and a base connected into a public switched telephone network (PSTN).

Areas are often divided into cells in order to use spectrum more efficiently. Typically, a wireless carrier is allocated a limited number of frequency channels. The use of the cells, in some applications, facilitates frequency reuse, such that, for instance, different users (e.g., individuals operating cellular handsets or devices that send or receive data over a wireless network) may communicate with different base stations over the same frequency in different cells, thereby re-using spectrum while avoiding or reducing interference. Cell phone systems are often digital with each cell having several channels for assignment to users. In a large city, there may be hundreds of cells.

Cellular networks often include a mobile telephone switching office (MSC) that, in some systems, controls certain aspects of the operation of some or all of the base stations in a region, control that may include control of the connections to a land-based PSTN. For instance, when a user's wireless device gets an incoming call, the MSC may attempt to locate in which cell the user's wireless device is located. The MSC then may instruct a base station and other system components to assigns resources for the call to the wireless device. The MSC then communicates with the user's wireless device over a control channel to inform the user's wireless device what resources to use. Typically, once the user's wireless device and its respective cell tower are connected, the call is on between the wireless device and tower. Similar mechanisms are used to facilitate data communication (e.g., packet switched data communication) between the wireless device and the network.

In some cellular communication systems, a wireless device directly communicates with the cellular base-station. That is, in some cellular wireless systems, the wireless device communicates with the cellular base-station via a single-hop, meaning that the signals sent between the wireless device and the base station are not mediated through an intermediary device that receives signals from one and passes them on to the other.

In some systems, at certain times, there may be a relatively large number of users attempting to directly communicate with the base-station in a cell. Some of these users may be located in areas referred to herein as "marginal-to-inoperative regions," which are areas where the wireless service is spotty because the signal between the wireless device and the cellular base-station is weak or blocked, usually because of hilly terrain, excessive foliage, physical distances, concrete walls, or tall buildings. In another example of a marginal-to-inoperative region, some of these users may be located in areas referred to herein as "cell-edges," which are areas where the interference from neighboring cells is relatively high.

Furthermore, the signal-quality (e.g., signal-strength, signal-to-noise ratio, signal-to-interference and noise ratio, or channel quality indicator) in some areas of the cell may not be strong enough to meet the throughput demand of the user. This is because when everything else is kept constant, the data rate that can be supported between a wireless device and a cellular base-station depends, in part, on the signal-strength or signal-quality between the device and the base-station. In some cellular systems, wireless devices are configured to transmit at a relatively high power when the device is in an area of the cell where the signal strength is low. This may help in supporting higher data rates between that particular device and that particular base-station. However, higher-power transmission may consume precious battery power of the device and also potentially causes more interference in the neighboring cells. Causing more interference in the neighboring cells may further hurt the effective capacity of the cellular system.

Some cellular systems may use adaptive modulation and coding. To facilitate communication, these systems often use modulation schemes and a certain amount of error correction coding (which, may tend to reduce the data rate or throughput of the wireless link) when the signal strength between a wireless device and the cellular base-station is relatively low. Thus, such systems may achieve a data rate between the device and the base-station that depends, in part, on the location of the device with respect to the base-station. Moreover, in these systems, if the same amount of spectrum was allocated to two similar wireless devices in a cell, where the signal-strength or signal-quality between the base-station and the first device is high and the signal-strength or signal-quality between the base-station and the second device is low, then the first device would (on average) be able to send/receive more useful data to/from the base-station. Thus, devices experiencing low signal-strength or signal-quality from the base-station may reduce the effective capacity of the wireless spectrum.

Therefore, there is a need in the art for expanding the effective coverage area and improving the effective capacity of cellular base-stations and cellular networks.

BRIEF SUMMARY OF THE INVENTION

In one aspect of the present inventions, a method, system, or computer program product for routing in a wireless network is provided. The method, in some instances, includes a first wireless terminal choosing to participate as a router. The method further includes the first wireless terminal deciding whether it will act as a relay or a sink. In addition, the method further includes a second wireless terminal choosing to send data to the first wireless terminal based on whether the first wireless terminal is acting as a relay or a sink. As used herein, the term "sink" refers to the wireless device in a multi-hop connection that forms the final connection to the base station (or other interface to other networks or end data sources), and the term "relay" refers to intermediate connecting wireless devices in the multi-hop connection.

In another aspect of the present inventions, a method, system, or computer program product for improving the performance of a wireless network is provided. The method includes a wireless terminal choosing a deterministic schedule for transmitting a first type of data and a randomized schedule for transmitting a second type of data.

In another aspect of the present inventions, a method, system, or computer program product for improving the performance of a wireless network is provided. The method includes a first wireless device receiving support from a second wireless device and a third wireless base-station.

In another aspect of the present inventions, a method, system, or computer program product for routing in a wireless network is provided. The method includes a first wireless terminal choosing to send data to a third wireless terminal via a second wireless terminal based on at least one of the following factors: signal-strength or signal-quality of transmissions made by the third wireless terminal and received by the first wireless terminal are above a threshold greater than zero; and signal-strength or signal-quality of transmissions made by the second wireless terminal and received by the first wireless terminal are above a threshold greater than zero.

In another aspect of the present inventions, a method, system, or computer program product for routing in a wireless network is provided. The method includes a second wireless terminal allowing a first wireless terminal to send data to a third wireless terminal via the second wireless terminal based on at least one of the following factors: signal-strength or signal-quality of transmissions made by the third wireless terminal and received by the second wireless terminal are above a threshold greater than zero; and signal-strength or signal-quality of transmissions made by the first wireless terminal and received by the second wireless terminal are above a threshold greater than zero.

In another aspect of the present inventions, a method, system, or computer program product for routing in a wireless network is provided. The method includes a third wireless terminal allowing a first wireless terminal to send data to the third wireless terminal via a second wireless terminal based on at least one of the following factors: signal-strength or signal-quality of transmissions made by the first wireless terminal and received by the third wireless terminal are above a threshold greater than zero; and signal-strength or signal-quality of transmissions made by the second wireless terminal and received by the third wireless terminal are above a threshold greater than zero.

In another aspect of the present inventions, a method, system, or computer program product for managing vehicular traffic is provided. The method includes a first wireless terminal sending a beacon. The method further includes a second wireless terminal receiving the beacon and sending a part of the beacon to a traffic-light controller. In addition, the method further includes the traffic-light controller receiving the part of the beacon and using it to do at least one of the following: monitor vehicles, regulate vehicles, route vehicles, control vehicles, monitor people, regulate people, route people, control people, and control traffic-lights.

In another aspect of the present inventions, a method, system, or computer program product for conserving energy is provided. The method includes a first wireless terminal sending a beacon. The method further includes a second wireless terminal receiving the beacon and sending a part of the beacon to an electric appliance controller. In addition, the method further includes the electric appliance controller receiving the part of the beacon and using it to do at least one of the following: detect people, monitor people, receive instructions, and control electric appliances.

In another aspect of the present inventions, a method, system, or computer program product for relaying in a wireless network is provided. The method includes a first wireless terminal calculating a first value. The method further includes the first wireless terminal transmitting a data frame along with the first value to a second wireless terminal. In addition, the method further includes the second wireless terminal receiving the data frame and using the first value to do at least one of the following: deciding whether to relay the data frame, choosing next recipient of the data frame, scheduling the data frame, routing the data frame, and calculating a second value to replace the first value.

In another aspect of the present inventions, a method, system, or computer program product for enhancing social interaction is provided. The method includes a first wireless terminal transmitting a first data. The method further includes a second wireless terminal receiving the first data. In addition, the method further includes the second wireless terminal determining whether the first data and a second data are a match. Furthermore, the method further includes the second wireless terminal requesting communication with the first wireless terminal if a match exists. Additionally, the method further includes the first wireless terminal accepting the second wireless terminal's request to establish communication.

In another aspect of the present inventions, a method, system, or computer program product for improving the performance of a wireless network is provided. The method includes a first wireless terminal transmitting a first data. The method further includes a second wireless terminal receiving the first data. In addition, the method further includes the second wireless terminal transmitting a second data. Furthermore, the method further includes the first wireless terminal receiving the second data. Additionally, the method further includes the first wireless terminal constructing a third data based on at least one of the following: the first data and the second data. Moreover, the method further includes the first wireless terminal transmitting the third data to the original source of the first data.

In another aspect of the present inventions, a method, system, or computer program product for improving the performance of a wireless network is provided. The method includes a first wireless terminal transmitting a first data. In addition, the method further includes a second wireless terminal transmitting a second data at a first power level while receiving the first data. Furthermore, the method further includes the second wireless terminal mitigating the effects of transmitting the second data to decode the first data.

The foregoing has outlined rather generally the features and technical advantages of one or more aspects of the present inventions in order that the detailed description of the present invention that follows may be better understood. Not all of the embodiments of the present inventions include all of the features described above or offer all of the advantages described above, and additional features and advantages of the present invention will be described hereinafter, which may form the subject of the claims of the present invention.

BRIEF DESCRIPTION OF THE FIGURES

A better understanding of the present inventions can be obtained when the following detailed description is considered in conjunction with the following drawings, in which.

DETAILED DESCRIPTION OF EXAMPLE EMBODIMENTS

Figure 1:
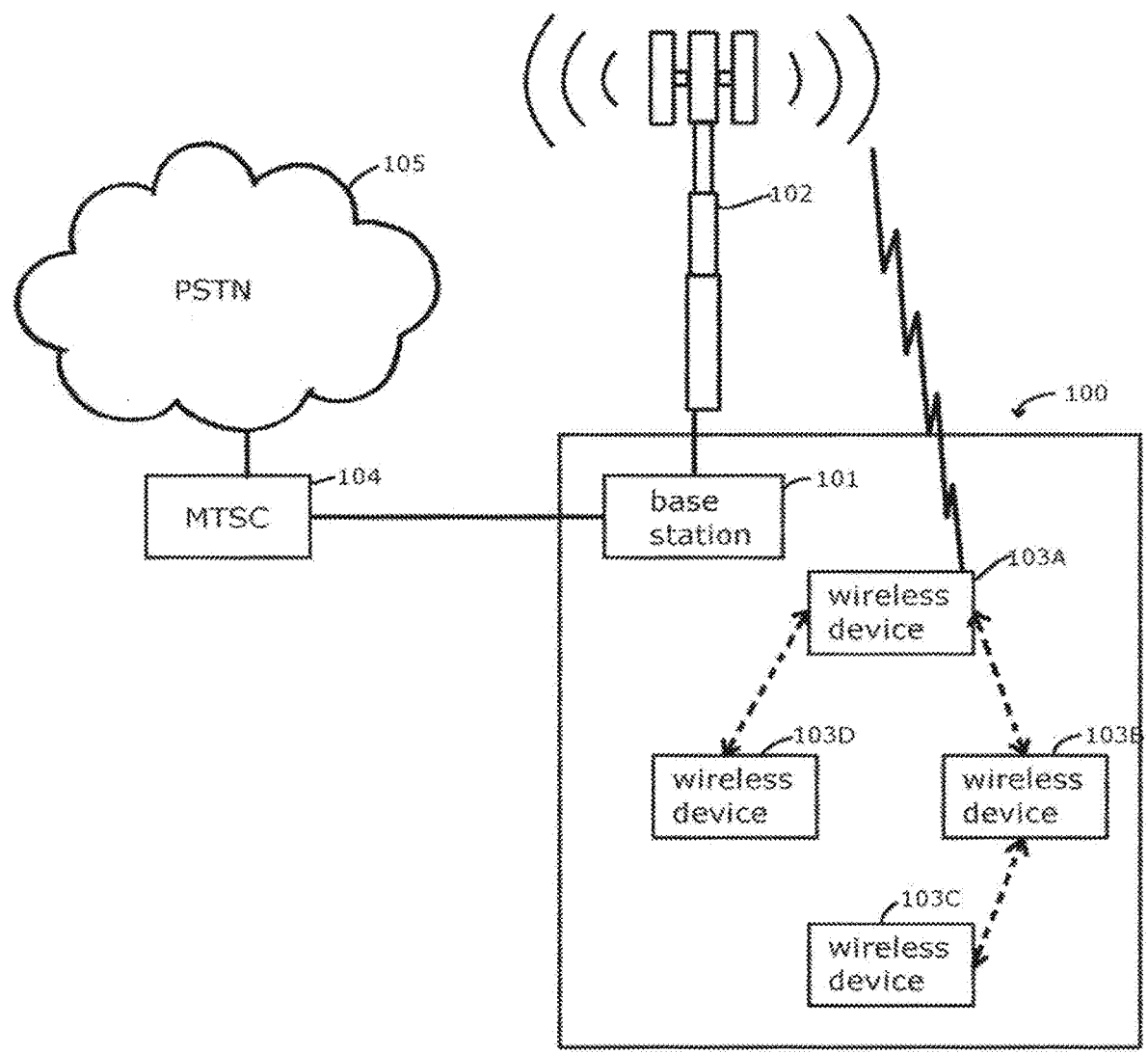
FIG. 1 is a generalized diagrammatic view of an example of a cell in a cellular network where wireless devices in the cell have the ability to communicate with the base station via multi-hopping in accordance with an embodiment.

The present invention may take a variety of forms, including, in certain embodiments, a wireless network, a wireless device, an integrated circuit, firmware, microcode, and software stored in a tangible, machine-readable medium. Certain aspects of some embodiments may be used for a variety of purposes, including, for example, for expanding the coverage and improving the capacity of a wireless network, such as a cellular network.

In some embodiments, a wireless device (e.g., cellular telephone) is able to (configured to) communicate with a base station in a cell of the cellular network over a non-cellular interface via another wireless device in the cell through the use of multi-hopping. A wireless device may request permission to communicate with the base station over a non-cellular interface via hopping off another wireless device when its (the wireless device requesting permission's) signal strength is below a threshold. Other factors that may affect a device's hopping decision include, but are not limited to, battery life, bandwidth usage, type of device, level of mobility, time of day, subscription fees, user profile, non-cellular signal strength, cellular signal strength, level of wireless interference seen by non-cellular interface, and level of wireless interference seen by cellular interface. Alternatively, or additionally, a wireless device may receive a request to communicate with the base station over a non-cellular interface via hopping off the wireless device that sent the request when that wireless device has excess capacity in its (the request sending wireless device's) bandwidth with the base station. The wireless devices may communicate with one another in the cell using a non-cellular protocol thereby potentially reducing the usage of the bandwidth of the cellular network. By configuring wireless devices in the cell of the cellular network to communicate with a base station in such a manner via multi-hopping, in some embodiments, the coverage area and the capacity of the cellular network is enhanced, though other embodiments may use the same technique or other techniques to other effects. Moreover, in some systems, an improvement may be observed in the allocation and use of the cellular network system resources.

While the following discusses embodiments of the present inventions in connection with wireless devices in a cellular network, the principles of the present invention may be applied to other systems, including home appliances, peer-to-peer networks, multi-hop wireless networks, ad-hoc networks, and mesh networks, which is not to suggest that these categories of networks are mutually exclusive.

In the following description, numerous specific details are set forth to provide a thorough understanding of certain embodiments. However, it will be apparent to those skilled in the art that the techniques presented herein may be practiced without applications of the techniques being limited to such specific details of the described embodiments.

As stated in the Background section, currently, in many existing cellular systems, the cellular device directly communicates with the cellular base-station. That is, in these existing cellular systems, the cellular device communicates with the cellular base-station via a single-hop. As discussed above, there may be hundreds or thousands of devices attempting to directly communicate with the base station in a cell. Some of these devices may be located in areas referred to herein as "marginal-to-inoperative regions," which are areas where cell telephone service is relatively weak or not available because the signal between the cellular phone and the base station is blocked, often by hilly terrain, excessive foliage, physical distance, or tall buildings. Further, the signal strength in some areas of the cell may not be strong enough to meet the throughput demand of the device. Therefore, there is a need in the art for extending the coverage area of the base station to serve those devices that may be located in marginal-to-inoperative regions as well as to meet throughput demand of devices in areas where the signal strength is low, though applications of the present techniques are not limited to meeting this need, e.g., other design-tradeoffs are envisioned, such as in embodiments having the same throughput and capacity as conventional systems, but with lower-error rates, lower power consumption, or decreased interference with other networks or devices.

Figure 2:
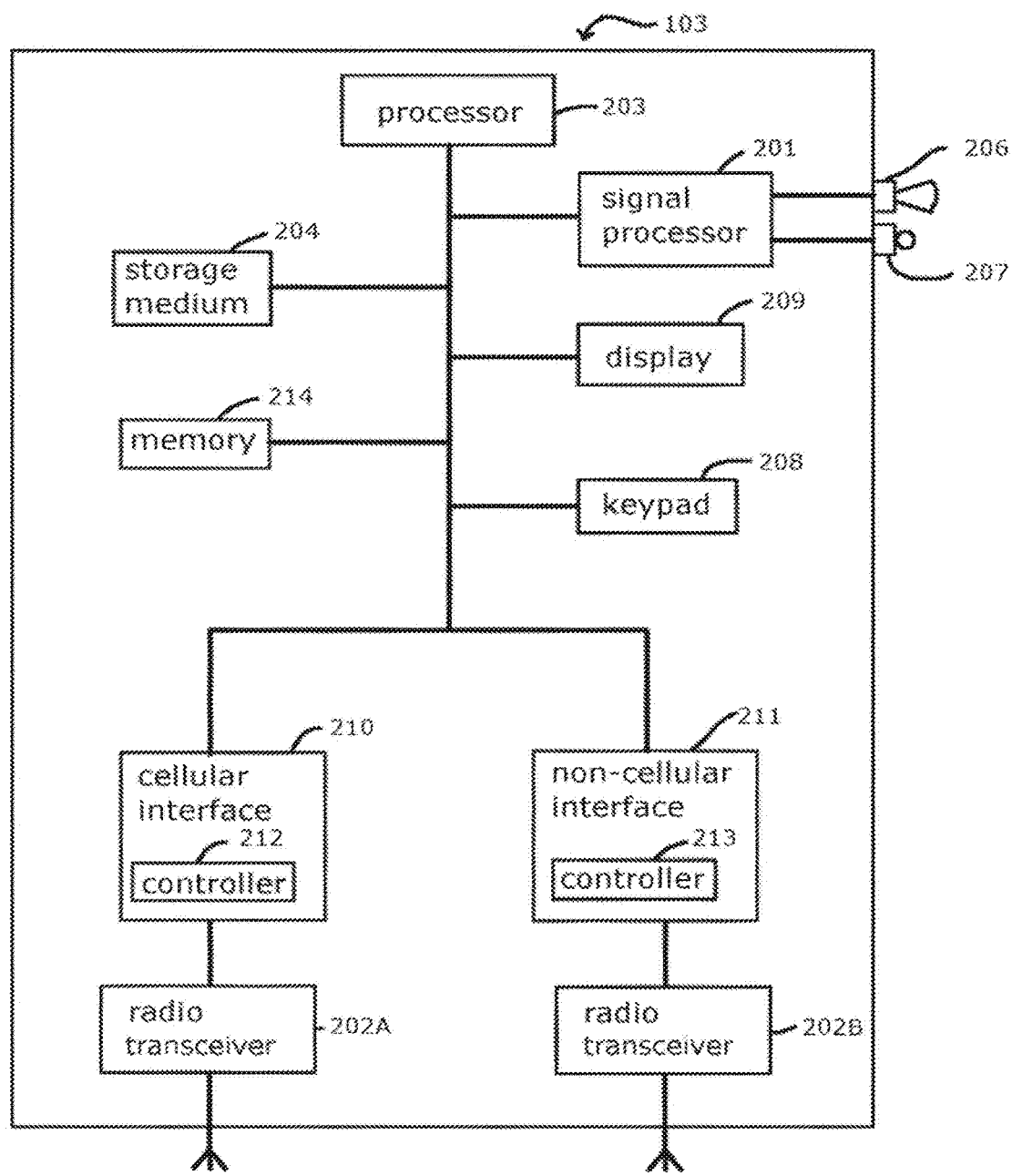
FIG. 2 is a block diagram illustrating an exemplary view of the circuitry of certain components of a cellular telephone in accordance with an embodiment of the present invention.
Figure 3:
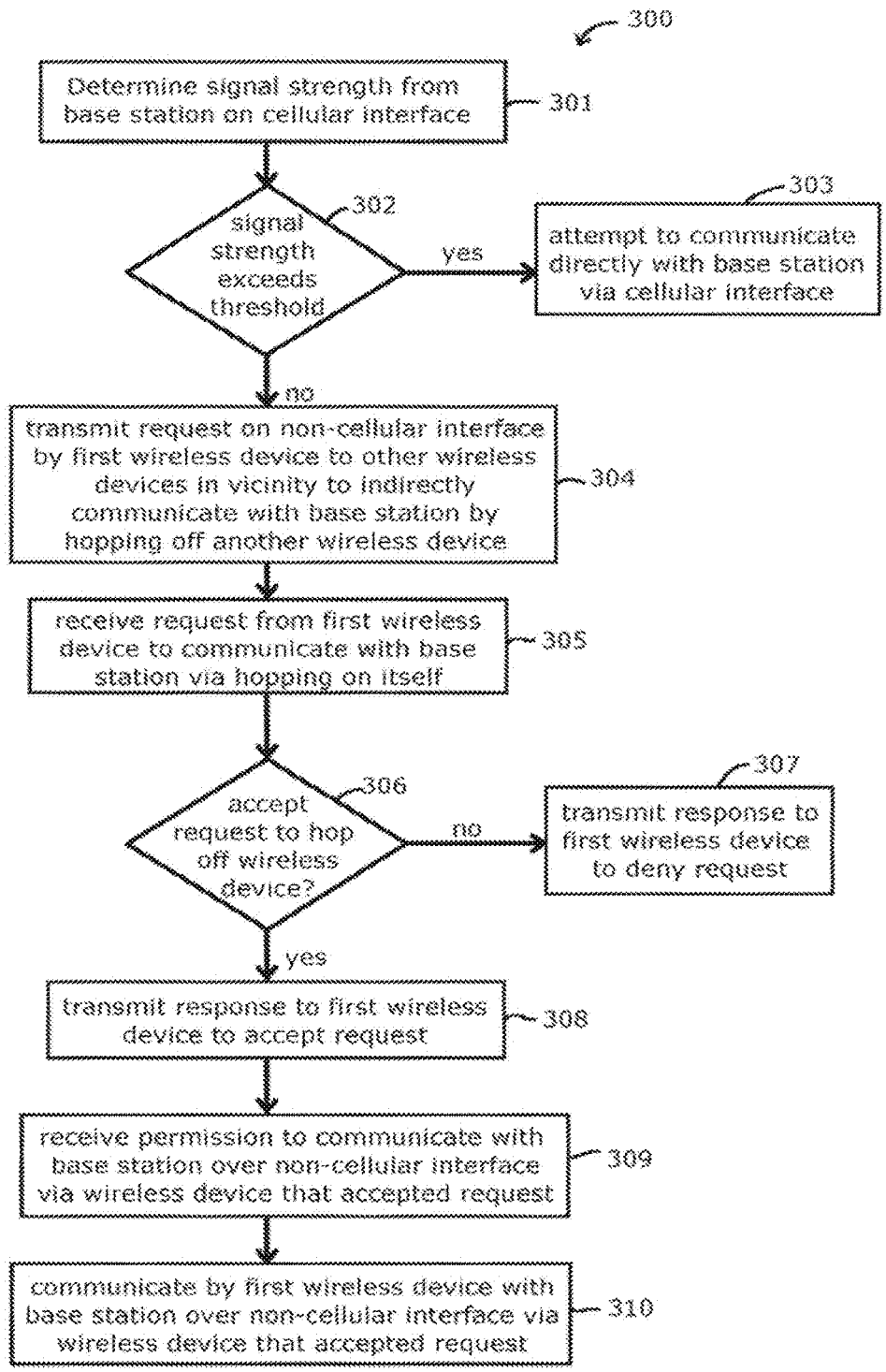
FIG. 3 is a flowchart of an example of a method for expanding the coverage of a cellular network in accordance with an embodiment of the present invention.
Figure 4:
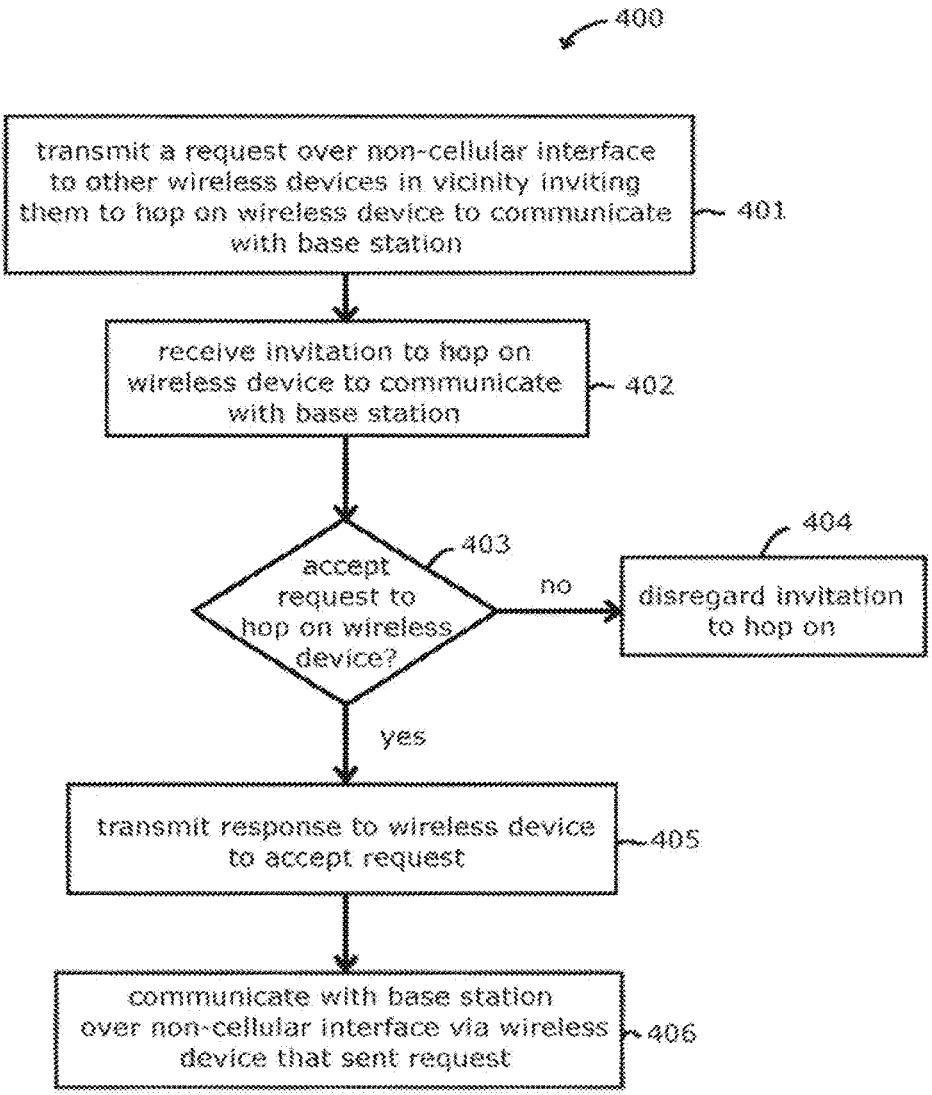
FIG. 4 is a flowchart of another example of a method for expanding the coverage of a cellular network in accordance with an embodiment of the present invention.

Principles of the present technique, as discussed herein in connection with FIGS. 1-4 and other figures, may be used in certain applications to expand the coverage area and improve the capacity of the base-station. This is expected to allow the base-station, in some embodiments, to serve those devices that may be located in marginal-to-inoperative regions. Further, principles of the present technique, as discussed herein in connection with FIGS. 1-4 and other figures, in some systems, are expected to relatively efficiently allocate the system resources of the cellular network in order to more effectively meet the throughput demand of devices in areas where the signal strength is low. FIG. 1 is a diagrammatic view of an example of a cell in a cellular network where wireless devices in the cell have the ability to communicate with the base station via multi-hopping. FIG. 2 is a block diagram illustrating an exemplary view of the internal circuitry of components of a cellular telephone. FIG. 3 is a flowchart of a process that, in some embodiments, may be used for expanding the coverage and improving the capacity of a cellular network in the scenario of when a wireless device has low signal quality by, in some embodiments, hopping off another wireless device in the cell to communicate with the base station. FIG. 4 is a flowchart for an example of a process that may be used for expanding the coverage and improving the capacity of a cellular network in the scenario of when a wireless device has excess capacity in its bandwidth with the base station to allow other wireless devices in the cell to hop off itself to communicate with the base station. FIGS. 5-14 further illustrate embodiments of distributed routing, device management, adaptive scheduling, and distributed algorithms using principles of the present inventions.

FIG. 1 is a diagrammatic view of a cell 100 in a wireless cellular telephone network in accordance with an embodiment of the present inventions. It is noted that only a single cell 100 in a cellular network is depicted for ease of understanding. The principles of the present inventions are not limited to any particular number of cells in a particular cellular telephone network or other form of wireless network.

Cell 100 in a wireless cellular telephone network may be about ten square miles in area. Each cell 100 in the illustrated cellular telephone network may include a base station 101 that has a tower 102 for receiving/transmitting with wireless devices 103A-D (e.g., cellular phones, netbooks, personal digital assistants, laptop computers). Wireless devices 103A-D may collectively or individually be referred to as wireless devices 103 or wireless device 103, respectively. The term "wireless device", as used herein, refers to any communication device that has the capability of communicating directly via wireless transmission with a wireless network. An example of a wireless device is a "cellular device", which is a wireless device capable of communicating directly via wireless transmission with a base station of a cellular network. While FIG. 1 depicts four wireless devices 103 in cell 100, is the techniques described are not to be limited in scope to any particular number of wireless devices 103 that may be serviced in cell 100. An example of a wireless device and a cellular device being a cellular telephone for practicing the principles of the present invention is discussed below in connection with FIG. 2.

Figure 15:
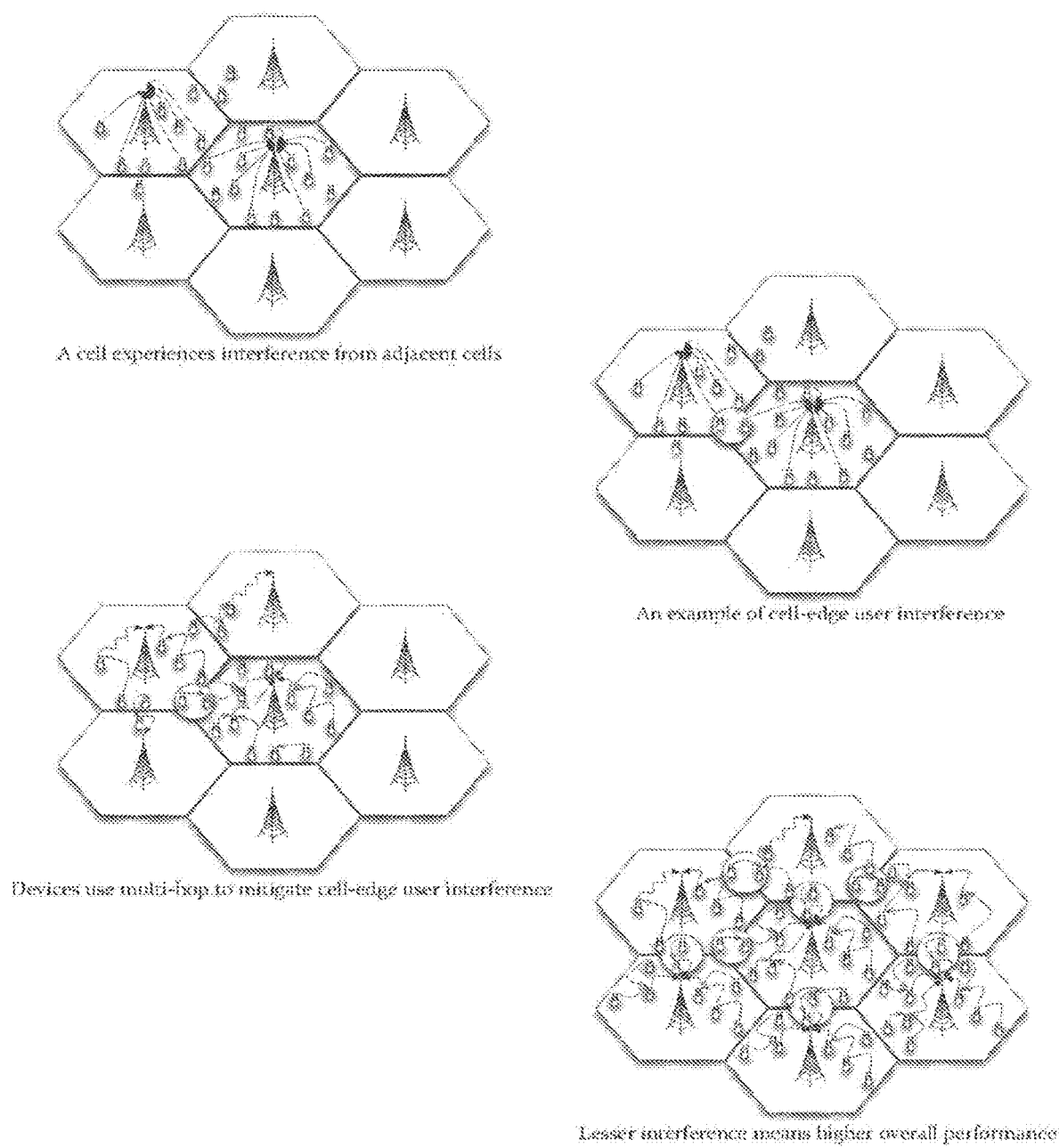
FIG. 15 is a diagrammatic view of an example of cell-edge user interference in accordance with an embodiment of the present invention.

In accordance with an embodiment of the present invention, wireless devices 103 are configured to communicate with base station 101 over "multiple hops." "Multi-hopping," as used herein, refers to the process whereby a wireless device communicates indirectly with a base station (or other interface to other networks or end data sources) via wireless transmission to and from one or more other intermediate wireless devices. For example, as illustrated in FIG. 1, wireless device 103B may communicate with base station 101 via wireless device 103A. In another example, as illustrated in FIG. 1, wireless device 103C may communicate with base station 101 via wireless devices 103B, 103A. In this example, the range of communication is extended. In another example, as illustrated in FIG. 1, wireless device 103D may communicate with base station 101 via wireless device 103A. Hence, by allowing wireless devices 103B, 103D to communicate with base station 101 via wireless device 103A, there is, in some embodiments, a relatively efficient usage of the bandwidth of the cellular network compared with systems that do not employ multi-hopping. Some possible advantages of multi-hopping are also shown in FIG. 7 and FIG. 15. A more detailed description of multi-hopping will be discussed further below. In one embodiment, wireless devices 103 may communicate with each other via a non-cellular protocol, thereby reducing the usage of the bandwidth of the cellular network as discussed in further detail below. In one embodiment, the user of wireless device 103 communicating with base station 101 via multi-hopping is charged for the service. And in this embodiment, the user(s) of the intermediary wireless device(s) 103 are not charged for the service involving the user of wireless device 103 communicating with base station 101 via the intermediary wireless device(s) 103.

Referring again to FIG. 1, base station 101 may be connected into the public switched telephone network (PSTN) 105 via a mobile telephone switching office (MTSO) 104. In some systems, each carrier may have a mobile telephone switching office (MTSO) 104 that controls the base stations 101 in the city or region and controls the connections to the land based PSTN 105. Different cellular standards, such as GSM, UMTS, WiMAX, LTE, etc. may use terms like mobile switching center (MSC) for 104 and public land mobile network (PLMN) for 105.

As discussed above, the illustrated base station 101 has a tower 102 for receiving/transmitting with wireless devices 103A-D. That is, communication is achieved between wireless device 103 and tower 102, such as via two-way long-range radio frequency communication. A block diagram illustrating an exemplary view of the internal circuitry of components of an example of a wireless device 103 being a cellular telephone is provided below in connection with FIG. 2.

FIG. 2 is a block diagram illustrating exemplary circuitry of components of wireless device 103 (FIG. 1), device 103 being a cellular telephone in accordance with embodiments of the present invention. While the components of wireless device 103 are illustrated as discrete blocks, software or (i.e., and/or) hardware by which these components are implemented may be organized differently from the block diagram of FIG. 2, e.g., software or hardware of different blocks may be intermingled, combined, or broken up into multiple components. Wireless device 103 may include a signal processor 201 and radio transceivers 202A, 202B coupled to a processor 203 (radio transceivers 202A, 202B coupled to processor 203 via cellular and non-cellular interfaces 210, 211, respectively, as discussed further below). Further, wireless device 103 may include a tangible non-transitory data storage medium 204 coupled to processor 203. Additionally, wireless device 103 may include an antenna 205 for transmitting and receiving radio waves (wireless signals). Radio transceivers 202A, 202B coupled to antenna 205 may transmit and receive radio communication. Signal processor 201, in some embodiments, converts radio signals received from radio transceivers 202A, 202B into audio signals outputted by a speaker 206 and coverts received audio signals from a microphone 207 into radio signals that are transmitted by radio transceivers 202A, 202B and antenna 205 combinations. Keypad 208 may include internal electrical sensors behind each key visible from the exterior of wireless device 103. These sensors may trigger a particular response when a key is depressed by a user of wireless device 103.

Processor 203, in some embodiments, is a microprocessor that may control operation of other components of thereof wireless device 103. For example, processor 203 may control processes occurring within wireless device 103, including responding to user-inputs and executing program modules to generate menu items, prompts, etc., that are outputted on a display 209.

Storage medium 204, in some embodiments, stores computer executable programs as individual utilities/modules and maintains a database of user-entered (or dynamically created/stored) data.

A wireless interface implements protocols that facilitate wireless communication between two wireless terminals. A terminal could be a base-station or a cellular device; moreover, a base-station may also be considered as a wireless device. Thus, this document uses the phrase wireless terminal and wireless device interchangeably. At least one wireless interface resides inside each wireless terminal. A "cellular interface," as that term is used herein, is a wireless interface that is configured to be directly managed by a cellular network. Thus one or more cellular base-stations could be controlling the behavior of the cellular interface inside a cellular device. Using its cellular interface, a cellular device can communicate with a base-station directly over a single-hop. In some embodiments, it may become possible to communicate over multiple hops by using only the cellular interface. A non-cellular interface is a wireless interface that is configured to operate without being directly managed by a cellular network. There is one exception to this definition: in a device, if a first infrastructure network is managing a first wireless interface and a second infrastructure network is managing a second wireless interface, and the first wireless interface facilitates multi-hopping in the second infrastructure network, then the first wireless interface can be considered as a non-cellular interface from the perspective of the second infrastructure network. Although a non-cellular interface may modify its behavior based on the feedback that it gets from the cellular network in which it is facilitating multi-hop, it is not directly instructed to do so by the cellular network. In some embodiments, the non-cellular interface still has independent control over its behavior and is capable of routing communications in a decentralized manner.

Additionally, in some embodiments, wireless device 103 includes a cellular interface 210 and a non-cellular interface 211 coupled to processor 203. Cellular interface 210 is further coupled to radio transceiver 202A; whereas, non-cellular interface 211 is further coupled to radio transceiver 202B. Some implementations may couple cellular interface 210 and non-cellular interface 211 to the same radio transceiver and antenna. Cellular interface 210 and non-cellular interface 211 include a controller 212, 213. Cellular interface 210 refers to an interface for communicating with cellular tower 102. Non-cellular interface 211 refers to an interface, such as but not limited to, Bluetooth™, WiFi™, FlashLinQ™, for communicating indirectly with cellular tower 102. Moreover, non-cellular interface 211 may operate in unlicensed spectrum bands (e.g. ISM bands), licensed spectrum bands (e.g. GSM 850/900/1800/1900 bands), white-spaces spectrum bands (e.g. portions of the sub-1 GHz band in the United States of America), and lightly-licensed spectrum bands (e.g. 3.65-3.70 GHz band in the United States of America). As discussed further below, wireless device 103 may communicate with each other using a non-cellular interface. Non-cellular interface 211 and cellular interface 210 may use the same wireless spectrum band or different wireless spectrum bands. If non-cellular interface 211 uses different spectrum, peer-to-peer communication between wireless devices 103 may not use or affect the bandwidth of the cellular network. In one embodiment, cellular interface 210 and non-cellular interface 211 may each be embodied on a separate integrated circuit. In another embodiment, cellular interface 210 and non-cellular interface 211 may both be embodied on a single integrated circuit with controller 212/213 located on a separate integrated circuit. In another embodiment, cellular interface 210 (without controller 212) and non-cellular interface 211 (without controller 213) along with a single controller (controllers 212/213 combined into a single controller) may all be embodied on a single integrated circuit. In another embodiment, cellular interface 210 (without controller 212) and non-cellular interface 211 (without controller 213) may be coupled to processor 203, where processor 203 includes a single controller (controllers 212/213 combined into a single controller). In another embodiment, cellular interface 210 (with a part of controller 212) and non-cellular interface 211 (with a part of controller 213) may be coupled to processor 203, where processor 203 includes a single controller (remaining parts of controllers 212/213 combined into a single controller).

Furthermore, wireless device 103 includes a memory 214 coupled to processor 203, cellular interface 210 and non-cellular interface 211. The memory 214 may store instructions for executing various method described herein, including an application in accordance with the principles of the present invention, such as an application for expanding the coverage of a cellular network as discussed further below in association with FIGS. 3 and 4. In some embodiments, code for effecting this application may reside in memory 214, which, like other memory discussed herein, may be a tangible machine-readable medium. Controller 212, 213 may be a processor configured to execute the instructions of the application residing in memory 214. In another embodiment, the instructions of the application may reside in a separate memory (not shown) in cellular interface 210/non-cellular interface 211.

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be used. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Some embodiments may receive instructions from a computer readable signal medium, which may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the present invention. It will be understood that each block of the flowchart illustrations or block diagrams, and combinations of blocks in the flowchart illustrations or block diagrams, can be implemented by computer program instructions. These computer program instructions may be provided to a controller or processor, such that the instructions, which execute via the controller or processor, create means for implementing the function/acts specified in the flowchart or block diagram block or blocks.

These computer program instructions may also be stored in a computer readable medium that can direct a device to function in a particular manner, such that the instructions stored in the computer readable medium produce an article of manufacture including instructions which implement the function/act specified in the flowchart and/or block diagram block or blocks.

As stated above, in certain cellular telephone systems, the cell telephone directly communicates with the cellular base station, thereby potentially resulting in limited coverage and inefficient use of the resources. Certain embodiments may expand the coverage area relative to single-hop systems and may do so relatively efficiently using the resources of the cellular network by allowing wireless devices (e.g., cellular phones, netbooks, personal digital assistants, laptop computers) to communicate with a cellular base station via hopping off other wireless devices in the cell. Furthermore, wireless devices may communicate with one another via a non-cellular protocol thereby minimizing the usage of the bandwidth of the cellular network. These principles will be discussed below in connection with two scenarios involving wireless devices 103. As shown in FIG. 1, one scenario involves wireless device 103 (e.g., wireless device 103B) having low signal strength, thereby causing device 103B to attempt to hop off another wireless device 103 (e.g., wireless device 103A) in cell 100 to communicate with base station 101 as discussed below in connection with FIG. 3. In another scenario, wireless device 103 (e.g., wireless device 103A) has excess capacity in its bandwidth with base station 101 to allow other wireless devices 103 (e.g., wireless device 103B) in cell 100 to hop off itself to communicate with base station 101 as discussed below in connection with FIG. 4.

Referring to FIG. 3, FIG. 3 is a flowchart of a method 300 for expanding the coverage of a cellular network in accordance with an embodiment of the present invention. In particular, as stated above, FIG. 3 illustrates a technique for expanding the coverage of the cellular network for the scenario involving wireless device 103 (e.g., wireless device 103B) having low signal strength, thereby causing device 103B to attempt to hop off another wireless device 103 (e.g., wireless device 103A) in cell 100 to communicate with base station 101.

Referring to FIG. 3, in conjunction with FIGS. 1-2, in step 301, wireless device 103 (e.g., wireless device 103B, wireless device 103D) determines its signal strength on cellular interface 210 from base station 101.

In step 302, wireless device 103 (e.g., wireless device 103B, wireless device 103D) determines whether its signal strength exceeds a threshold. For example, wireless device 103 may determine if its signal strength is of sufficient strength to communicate with base station 101. The signal strength may not be strong enough to meet the throughput demand of the user of wireless device 103. The signal may not even be available due to the user of wireless device 103 being located in a "marginal-to-inoperative region."

If the signal strength exceeds the threshold, then, in step 303, wireless device 103 attempts to directly communicate with base station 101 via cellular interface 210.

If, however, the signal strength is less than the threshold (i.e., signal strength is not strong enough to meet the throughput demand of the user of wireless device 103), then, in step 304, wireless device 103 (e.g., wireless device 103B, wireless device 103D) transmits a request to other wireless devices 103 (e.g., wireless device 103A) in the vicinity to indirectly communicate with base station 101 by hopping off another wireless device 103. "Hopping off a wireless device," as used herein, refers to indirectly communicating with base station 101 via that wireless device 103.

In step 305, wireless device 103 (e.g., wireless device 103A) receives the request to hop off itself to communicate with base station 101.

In step 306, wireless device 103 (e.g., wireless device 103A) that receives the request determines whether to accept the request. In one embodiment, wireless device 103 (e.g., wireless device 103A) determines whether to accept the request based on a variety of factors, such as battery usage, bandwidth usage (referring to the amount of the bandwidth that is currently being used in its connection), time of day pricing, etc. For example, each of, or a subset of, these factors may be compared against respective threshold values and if a factor exceeds the threshold, the request may not be accepted and if the threshold is met, the request may be accepted.

If (e.g., if and only if) wireless device 103 (e.g., wireless device 103A) that receives the request determines to not accept the request, then (e.g., in response to this condition or in response to this condition and others), in step 307, wireless device 103 (e.g., wireless device 103A) transmits a response to wireless device 103 (e.g., wireless device 103B, wireless device 103D) to deny the request.

Alternatively, if wireless device 103 (e.g., wireless device 103A) that receives the request determines to accept the request, then, in step 308, wireless device 103 (e.g., wireless device 103A) transmits a response to wireless device 103 (e.g., wireless device 103B, wireless device 103D) to accept the request.

In step 309, wireless device 103 (e.g., wireless device 103B, wireless device 103D) receives permission to communicate with base station 101 over non-cellular interface 211 via wireless device 103 (e.g., wireless device 103A) that accepted the request.

In step 310, wireless device 103 (e.g., wireless device 103B, wireless device 103D) communicates with base station 101 over non-cellular interface 211 via wireless device 103 (e.g., wireless device 103A) that accepted the request.

Method 300 may include other and/or additional steps that, for clarity, are not depicted. Further, method 300 may be executed in a different order presented and that the order presented in the discussion of FIG. 3 is illustrative. Additionally, certain steps in method 300 may be executed in a substantially simultaneous manner or may be omitted.

As stated above, an alternative scenario using the principles of the present invention involves wireless device 103 (e.g., wireless device 103A) having excess capacity in its bandwidth with base station 101 to allow other wireless devices 103 (e.g., wireless device 103B) in cell 100 to hop off itself to communicate with base station 101 as discussed below in connection with FIG. 4.

Referring to FIG. 4, in conjunction with FIGS. 1-2, in step 401, wireless device 103 (e.g., wireless device 103A) transmits a request over non-cellular interface 211 to other wireless devices 103 (e.g., wireless devices 103B, 103D) in the vicinity inviting them to hop on wireless device 103 (e.g., wireless device 103A) to communicate with base station 101 since wireless device 103 (e.g., wireless device 103A) has excess capacity in its bandwidth with base station 101.

In step 402, wireless devices 103 (e.g., wireless devices 103B, 103D) receive the invitation from wireless device 103 (e.g., wireless device 103A) to hop on wireless device 103 (e.g., wireless device 103A) to communicate with base station 101.

In step 403, wireless devices 103 (e.g., wireless devices 103B, 103D) determine whether to accept the invitation to hop on wireless device 103 (e.g., wireless device 103A) to communicate with base station 101. In one embodiment, wireless devices 103 (e.g., wireless devices 103B, 103D) determine whether to accept the invitation based on a variety of factors, such as the available bandwidth wireless device 103 (e.g., wireless device 103A) has to offer. For example, if the available bandwidth is not sufficient to handle the throughput demand, then wireless device 103 (e.g., wireless device 103B) would not accept the invitation. Alternatively, if there is sufficient bandwidth to handle the throughput demand, then wireless device 103 (e.g., wireless device 103B) may accept the invitation.

If wireless device 103 (e.g., wireless device 103B) that receives the request determines to not accept the invitation, then in step 404 of the present embodiment, wireless device 103 (e.g., wireless device 103B) disregards the invitation.

Alternatively, if wireless device 103 (e.g., wireless device 103D) that receives the request determines to accept the invitation, then in step 405 of the present embodiment, wireless device 103 (e.g., wireless device 103D) transmits a response to wireless device 103 (e.g., wireless device 103A) to accept the request.

In step 406, wireless device 103 (e.g., wireless device 103B) that accepted the request starts communicating with base station 101 over non-cellular interface 211 via wireless device 103 (e.g., wireless device 103A) that sent the request.

Method 400 may include other and/or additional steps that, for clarity, are not depicted. Further, method 400, like the other processes described herein, may be executed in a different order presented, and it should be noted that the order presented in the discussion of FIG. 4 is illustrative rather than limiting. Additionally, certain steps in method 400, like the other processes described herein, may be executed in a substantially simultaneous manner or may be omitted.

In another embodiment of the present invention, a non-cellular interface may be used to indirectly communicate with a cellular network. Thus in some embodiments, a wireless device with only a non-cellular interface can indirectly communicate with a cellular network using principles of the present invention. However, in some systems, only a cellular interface can directly communicate with a cellular network. Although not necessary in certain embodiments, some wireless devices may have both a cellular interface and a non-cellular interface. The cellular and non-cellular interfaces in a device may operate in the same wireless spectrum band or in wireless different spectrum bands. Such a wireless device may communicate directly with a cellular network via its cellular interface and indirectly with a cellular network via its non-cellular interface. Therefore, such a wireless device can be configured to select whether to communicate directly or indirectly with a cellular network depending on its state, situations, and surroundings. In making this decision, a device may consider (e.g., determine whether to communicate directly or indirectly based on) factors such as quality of nearby sinks and relays, quantity of nearby sinks and relays, battery life, source of power, average throughput, bandwidth usage, bandwidth needs, bandwidth availability, type of device, level of mobility, time of day, subscription fees, user profile, non-cellular signal strength and quality, cellular signal strength and quality, level of wireless interference seen by a non-cellular interface, level of wireless interference seen by a cellular interface, number of hops to a sink, and surrounding wireless environment. For example, each of, or a subset of, these factors may be compared against respective threshold values, and if a factor exceeds the threshold, in response, indirect communication may be selected, otherwise direct communication may be selected.

While devices are communicating directly with a cellular base-station via a cellular interface today, in some systems, devices are not communicating with a cellular base-station via a non-cellular interface today in certain networks. Indirect communication with a cellular network via its non-cellular interface requires, in some applications, a first wireless device to send data for a base-station via its non-cellular interface to the non-cellular interface of a second wireless device. If the second wireless device has a good enough direct connection to the base-station via its cellular interface, the second wireless device may forward the data that it receives via its non-cellular interface from the first wireless device directly to the base-station via its cellular interface. Otherwise, the second wireless device may relay the data that it receives for the base-station on its non-cellular interface from the first wireless device to the non-cellular interface of a third wireless device.

If the third wireless device has a good enough direct connection to the base-station via its cellular interface, the third wireless device may forward the data (originated by the first wireless device) that the third wireless device receives via its non-cellular interface from the second wireless device directly to the base-station via its cellular interface. Otherwise, the third wireless device may relay the data (originated by the first wireless device) that it (the third wireless device) receives for the base-station on its non-cellular interface from the second wireless device to the non-cellular interface of a fourth wireless device. In this way the multi-hop route can be extended to as many hops depending on the constraints, state, and abilities of each wireless device that is involved.

In some embodiments, base-stations may collaborate with one another to manage interference at the edge of the cell. However, such methods may make base-stations shuffle their resources around to mitigate interference. Principles of the present invention, in some applications, provide these base-stations with an additional way to manage the interference. If the base-stations detect that serving a wireless device at the edge of the cell may cause an amount of interference above a threshold for other wireless devices near the same edge of the cell, one of the base-stations may communicate with the cellular interface of the concerned wireless device and request that wireless device to use its non-cellular interface to indirectly communicate with the cellular network. In some embodiments, the cellular network may request (e.g., transmit a wireless signal to the wireless device encoding a command) the wireless device to choose another route to the cellular network. Thus, with loose help from the base-station, the wireless device may be able to mitigate the interference for other wireless devices located near the cell-edge and may also help enhance the performance of the cellular network.

Moreover, in some embodiments, the wireless device may also make this decision independently without any, or with limited, assistance from the base-stations (examples of which are shown in FIG. 15). One such way of doing this is to analyze (e.g., by a process executed by the wireless device) the signal strength or signal quality from nearby base-stations. If the signal strengths or signal qualities of the top (strongest) few base-stations are nearly the same, the device may predict that excessive cell-edge interference is likely and may try to use its non-cellular interface to indirectly communicate with a nearby base-station. Other ways of predicting and sensing cell-edge user interference in a distributed manner may use (determine based on) one or more of the following (e.g., one or more of the following or a function of the following exceeding a threshold): signal strengths or signal qualities of nearby base-stations, quality of nearby sinks and relays, quantity of nearby sinks and relays, battery life, source of power, average throughput, bandwidth usage, bandwidth needs, bandwidth availability, type of device, level of mobility, time of day, subscription fees, user profile, non-cellular signal strength and quality, cellular signal strength and quality, level of wireless interference seen by a non-cellular interface, level of wireless interference seen by a cellular interface, number of hops to a sink, surrounding wireless environment, history of throughput through various direct and indirect routes to the cellular network, and feedback from nearby wireless devices. In some embodiments, feedback from nearby wireless devices may be fed into distributed algorithms and protocols, which in some embodiments may determine routing without global knowledge of the state of every wireless device in the cell or within a certain range. Moreover, in some systems, such feedback only provide indications to the device, and the device may still be able to make an independent hopping decision to mitigate cell-edge user interference (e.g., based on the indications and other factors). However, in certain systems, distributed approaches could also be overly cautious and suffer from false alarms. Thus, loose co-ordination with base-stations may be useful in certain implementations even when wireless devices use their non-cellular interfaces to communicate with base-stations; principles of the present invention, in certain embodiments, accommodate such co-ordination to further enhance the coverage and the capacity of cellular networks.

In some networks, a variety of wireless devices communicate with cellular base-stations, and the number of such devices is expected to increase in the future. Current and expected future single-hop cellular networks may not be adequate to support the increasing demand for better coverage and capacity. However, in some of the presently described embodiments, devices could leverage each other's capabilities to use the cellular system more efficiently in order to satisfy their demands for better coverage and capacity. One way for devices to make efficient use of the cellular system resources is to employ multi-hopping when seen as beneficial. Each device may be able to decide on its own to participate in multi-hopping for inter-device hopping to function properly.

Tight centralized control in a multi-hop cellular network may be exercised, but reduces the performance of individual devices in many systems. This is because a centralized controller likely will not know everything about all wireless devices at all times without incurring a tremendous amount of overhead. Overheads themselves consume wireless spectrum and resources of the cellular system. Thus, tight centralized control of hopping decisions is expected to adversely affect the performance of multi-hop cellular systems. However, certain embodiments of the present invention facilitate a multi-hop cellular system where the tight centralized control only extends to the cellular interfaces of the devices that are communicating to a cellular base-station via their cellular interfaces. Depending on their state, situations, and surroundings, the wireless devices themselves may make inter-device hopping decisions in a decentralized manner. A wireless device may receive some assistance from the base-station when making hopping decisions, but this is not necessary in all embodiments.

Although the hybrid approach (mix of centralized and distributed control) used in embodiments of the present invention is expected to make, in some systems, multi-hop cellular networks more scalable and efficient, the overall performance of multi-hop cellular networks can be further enhanced, it is believed, by using distributed routing, device management, adaptive scheduling, and other distributed algorithms. Examples of these techniques are described below and can be extended to other kinds of wireless networks, such as single-hop cellular networks, multi-hop cellular networks, peer-to-peer single-hop networks, peer-to-peer multi-hop networks, wireless ad-hoc networks, wireless mesh networks, etc. Herein, the phrases cellular base-station and cellular tower are used interchangeably.

In another embodiment of the present invention, a method for routing in a wireless network is provided. The method may include a first wireless terminal choosing to (e.g., determining whether to) participate as a router. The method further includes the first wireless terminal deciding whether it will act as a relay or a sink. In addition, the method further includes a second wireless terminal choosing to send data to the first wireless terminal based on whether the first wireless terminal is acting as a relay or a sink. The first wireless terminal may also transmit a first metric describing cellular signal strength and quality seen by a nearby sink if acting as a relay. The first wireless terminal may also transmit a second metric describing cellular signal strength and quality seen by the first wireless terminal if acting as a sink.

The above-described embodiment may allow nearby wireless terminals to route packets to sinks via relays in a distributed manner. This is because, in some systems, each wireless terminal independently decides whether to act as a relay or a sink based on certain factors. For example, the first wireless terminal may choose to participate as a router based on at least one of the following factors: quality of nearby sinks and relays, quantity of nearby sinks and relays, battery life, source of power, average throughput, bandwidth usage, bandwidth needs, bandwidth availability, type of device, level of mobility, time of day, subscription fees, user profile, non-cellular signal strength and quality, cellular signal strength and quality, level of wireless interference seen by a non-cellular interface, level of wireless interference seen by a cellular interface, number of hops to a sink, and surrounding wireless environment. For example, each of, or a subset of, these factors may be compared against respective threshold values and if a factor exceeds the threshold, the first wireless terminal may act as a router and if the threshold is not met, the first wireless terminal may not act as a router.

Moreover, the first wireless terminal may determine whether it will act as a relay or a sink based on at least one of the following factors: quality of nearby sinks and relays, quantity of nearby sinks and relays, battery life, source of power, average throughput, bandwidth usage, bandwidth needs, bandwidth availability, type of device, level of mobility, time of day, subscription fees, user profile, non-cellular signal strength and quality, cellular signal strength and quality, level of wireless interference seen by a non-cellular interface, level of wireless interference seen by a cellular interface, number of hops to a sink, and surrounding wireless environment. For example, each of, or a subset of, these factors may be compared against respective threshold values and if a factor satisfies the threshold, the first wireless terminal may act as a sink and if the threshold is not met, the first wireless terminal may act as a relay.

Furthermore, the second wireless terminal may determine whether to send data to the first wireless terminal based on at least one of the following factors: whether the first wireless terminal is acting as a relay or a sink, quality of nearby sinks and relays, quantity of nearby sinks and relays, battery life, source of power, average throughput, bandwidth usage, bandwidth needs, bandwidth availability, type of device, level of mobility, time of day, subscription fees, user profile, non-cellular signal strength and quality, cellular signal strength and quality, level of wireless interference seen by a non-cellular interface, level of wireless interference seen by a cellular interface, number of hops to a sink, and surrounding wireless environment. For example, each of, or a subset of, these factors may be compared against respective threshold values and if a factor satisfies the threshold, the second wireless terminal may send data to the first wireless terminal and if the threshold is not met, the second wireless terminal may not send data to the first wireless terminal.

Figure 5:
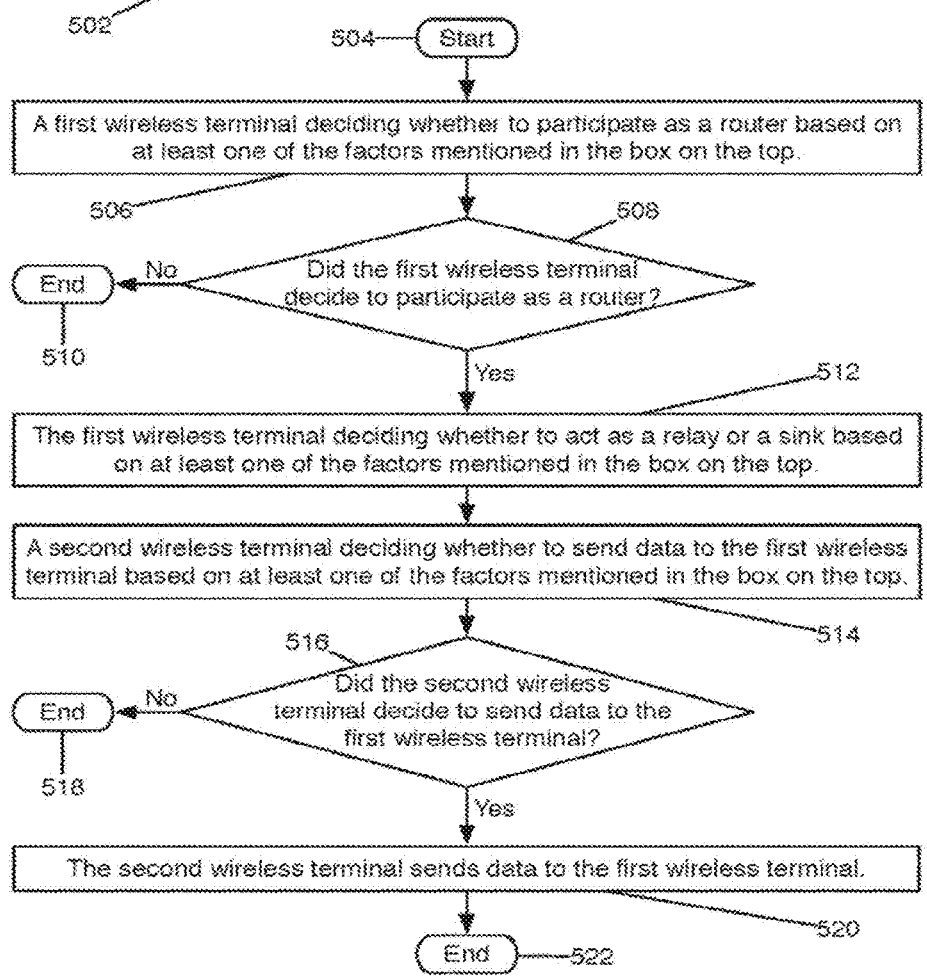
FIG. 5 is a flowchart of an example of a method for routing in a wireless network in accordance with an embodiment of the present invention.

FIG. 5 is a flowchart of a method for routing data through a wireless network in accordance with an embodiment of the present invention. In step 506, a first wireless terminal determines whether to participate as a router based on at least one of the factors mentioned in step 502. In step 508, the first wireless terminal makes the corresponding determination. If the first wireless decides to act as a router, in step 512 the first wireless terminal further determines whether it will act as a relay or a sink based on at least one of the factors mentioned in step 502. In step 514, a second wireless terminal determines whether to send data to the first wireless terminal based on at least one of the factors mentioned in step 502. In step 516, the second wireless terminal makes the corresponding determination. If the second wireless terminal decides to send data to the first wireless terminal, it does so in step 520.

In certain embodiments, a sink may be an end-destination or a gateway to an adjoining network. For example, a first wireless device may be communicating with a second wireless device via its (the first wireless device's) non-cellular interface and communicating with a cellular tower via its (the first wireless device's) cellular interface. If the second wireless device wants to communicate to the cellular network via the first wireless device, the first wireless device is a sink for the second wireless device because it acts as a gateway to the cellular network. Another example includes a third wireless device sending packets destined for a fourth wireless device in a peer-to-peer setting. In this example, the fourth wireless device is a sink for the third wireless device because it is the end destination for the packets originated by the third wireless device. It should be noted that the definition of a sink is contextual. It depends on the wireless device that originates packets.

In certain embodiments, a relay is an intermediate node in the route from a wireless device to a sink. For example, a first wireless device may send packets destined for a third wireless device via a second wireless device. The second wireless device is a relay for the first wireless device when relaying packets originated by the first wireless device to the third wireless device. There may be one or more relays in a route from an originating device to a sink. It should be noted that the definition of a relay is contextual. It depends on the wireless device that originates packets.

In certain embodiments, a wireless device may determine whether to act as a sink or a relay depending on the quality and quantity of nearby sinks and relays. For example, in a location where low cellular signal strength and quality is experienced by most wireless devices, a wireless device that gets moderate cellular signal strength and quality from the cellular towers may determine whether to act like a sink to help other wireless devices access the cellular network in a more efficient manner. In a location where moderate cellular signal strength and quality is experienced by most wireless devices, a wireless device that gets moderate cellular signal strength and quality from the cellular towers may decide to act like a relay instead.

In certain embodiments, a wireless device may determine whether to act as a router only when it has enough battery life available or when it is plugged into AC power. A wireless device that has multiple antennas and other circuitry that helps it communicate efficiently with an adjoining network, such as a cellular network, may determine to be a sink for other less sophisticated nearby devices. A wireless device may determine to act as a router, relay, and/or sink based on whether (e.g., if—i.e., if or if and only if) it has enough bandwidth available and/or if it can support reasonable throughputs for other devices. Other device-based factors and environment-based factors could also help wireless devices decide whether to act as a router, relay, and/or sink.

A wireless device may, in some systems, choose one relay/sink over another based on the factors mentioned above. Some of these factors enhance user experience by taking into account user-based factors such as bandwidth needs and network-based factors such as average throughput. Using such factors can help the wireless device choose good routes to an adjoining network. For example, a wireless device may determine whether to communicate indirectly with a cellular tower via multiple-hops instead of over a single-hop because the average throughput for the multi-hop route is higher. When the average throughput for the multi-hop route is lower, the device may revert to using the single-hop connection to increase the likelihood of a good user experience.

One application of certain embodiments arises in multi-hop cellular networks. A relay (or intermediate node) may occasionally transmit a metric describing cellular signal strength and quality seen by a nearby sink. It may also transmit other data descriptive of the desirability of a potential connection, such as number of hops to a wireless sink and its own device state. Moreover, a sink (gateway node) may occasionally transmit a metric describing cellular signal strength and quality seen by the sink. It may also transmit other useful data, such as number of hops to a wireless sink and its own device state. Such information can help originating nodes find routes to sinks via relays in a distributed manner. The metrics may be transmitted via periodic beaconing (e.g. IEEE 802.11 access points) or via distributed beaconing (e.g. IEEE 802.11 ad-hoc devices).

In another embodiment of the present invention, a method for improving the performance of a wireless network is provided. The method may include a wireless terminal choosing a deterministic schedule for transmitting a first type of data and a randomized schedule for transmitting a second type of data. The wireless terminal may select a deterministic schedule for transmitting the first type of data and a randomized schedule for transmitting the second type of data, wherein the choice of schedule may be based on at least one of the following factors: schedules of nearby devices, queue-lengths, quality of nearby sinks and relays, quantity of nearby sinks and relays, battery life, source of power, average throughput, bandwidth usage, bandwidth needs, bandwidth availability, type of device, level of mobility, time of day, subscription fees, user profile, non-cellular signal strength and quality, cellular signal strength and quality, level of wireless interference seen by a non-cellular interface, level of wireless interference seen by a cellular interface, number of hops to a sink, and surrounding wireless environment.

In the above embodiment, the wireless terminal may select a deterministic schedule for transmitting the first type of data and a randomized schedule for transmitting the second type of data, wherein the type of data is based on at least one of the following factors: direction, quantity, importance, desired quality-of-service, surrounding wireless environment, network congestion, network condition, queue-lengths, and throughput. For example, each of, or a subset of, these factors may be compared against respective threshold values or categories and if a factor satisfies the threshold or falls in the category, the device may select a deterministic schedule and if the threshold is not met or the category is not applicable, the device may choose a random schedule. Direction could be either uplink or downlink. Quantity could be defined in terms of bandwidth utilized, bandwidth needed, and queue-lengths, depending on the application. Quality-of-service depends on the application being supported. For example, delay sensitive applications such as voice could benefit from a more deterministic schedule and file transfers could use a randomized schedule when not too many deterministic slots are available. Surrounding wireless environment could include the topology, prevalent traffic patterns, activity factors, schedules, numbers, needs, and capabilities of nearby nodes. The surrounding wireless environment may also include network factors, such as the amount of congestion in the network and the condition of the network in terms of latency, delay, and jitter.

In the above embodiment, the wireless terminal may select a deterministic schedule and a first inter-frame spacing for transmitting the first type of data. The wireless terminal could also choose a randomized schedule and a second inter-frame spacing for transmitting the second type of data. Inter-frame spacing is the delay between the previous frame and the next transmission. The IEEE 802.11n standard defines examples of inter-frame spacing (IFS) in detail.

In the above embodiment, the wireless terminal may select a deterministic schedule and a first contention window for transmitting the first type of data. The wireless terminal may select a randomized schedule and a second contention window for transmitting the second type of data. Contention window is an interval of numbers from which counters can be chosen to resolve contentions and collisions between wireless devices. The IEEE 802.11n standard describes examples of contention window in detail.

In the above embodiment, the wireless terminal may select a deterministic schedule and a first transmit opportunity for transmitting the first type of data. The wireless terminal may select a randomized schedule and a second transmit opportunity for transmitting the second type of data. Transmit opportunity is the time for which a wireless device gets to access the wireless channel and transmit frames. Transmit opportunity could also be measured in bits and bytes instead of units of time. The IEEE 802.11n standard describes examples of transmit opportunity in detail.

Figure 16:
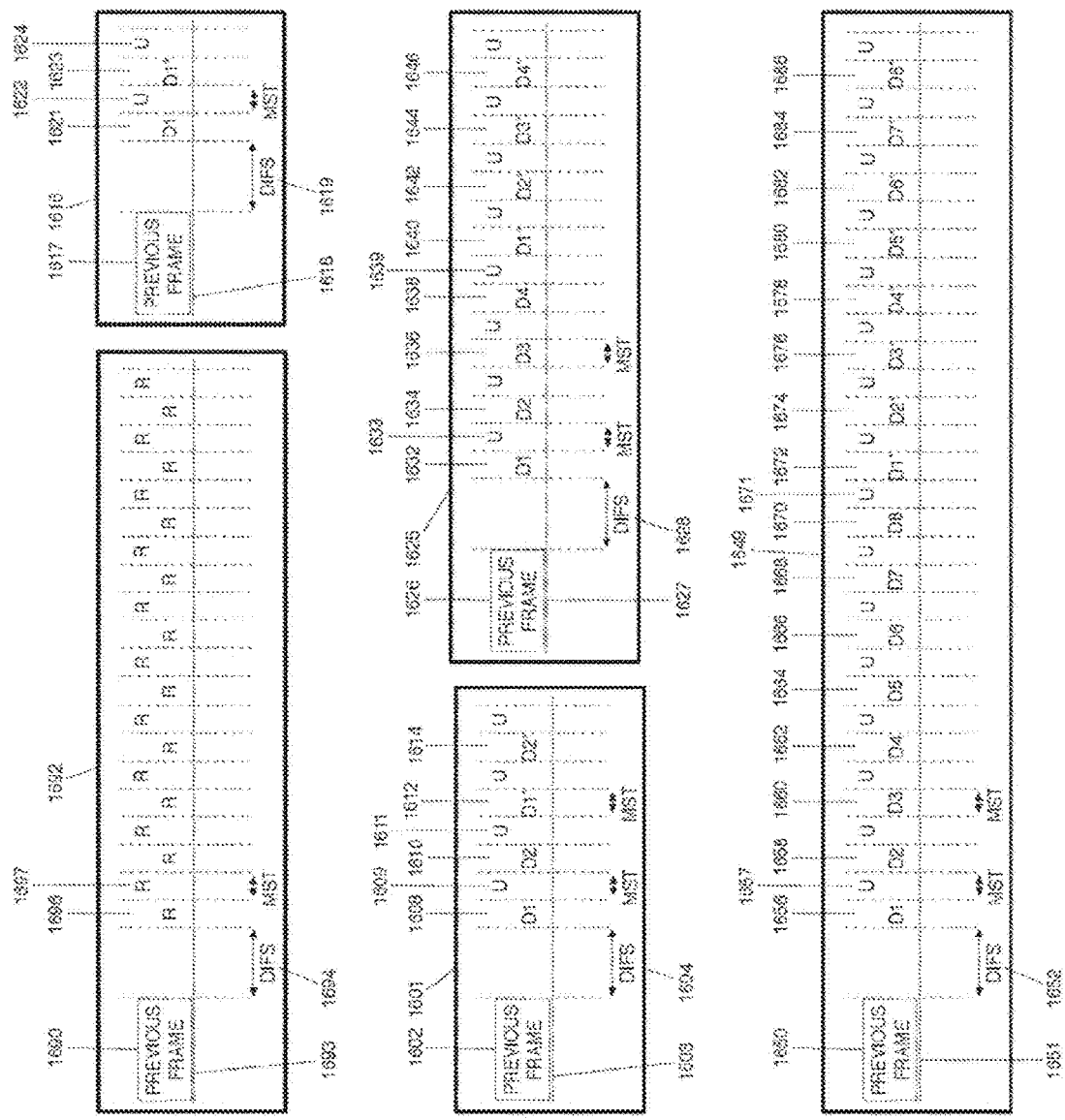
FIG. 16 is a diagrammatic view of an example of wireless transmissions by wireless terminals in accordance with an embodiment of the present invention.

FIG. 16 is a generalized diagrammatic view of an example of wireless transmissions by wireless terminals in accordance with an embodiment of the present invention. In particular the figure shows example schedules. Schedule 1692 is based on a contention resolution mechanism known as exponential randomized back-off (ERB). Timeline 1693 shows the progression of time. Previous frame 1690 may be a data, control, or management frame. A distributed-IFS (DIFS) 1694 separates the previous frame and the first mini-slot 1696. Each mini-slot is mini-slot-time (MST) long in duration. When a wireless device needs to transmit a frame on the wireless channel, the device of this example selects a random (e.g., a pseudo-random function) counter and counts it down each time MST elapses. In some embodiments, a wireless device may only count down its counter when the device perceives the wireless channel to be available or clear. In contrast to schedule 1692, schedule 1649 is asymmetric and can schedule different data in different ways. First mini-slot 1656 is reserved for a first downlink transmitter. Second mini-slot 1657, in this example, is available for any wireless device to use. Thus, every odd mini-slot of the present example is reserved for one or few transmitters of downlink frames. This is believed to allow for various transmitters of downlink frames to use a more deterministic schedule. However, in some systems, any wireless device can access the channel in every even mini-slot. To resolve contentions and collisions, wireless devices could use ERB. This, in certain applications, is believed to make wireless devices transmitting in even mini-slots to have a randomized schedule. Wireless devices could use the even mini-slots to transmit uplink frames. Instead of differentiating traffic based on uplink and downlink directions, traffic may be differentiated based quantity, importance, desired quality-of-service, surrounding wireless environment, network congestion, network condition, queue-lengths, and throughput. Note that mini-slot 1656 is labeled D1 and mini-slot 1672 is labeled D1*. The * indicates that D1* is an extra slot for the downlink transmitter that uses D1. One way to facilitate fairness between transmitters of downlink frames is to require the following. After using mini-slot D1, the first downlink transmitter in this example must either wait for the current round of downlink transmissions to finish or use D1*. Since D1* comes after D8, the downlink transmitter corresponding to D8 is believed to get access to the wireless channel in a fair manner. Moreover, the overhead of a few MSTs to ensure this fairness is believed to not hurt the performance much. If the first downlink transmitter uses D1*, it may not use D1 in the next round of downlink transmissions. Thus, the first downlink transmitter is believed to be fair to other downlink transmitters. Once an extra downlink slot (marked with a *) is used by a wireless device, other wireless devices can, in this example, assume that the current round of downlink transmissions is over and the next round is about to begin. In the next round, wireless devices can use their normal downlink slots (i.e. slots without a *) to transmit frames. Schedules 1601 and 1625 are other asymmetric schedules that can also be used.

FIG. 18 is a generalized diagrammatic view of examples of wireless network topologies in accordance with an embodiment of the present invention. FIG. 18A is an example of a 2-dimensional single-hop topology. Each cube, such as cube 1812, represents a base-station and the wireless network surrounding it. If base-stations in adjacent cubes use the same network resources at the same time, they will interfere with each other due to collisions. To achieve a certain level of performance, adjacent base-stations can be orthogonalized in time, frequency, code, space, etc. FIG. 18A shows that 4 orthogonalizations could provide a certain level of performance and keep the cross-interference between nearby base-stations under an acceptable threshold limit. Orthogonalizations 1804, 1806, and 1810 are shown using different patterns to reflect their use of different network resources. FIG. 18B is an example of a 2-dimensional multi-hop topology. Each parallelepiped, such as parallelepiped 1828, represents a linear multi-hop network consisting of three or more wireless terminals. If wireless terminals in adjacent parallelepiped use the same network resources at the same time, they may interfere with each other due to collisions. To achieve a certain level of performance, adjacent wireless terminals can be orthogonalized in time, frequency, code, space, etc. FIG. 18B shows that 2 orthogonalizations could provide reasonable performance and keep the cross-interference between nearby wireless terminals under a reasonable limit. Orthogonalizations 1824 and 1826 are shown using different patterns because they try to use different network resources. FIG. 18C is a common 3-dimensional single-hop topology and uses 8 different orthogonalizations. FIG. 18D is a common 3-dimensional multi-hop topology and uses 4 different orthogonalizations. In wireless networks, spectrum is often limited. Thus, excessive orthogonalizations are expected to, in some scenarious, hurt the overall capacity and spectral efficiency of the wireless network. However, too few orthogonalizations may lead to excessive interference/collisions and may hurt overall performance. FIG. 18 represents one way to strike a balance and is believed to achieve reasonable performance. Asymmetric schedules 1601, 1625, and 1649 shown in FIG. 16 have 2, 4, and 8 orthogonal downlink slots; thus they may be used for the common topologies shown in FIG. 18 to facilitate cooperation and coexistence between wireless terminals. When downlink slots of asymmetric schedules in FIG. 16 are assigned to segments of the topologies shown in FIG. 18, one may take into account the relative positions of the segments and assign downlink slots accordingly. For example, segments of topologies that will be prone to cell-edge user problems or hidden node problems can be separated further apart in the asymmetric downlink schedule. This may allow enough control frames (such as IEEE 802.11 RTS/CTS frames) to be exchanged to mitigate the cell-edge user and hidden node problems.

Figure 6:
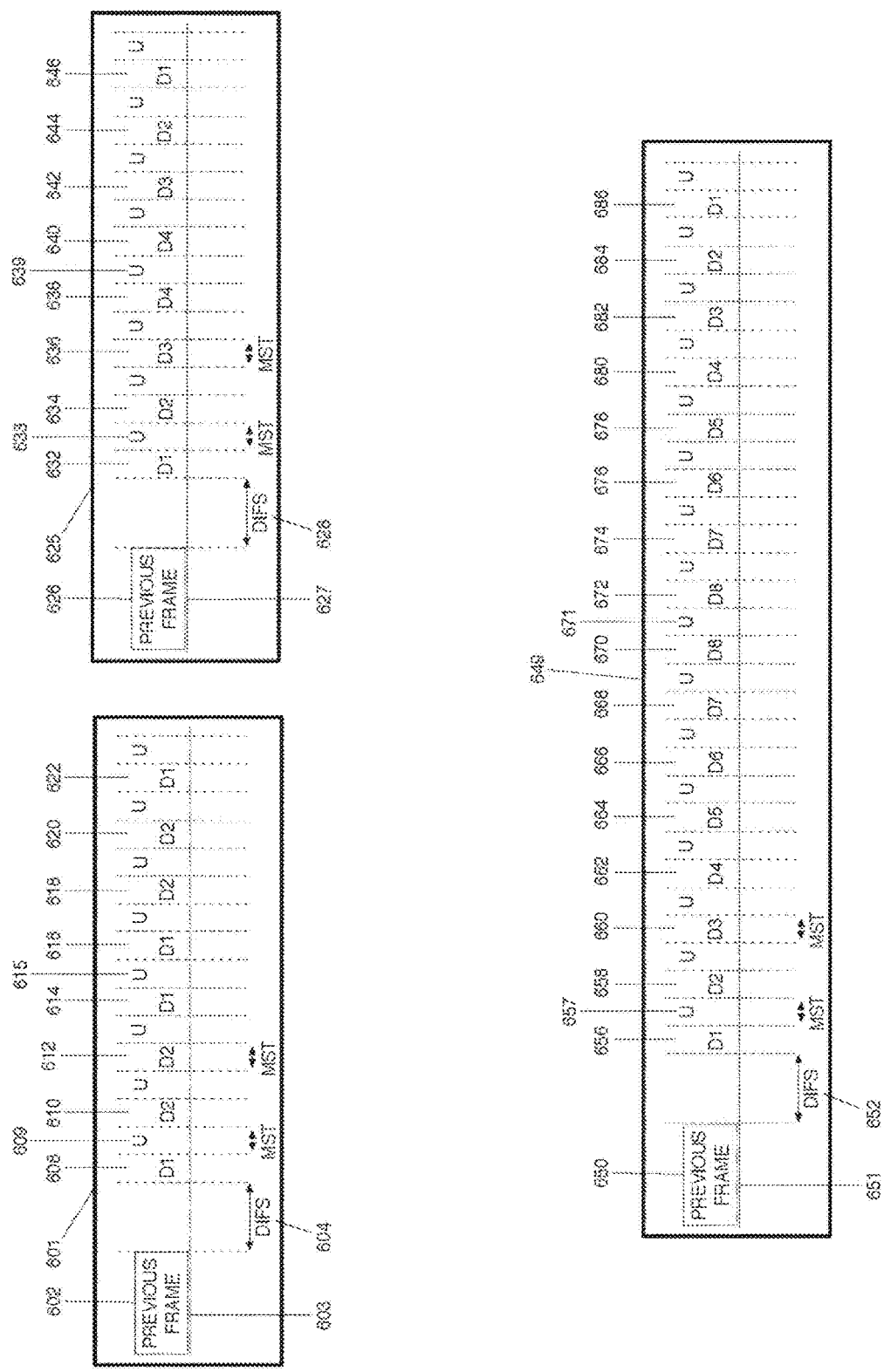
FIG. 6 is a diagrammatic view of an example of wireless transmissions by wireless terminals in accordance with an embodiment of the present invention.
Figure 7A:
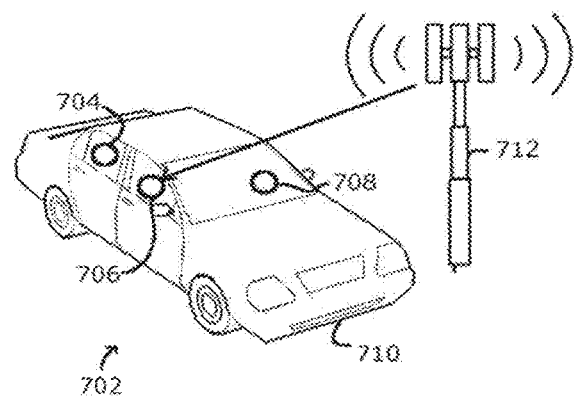
FIGS. 7A-7D are diagrammatic views of an example of a cell in a cellular network where wireless devices in the cell have the ability to cooperate with each other and the base station via multi-hopping in accordance with an embodiment of the present invention.
Figure 7B:
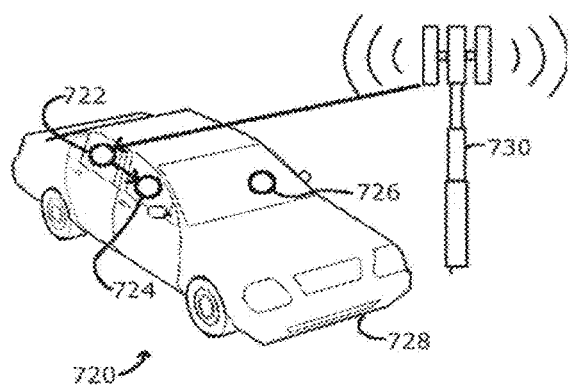
Figure 7C:
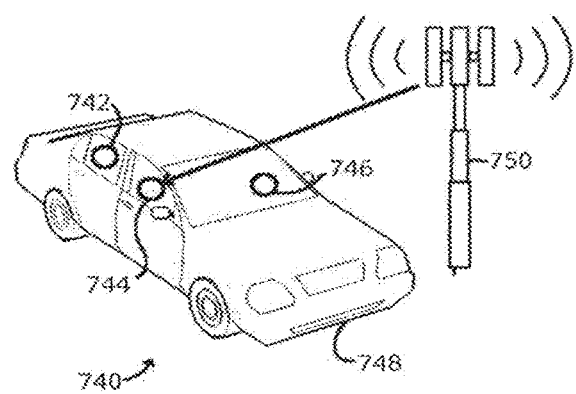
Figure 7D:
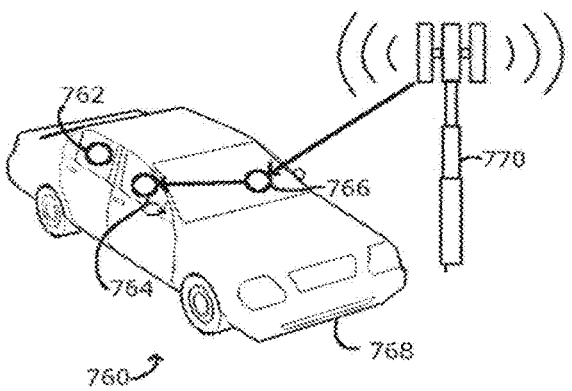

FIG. 6 is a generalized diagrammatic view of wireless transmissions by wireless terminals in accordance with an embodiment of the present invention. Schedules 601, 625, and 649 are some other examples of asymmetric schedules. These differ from asymmetric schedules shown in FIG. 16 in that they do not rely on extra downlink slots (* marked) to facilitate fairness. These schedules could be more suitable in certain situations.

Figure 17:
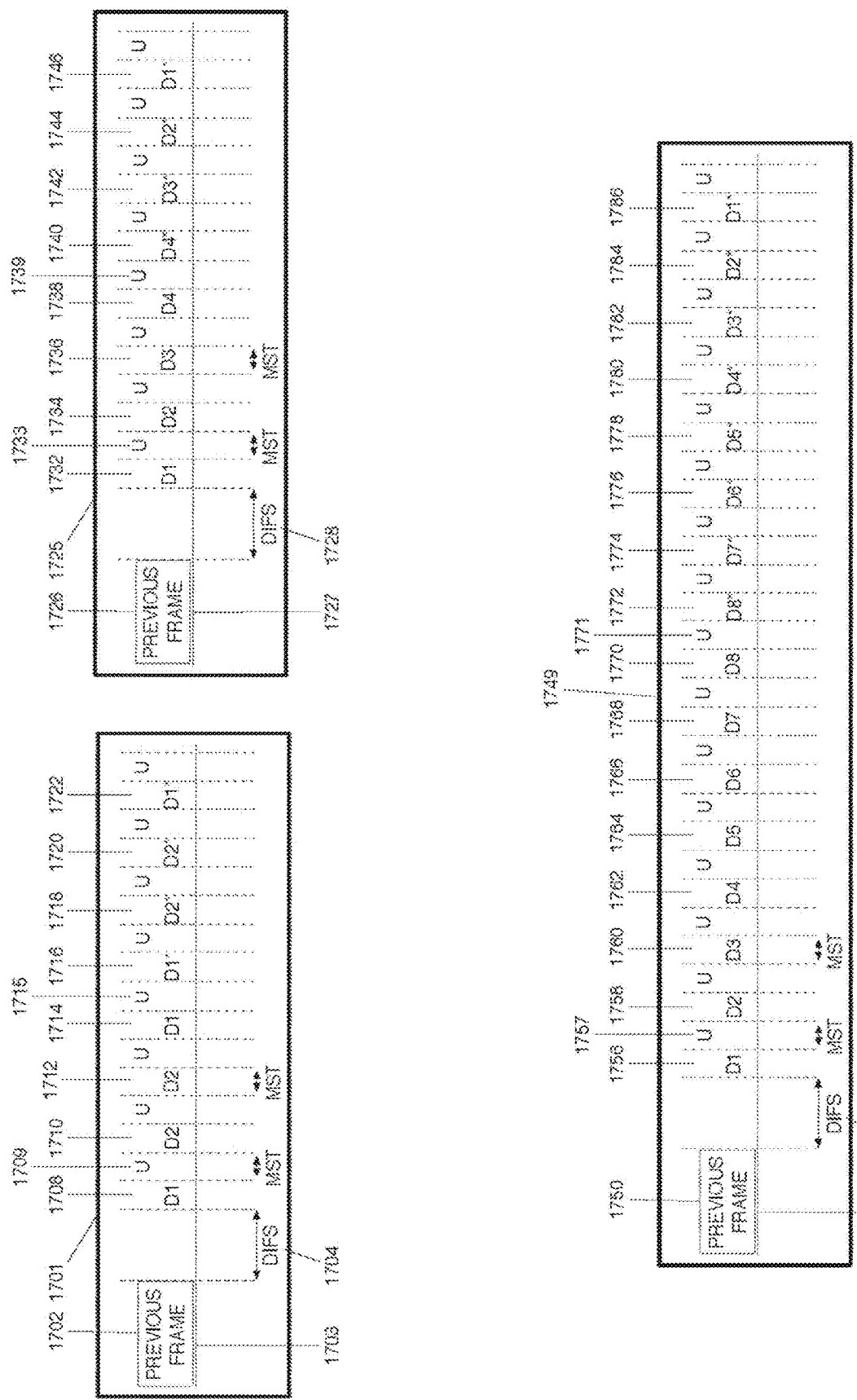
FIG. 17 is a diagrammatic view of an example of wireless transmissions by wireless terminals in accordance with an embodiment of the present invention.
Figure 18A:
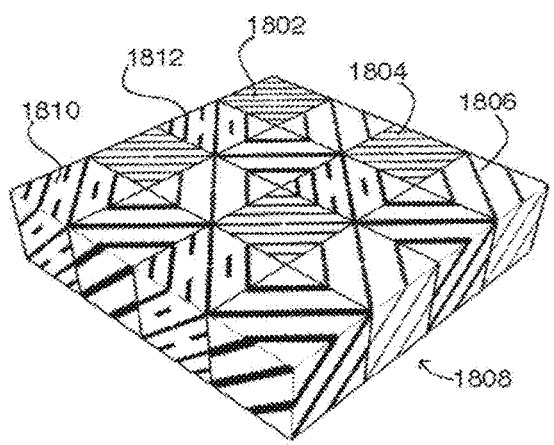
FIGS. 18A-18D are diagrammatic views of examples of wireless network topologies in accordance with an embodiment of the present invention.
Figure 18B:
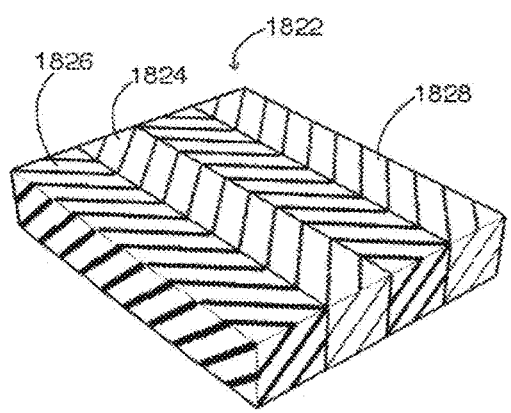
Figure 18C:
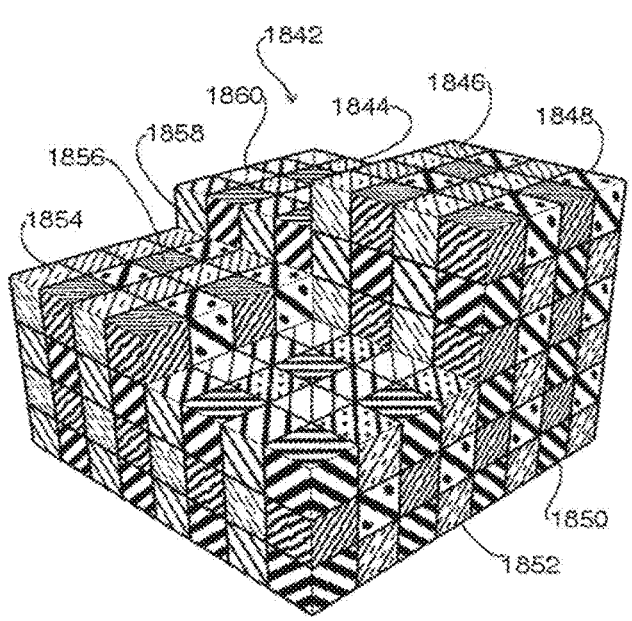
Figure 18D:
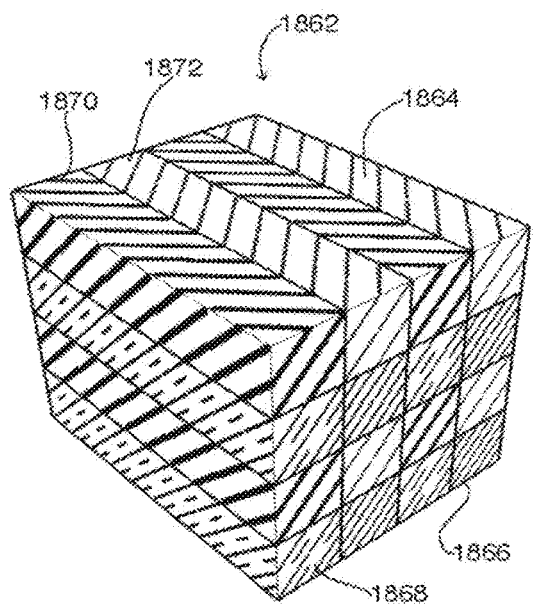

FIG. 17 is a generalized diagrammatic view of wireless transmissions by wireless terminals in accordance with an embodiment of the present invention. Schedules 1701, 1725, and 1749 are some other examples of asymmetric schedules. These may be thought of as a hybrid mix of schedules shown in FIG. 6 and FIG. 16. These schedules could be more suitable in certain situations.

Figure 19:
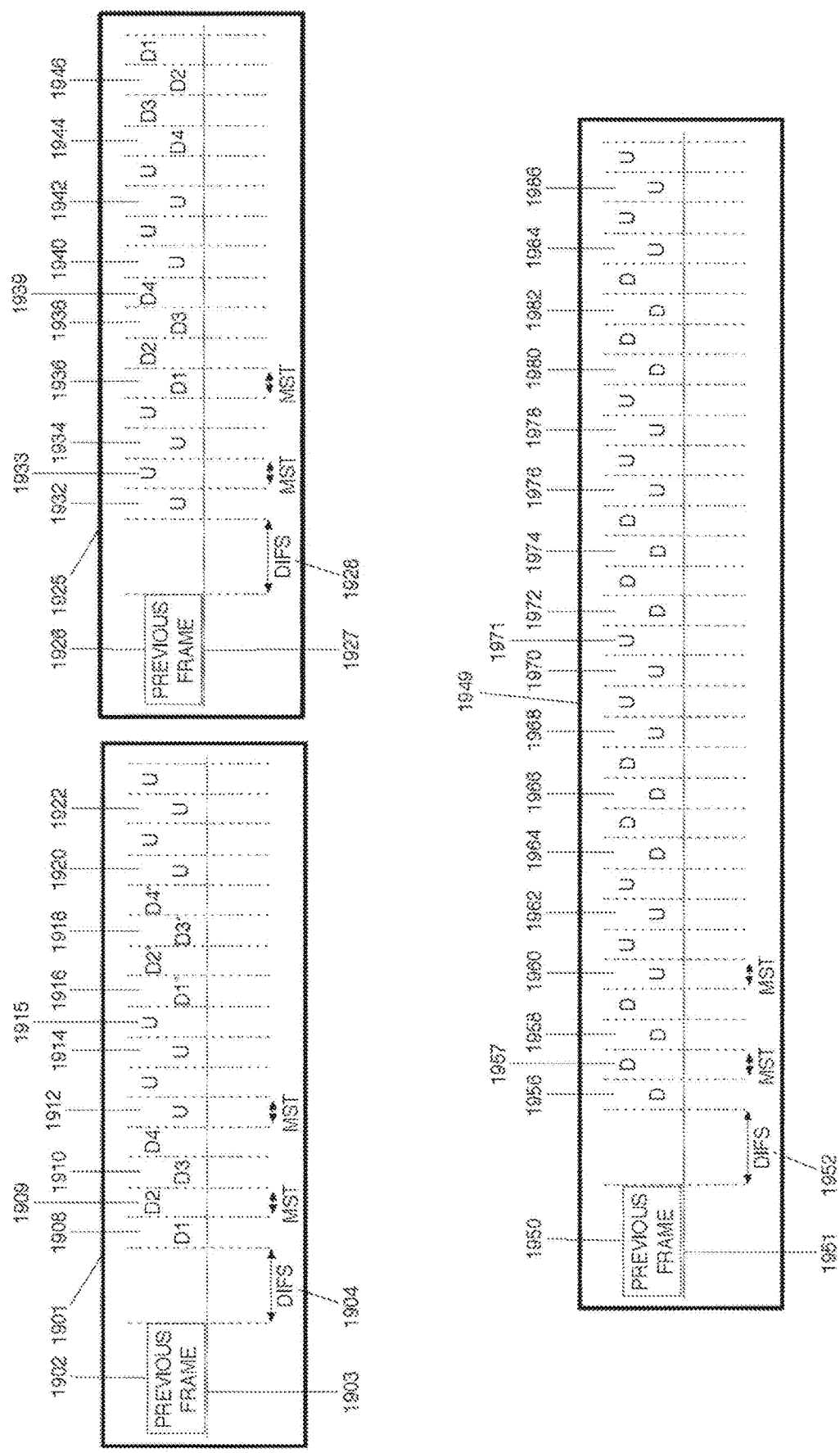
FIG. 19 is a diagrammatic view of an example of wireless transmissions by wireless terminals in accordance with an embodiment of the present invention.

FIG. 19 is a generalized diagrammatic view of wireless transmissions by wireless terminals in accordance with an embodiment of the present invention. Schedules 1901, 1925, and 1949 are some other examples of asymmetric schedules. Schedule 1901 shows that downlink and uplink mini-slots do not have to be interleaved like the downlink and uplink mini-slots of schedules in FIG. 16. However, to exploit asymmetry in topologies and traffic patterns, downlink and uplink can be decoupled in the way shown in schedule 1901. Moreover, uplink mini-slots could have a lower inter-frame spacing in schedules such as 1925. Lastly, in some embodiments, downlink schedules do not have to be deterministic in order to get reasonable performance. For instance, in some systems, as long as they are decoupled, both uplink and downlink transmissions could be randomized as is shown in schedule 1949. Schedules shown in FIG. 19 could be more suitable in certain situations.

Using the above examples, wireless terminals may adaptively switch from one schedule to another schedule depending on topology, number, schedules, needs, activity, and traffic patterns of other nearby wireless terminals. Beacon frames, control frames, management frames, data frames, or other wireless communication signaling may be used to provide topology, number, schedules, needs, activity, and traffic patterns of a first wireless terminal to a second wireless terminal. Moreover, wireless terminals may cooperate and coordinate to converge to one or more schedules based on at least one of the following factors: quality of nearby sinks and relays, quantity of nearby sinks and relays, battery life, source of power, average throughput, bandwidth usage, bandwidth needs, bandwidth availability, type of device, level of mobility, time of day, subscription fees, user profile, non-cellular signal strength and quality, cellular signal strength and quality, level of wireless interference seen by a non-cellular interface, level of wireless interference seen by a cellular interface, number of hops to a sink, current state of the second wireless terminal, current state of the first wireless terminal, participation policy being used by the second wireless terminal, participation policy being used by the first wireless terminal, and surrounding wireless environment. Request (REQ) frames use a different inter-frame-spacing than other frames. REQ frames may be used by nearby nodes to get a node to use ERB scheduling or use a less aggressive schedule. A node may crowd-source REQ frames from nearby nodes before taking action. This, in some systems, is expected to increase robustness, performance, and cooperation. When asymmetric scheduling does not lead to good performance and throughput, wireless terminals may adaptively fall back to using exponential randomized back-off scheduling. Depending on their needs and current network conditions, wireless terminals could adaptively switch to normal, conservative, or aggressive schedules. Schedule 1601 could be considered more aggressive than schedule 1649 in FIG. 16 because wireless terminals could potentially get deterministic slots to transmit more frequently in Schedule 1601. Moreover, higher transmit opportunities (TXOP) may be provided to nodes that need more bandwidth. In this way, nodes using deterministic slots could get different priorities by using different TXOPs. Wireless terminals employing TXOP often use a cyclic-redundancy-check for each fragment even when fragments are continuously burst out or are burst out with a separation of reduced-IFS (RIFS). This may improve robustness, especially for higher physical-layer rates because more bytes are sent through while using the same number of symbols (or TXOP time). When interfering deterministic flows are allowed to happen in parallel, flows using higher physical-layer rates can transmit more number of bytes in the same amount of time than flows using lower physical-layer rates. Thus, more frame aggregation could be needed for flows using higher physical-layer rates when employing TXOP. Thus, having more frequent CRC checks for flows using higher physical-layer rates could be useful.

The above embodiment may benefit if the first type of data is decoupled from the second type of data. For example, wireless networks that are used to access the Internet could have two types of data or traffic: downlink traffic and uplink traffic. Transmitters of downlink traffic may often be fewer in number than transmitters of uplink traffic. For example, one wireless base-station could be serving several wireless devices. In this example, the downlink direction is from the wireless base-station to the wireless devices and the uplink direction is from the wireless devices to the wireless base-station. Although there may often be fewer transmitters of downlink traffic, downlink Internet traffic may often be heavier than uplink Internet traffic.

The above embodiment may allow nodes in the wireless network to decouple the plane of competition between uplink and downlink traffic. As a result, uplink traffic may compete with other uplink traffic and downlink traffic may compete with other downlink traffic for access to the wireless channel. Moreover, the few downlink transmitters may then coordinate and cooperate with each other to coexist on the same wireless channel. Furthermore, adding determinism to scheduling of downlink frames may reduce contentions and collisions between transmitters of downlink frames. Also, determinism may further reduce the penalties and overheads associated with retransmissions. Lastly, determinism may allow more downlink flows to happen in parallel, allowing downlink transmitters to use the available network resources more aggressively and efficiently.

Uplink Internet traffic may often be less heavier than downlink Internet traffic. Moreover, the number of transmitters of uplink traffic may often be more than the number of transmitters of downlink traffic. Thus, it may be harder to coordinate the several transmitters of uplink traffic in a distributed manner with low overhead. ERB may be used to resolve contentions and collisions between transmitters of uplink traffic in a simple and distributed manner. Moreover, since uplink traffic flows may often be less heavy, wireless devices are believed to not suffer from the disadvantages of ERB that occur during high traffic congestion. Thus, the above embodiment could be useful in wireless networks that are used to access the Internet, such as single-hop wireless networks and multi-hop cellular networks.

As mentioned before, when heavier flows are scheduled more deterministically, better coordination and cooperation may be achieved between transmitters of downlink frames. This coordination and cooperation may then be used to allow multiple interfering transmissions to happen in parallel to improve the performance of wireless networks. Additionally, the above embodiment may be used to mitigate hidden node problems by exploiting the determinism of heavier flows.

Figure 20:
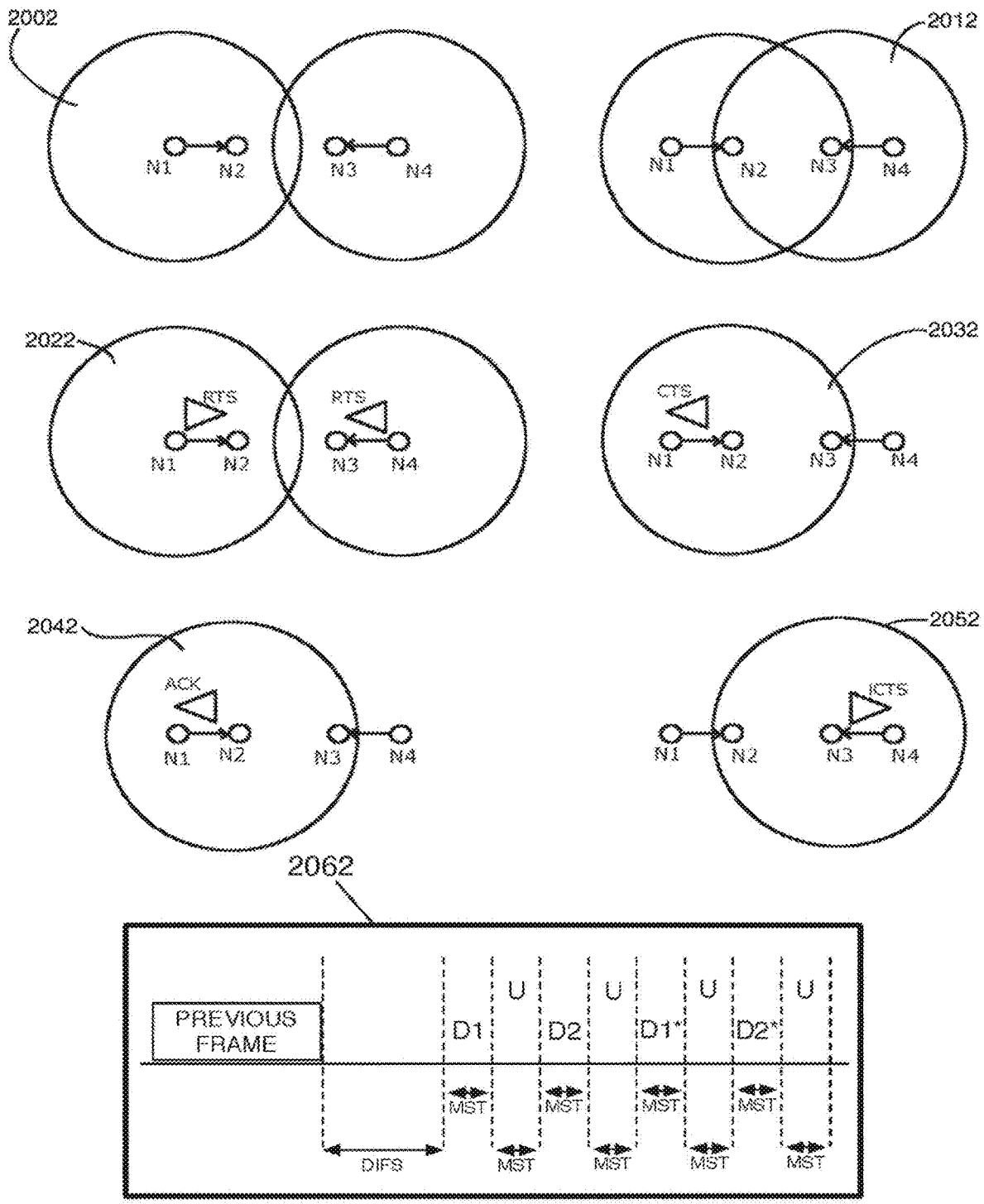
FIG. 20 is a diagrammatic view of an example of wireless transmissions by wireless terminals in accordance with an embodiment of the present invention.
Figure 21:
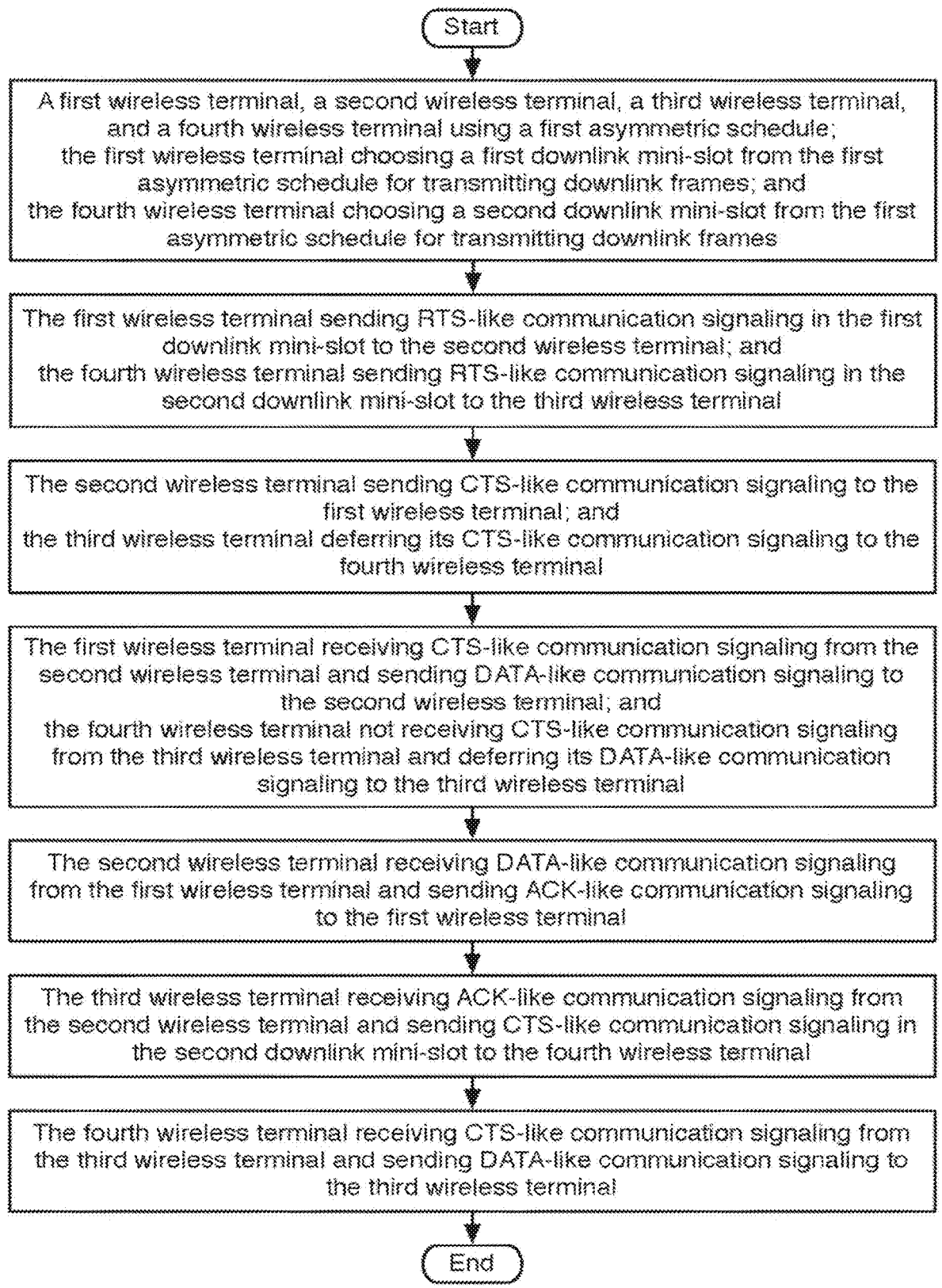
FIG. 21 is a flowchart of a process for communicating across a multi-hop network.

FIG. 20 is a generalized diagrammatic view of wireless transmissions by wireless terminals in accordance with an embodiment of the present invention, and FIG. 21 illustrates a process by which some of these wireless transmissions may occur. In FIG. 20, N1, N2, N3, and N4 represent four different wireless terminals wirelessly communicating in different wireless environments and use cases. In particular, FIG. 20 describes the hidden node problem and how it could be mitigated. FIG. 20 depicts an example scenario; however, the described techniques could easily be applied to other scenarios. Event 2002 shows that wireless terminal N1 can, in the illustrated example, only be heard by wireless terminal N2 (as indicated by the circle around wireless terminal N1 [e.g., circle around wireless terminal N1 may indicate the broadcast range of N1; circle around wireless terminal N1 may indicate the range within which transmissions from N1 can be carrier-sensed by other wireless terminals; etc.]) and wireless terminal N4 can, in the illustrated example, only be heard by wireless terminal N3 (as indicated by the circle around wireless terminal N4 [e.g., circle around wireless terminal N4 may indicate the broadcast range of N4; circle around wireless terminal N4 may indicate the range within which transmissions from N4 can be carrier-sensed by other wireless terminals; etc.]). Event 2012 shows that wireless terminal N2 can, in the illustrated example, be heard by wireless terminal N1 and wireless terminal N3 (as indicated by the circle around wireless terminal N2 [e.g., circle around wireless terminal N2 may indicate the broadcast range of N2; circle around wireless terminal N2 may indicate the range within which transmissions from N2 can be carrier-sensed by other wireless terminals; etc.]). Event 2012 also shows that wireless terminal N3 can, in the illustrated example, be heard by wireless terminal N2 and wireless terminal N4 (as indicated by the circle around wireless terminal N3 [e.g., circle around wireless terminal N3 may indicate the broadcast range of N3; circle around wireless terminal N3 may indicate the range within which transmissions from N3 can be carrier-sensed by other wireless terminals; etc.]). Thus, terminals N1 and N4 are hidden from one another, and each from N3 and N2, respectively. This relationship is potentially a problem, particularly when a medium is shared among the terminals N1, N2, N3, and N4, because terminals that are hidden from one another are at risk of transmitting with the same resources as a given terminal, thereby causing signals to collide and potentially be lost by the receiving N1 and N4 are transmitters of downlink traffic (as indicated by the direction of arrows) and N2 and N3 are transmitters of uplink traffic. N1 uses the asymmetric schedule 2062 and has chosen the downlink mini-slot D1 to transmit downlink frames. N4 uses the asymmetric schedule 2062 and has chosen the downlink mini-slot D2 to transmit downlink frames. request-to-send (RTS) wireless signal from the transmitter to a receiver, a signal which notifies the receiver that a transmitter wants to send (e.g., has data in an output buffer, causing it to transmit) something to (the receiver) in the near future. The receiver receives the RTS signal, and in response, determines whether the receiver can receive a transmission. If the receiver estimates that it can receive subsequent transmissions from the transmitter, the receiver, in response, transmits a clear-to-send (CTS) wireless signal to the transmitter. The transmitter may then, in response to the CTS signal, transmit data frames to the receiver. If (e.g., if and only if) the receiver receives the subsequent data frames correctly, it may transmit, in response, an acknowledgment (ACK) to the transmitter. This procedure is sometimes used by the IEEE 802.11n standard.

Event 2022 shows that N1 sends an RTS to N2 in mini-slot D1 and N4 sends an RTS to N3 in mini-slot D2 in accordance with previously described schedule 2062. Event 2032 shows that N2 sends (wirelessly transmits) a CTS to N1 after receiving the RTS. Note that, in this scenario, N2 is able to send a CTS to N1 before N3 can send a CTS to N4 because N2 receives its RTS before N3 receives its RTS. Both N3 and N1 receive the CTS signal from N2, and in response, N3 defers transmission of its CTS to N4 (and/or N3 transmits a wireless signal to N4 to indicate the presence of a potential hidden node) because it (N3) does not want to (e.g., is programmed or otherwise configured to avoid) interfere with the transmissions happening between N1 and N2. N3's cooperation thereby allows N1 to send data frames to N2.

Event 2042 shows that N2 sends an ACK wireless signal back to N1 after receiving data frame(s) correctly from N1, thereby acknowledging receipt. N3 takes its cue from this ACK and intelligently (in response to the ACK) sends a CTS back to N4 in deterministic downlink mini-slot D2 in event 2052. This intelligently delayed CTS is labeled as iCTS in event 2052 of FIG. 20. N4 receives this delayed CTS and resumes transmission of data frames that it has buffered for N3. Since N1 used D1, it must (in this embodiment) use downlink mini-slot D1* in the current round of downlink transmissions for any further downlink transmissions. Even if N1 sends out an RTS in D1*, N2 (e.g. a CTS-transmitter module inside N2) will (in this embodiment) delay (e.g., in response to overhearing an iCTS wireless signal sent by N3 to N4) its CTS (e.g., until N3 sends an ACK wireless signal back to N4 after receiving data frame(s) correctly from N4) to N1 (and/or N2 transmits a wireless signal to N1 to indicate the presence of a potential hidden node) in order to cooperate with N3 and prevent interfering with the transmissions happening between N4 and N3. This is similar to the cooperation from N3 in event 2032.

Thus, the example of FIG. 20 shows an example scenario in which the intelligent CTS helps mitigate hidden node problems. Please note that N1 is, in this example, hidden from N3 and N4 in the sense that N1 does not receive the RTS signal from N4 and the CTS signal from N3. Moreover, N4 is hidden from N2 and N1 in the same sense. Nonetheless, N1, N2, N3 and N4 are able to cooperate and coordinate using the intelligent CTS mechanism. Another thing to note is that the intelligent CTS mechanism benefits from (but is not limited to) the deterministic schedule being used for downlink frames by N1 and N4. When these downlink flows are heavy, hidden node problems may be mitigated for the flows that need more protection. Intelligent CTS-like wireless signals may not always be delayed. Sometimes they may be sent without delay but with an indication (e.g., a busy bit that is set, a wireless signal indicating the presence of a potential hidden node, etc.) that shows that currently the receiver cannot receive subsequent data frames. When a wireless terminal receives a CTS-like wireless signal with such an indication, it may try again later without getting penalized (e.g., by a collision resolution mechanism such as exponential randomized back-off [ERB]). Severe hidden node problems may exist even when only one flow is heavy. When the heavy flow is deterministically scheduled, intelligently timed CTS-like wireless signals (along with carrier-sensing) may be used to mitigate hidden node problems. Moreover, (in some embodiments) flows that suffer from hidden node problems may converge to a more deterministic schedule. Initially, RTS and CTS wireless signals may help in understanding the wireless environment and beacons (or beacon-like wireless signals) may help in estimating the topologies of nearby nodes. Once a deterministic scheduling strategy is established, use of RTS and CTS wireless signals may be adaptively reduced. Wireless terminals may be allowed to cooperate, coordinate, and coexist with each other using the above embodiments. Such cooperation may help the wireless terminals to converge to a favorable scheduling strategy over time.

The above described ACK, RTS, CTS, and intelligent CTS signals occur in the MAC layer in the OSI model of network communication, which those skilled in the art will appreciate is different from signals having similar names in other layers, such as TCP ACK signals in the transport layer in the OSI model of network communication. In wireless networks used to access the Internet, often uplink transmissions may consist of small frames (e.g., TCP ACKs in the transport layer). Small frames (e.g., TCP ACKs) may be (e.g., after being removed from an output buffer in a wireless device) aggregated (e.g., by a frame-aggregator-module in a wireless device) before transmission to reduce the number of uplink transmissions. Aggregated frames (e.g., after being written into an output buffer in a wireless device) may then be transmitted. This may help in reducing contentions and collisions between transmitters of uplink traffic even during times of heavy usage. Frame aggregation (e.g., of small frames) may depend on a threshold (e.g., a size-threshold that may keep the probability of frame collisions below a certain collision-threshold, a timeout-threshold that may prevent TCP's congestion control from kicking in, etc.). In some embodiments, frames (e.g., uplink, downlink, large, small, etc.) at various layers in the OSI model of network communication may be aggregated before transmission.

A transmitter of heavy traffic may, in some embodiments, get more deterministic mini-slots than a light transmitter depending on queue-lengths, bandwidth needs, average throughput, and peak throughput. RTS and CTS frames (e.g., wireless signals) may help mitigate the hidden node problem in random-access wireless networks, though not all embodiments use this technique or use this technique to this effect. However, it may take much longer than a mini-slot-time to receive and act in response to receiving an RTS or CTS frame. This may lead to a reduction in the benefits of using RTS and CTS frames. The above embodiment may help select asymmetric schedules that may increase the benefits of control frames (e.g., RTS and CTS frames). For example, a first wireless device and a second wireless device need to transmit a large amount of downlink frames; the first wireless device is pre-assigned a first downlink mini-slot (e.g., by a schedule-selector-module in the first wireless device) in a first asymmetric schedule (e.g., asymmetric schedule 1649 in FIG. 16); a second downlink mini-slot is adjacent to the first downlink mini-slot in the first asymmetric schedule (e.g., D2 is adjacent to D1 in asymmetric schedule 1649 in FIG. 16); in response to sensing (e.g., by a wireless-proximity-sensing-module in the second wireless device) wireless proximity (e.g., two wireless devices may be considered to have wireless proximity if transmissions from one wireless device are often received with a high signal-quality [e.g., SINR of greater than 20 dB] by the other wireless device), the second wireless device is assigned the second downlink mini-slot (e.g., by a schedule-selector-module in the second wireless device) in the first asymmetric schedule. The first wireless device and the second wireless device may suffer from fewer hidden node problems due to their wireless proximity; thus, utilization (i.e. by the first wireless device and the second wireless device) of adjacent downlink mini-slots for transmitting downlink frames may not reduce the effectiveness of control frames (e.g., RTS and CTS frames). For example, a third wireless device and a fourth wireless device need to transmit a large amount of downlink frames; the third wireless device is pre-assigned a third downlink mini-slot (e.g., by a schedule-selector-module in the third wireless device) in a second asymmetric schedule (e.g., asymmetric schedule 1649 in FIG. 16); a fourth downlink mini-slot is far apart in time from the third downlink mini-slot in the second asymmetric schedule (e.g., D8 is far apart in time from D1 in asymmetric schedule 1649 in FIG. 16); in response to sensing (e.g., by a wireless-proximity-sensing-module in the fourth wireless device) lack of wireless proximity (e.g., two wireless devices may be considered to have lack of wireless proximity if transmissions from one wireless device are often received with a low signal-quality [e.g., SINR of less than 20 dB] by the other wireless device; two wireless devices may be considered to have lack of wireless proximity if transmissions from one wireless device are often not received by the other wireless device; etc.), the fourth wireless device is assigned the fourth downlink mini-slot (e.g., by a schedule-selector-module in the fourth wireless device) in the second asymmetric schedule. The third wireless device and the fourth wireless device may suffer from more hidden node problems due to their lack of wireless proximity; thus, utilization (i.e. by the third wireless device and the fourth wireless device) of downlink mini-slots that are far apart in time for transmitting downlink frames may improve the effectiveness of control frames (e.g., RTS and CTS frames).

In some embodiments, MAC addresses may be curtailed for subsequent RTS or CTS wireless-signals (e.g., data-frames, control-frames, beacon-frames, management-frames, etc.) so that subsequent RTS or CTS wireless-signals are able to fit within fewer multiples of mini-slot-time. MAC addresses may be adaptively curtailed until errors (e.g. frame-error-rate exceeds 10%, frame-error-rate exceeds 20%, etc.) start happening. Variable length MAC addresses may be positioned with delimiters or towards the end of frame to facilitate decoding and processing.

In some embodiments, ordering of parallel transmissions may dictate the transmit power level required for the receiver to be able to lock onto and decode desired frame (amongst those being transmitted in parallel). In some embodiments, choice of transmit power levels may not only depend on the SINR, SNR, and minimum receiver level sensitivity for the physical-layer rates being used, but also on the exact ordering of parallel transmissions. For example, when using deterministic slots that transmit in parallel using channel measurement algorithms, the ordering of parallel transmissions may dictate the required transmit power level to satisfy locking and SINR requirements of the receiver. In some embodiments, the deterministic slots in asymmetric scheduling modes may allow earlier downlink transmitters to predict transmit power levels that may be required in the presence of future parallel downlink transmitters.

In another embodiment of the present invention, a method for improving the performance of a wireless network is provided. The method includes a first wireless device receiving support from a second wireless device and a third wireless base-station. The third wireless base-station may route traffic for the first wireless device via the second wireless device when beneficial. Moreover, the first wireless device may route traffic for the third wireless base-station via the second wireless device when beneficial. The third wireless base-station may also request support from the second wireless device when communicating with the first wireless device. Furthermore, the first wireless device may request support from the second wireless device when communicating with the third wireless base-station.

In the above described embodiment, the second wireless device may determine whether to provide support to the first wireless device based on at least one of the following factors: quality of nearby sinks and relays, quantity of nearby sinks and relays, battery life, source of power, average throughput, bandwidth usage, bandwidth needs, bandwidth availability, type of device, level of mobility, time of day, subscription fees, user profile, non-cellular signal strength and quality, cellular signal strength and quality, level of wireless interference seen by a non-cellular interface, level of wireless interference seen by a cellular interface, number of hops to a sink, current state of the second device, current state of the first device, participation policy being used by the second wireless device, participation policy being used by the first wireless device, and surrounding wireless environment. For example, each of, or a subset of, these factors may be compared against respective threshold values or categories and if a factor satisfies the threshold or falls in a category, the device may choose to provide support to the first wireless device and if the threshold is not met or the category is inapplicable, the device may not choose to provide support to the first wireless device.

In the above embodiment, the first wireless device may request support from the second wireless device and the third wireless base-station, wherein cost of support depends on at least one of the following: time, date, subscription fees, user profile, network conditions, network congestion, location, surrounding wireless environment, spot price, average price, nightly price, and monthly price. Adding the dimension of cost to requesting, granting, receiving, and giving support may create important economic incentives for wireless terminals to cooperate with each. Such cooperation may be useful for wireless terminals and wireless networks. For example, a subscriber paying higher subscription fees may be able to request frequent and heavy cooperation from nearby wireless terminals. For example, during peak hours, requesting and receiving support may have a high spot price. Also, during peak hours, granting and giving support may have a high reward associated with it. Such cost and reward information may be made available to users, wireless devices, wireless base-stations, and wireless network operators in real-time.

FIGS. 7A-7D are generalized diagrammatic views of an example cell in a cellular network where wireless devices in the cell have the ability to cooperate with each other and the base station via multi-hopping in accordance with an embodiment of the present invention. In scenario 702 of FIG. 7A, wireless device 704 is seeing an upfade from the cellular tower 712 and wireless devices 706 and 708 are seeing a downfade from the cellular tower 712. An upfade happens when at a given instant in time and/or frequency, a receiver receives a transmitters signal at a high signal-to-interference-and-noise-ratio (SINR) or high signal-to-noise-ratio (SNR). A downfade happens when at a given instant in time and/or frequency, a receiver receives a transmitters signal at a low signal-to-interference-and-noise-ratio (SINR) or low signal-to-noise-ratio (SNR). Without any cooperation between the wireless devices and the cellular tower, in many systems, the only way for wireless device 706 to communicate with the cellular network is directly over a single hop. As shown in scenario 702, such a limitation may cause devices to experience a low data-rate while using a given amount of wireless spectrum because of the downfade. In scenario 720 of FIG. 7B, wireless device 722 is seeing an upfade from the cellular tower 730 and wireless devices 724 and 726 are seeing a downfade from the cellular tower 730. If cellular tower 730 is capable of routing downlink traffic to wireless device 724 via wireless device 722, it may support a higher data-rate using the same amount of spectrum as in scenario 702 because device 722 is experiencing an upfade from the cellular tower 730. In scenario 740 of FIG. 7C, wireless device 744 is seeing an upfade from the cellular tower 750 and wireless devices 742 and 746 are seeing a downfade from the cellular tower 750. Thus, in scenario 740, cellular tower 750 may directly send downlink traffic to wireless device 744 and may still support a higher data-rate using the same amount of spectrum as in scenario 702. This is because device 744 is experiencing an upfade from the cellular tower 750. In scenario 760 of FIG. 7D, wireless device 766 is seeing an upfade from the cellular tower 770 and wireless devices 762 and 764 are seeing a downfade from the cellular tower 770. If cellular tower 770 is capable of routing downlink traffic to wireless device 764 via wireless device 766, the network may support a higher data-rate using the same amount of spectrum as in scenario 702 because device 766 is experiencing an upfade from the cellular tower 770. This example is one way in which wireless terminals and the wireless network may benefit from the capability to receive support from each other.

Algorithmic support from different parts of the cellular network is expected to be useful, in some systems, for single-hop and multi-hop cellular networks. Such support may facilitate cooperative routing, cooperative scheduling, reliability, and throughput enhancements. Algorithmic support could come from the base-transceiver-system (BTS), base-station-controller (BSC), radio-network-controller (RNC), mobile-switching-center (MSC), and other wireless terminals. Such algorithmic support could enhance user experience and network performance by, for example, enabling several use-cases and applications. For example, the example shown in FIG. 7 could benefit from such routing algorithmic support from the cellular base-station. Note that different wireless devices in FIG. 7 may see severe upfades and downfades at different times and frequencies because of multi-path effects, shadowing effects, and mobility of the car. Billing support from MSC may be required, in some systems, to allocate different costs and rewards for receiving and granting support. Amount of support received or granted may be based on subscription fees, user profiles, user preferences, and multi-hop participation policies. Algorithmic support and cooperation between wireless terminals may be induced/initiated/enabled by wireless devices, wireless base-stations, wireless networks, and core networks.

Users may often use the cellular network without knowing much about the current state of the cellular network. For example, there may be severe congestion in the cell of a cellular network, and if cellular devices constantly keep trying to access the cellular network, the congestion may get worse. This may reduce performance for everyone. If wireless terminals have the capability of cooperating with each other and the core network, wireless devices may be configured to access the cellular network based on the state of the network to satisfy the needs of end-users. The above embodiment may be used to executed by application software that senses network state and network congestion using algorithmic support from nearby wireless terminals and the core network of the cellular operator. Moreover, the application software may collect users requests to access the cellular network. Using available network state and network congestion information, the application software may then transmit/receive data to/from the network in a way that may mitigate network congestion (e.g., based on congestions) and not excessively hurt user-experience. For example, delay sensitive data such as voice may be exchanged with the cellular network without much delay. However, requests to download files and buffer video may be delayed to balance the congestion in the network and may help the network operate in a stable state. Moreover, the delay in accessing the cellular network may be hidden from end-users by clever user-interface design. Moreover, such cooperation and coordination between wireless terminals and the cellular operator's core-network may improve overall network performance. Thus, the end-user may see a gain in user experience and performance. The application software using the above embodiment may ask for multiple requests (requiring network access) at a time from the user and then opportunistically use the network using knowledge of macro and micro network environment. Such functionality may include providing HTTP data to a web browser being used by the user when such data becomes available at the convenience of the network. Algorithmic support from other wireless terminals and the operator's core-network may simplify the design of the human-interface of such an application and may make it appear to the end-user as though the latency is low. Furthermore, network efficiency may increase, and congestion may decrease as was explained above. This may be useful for wireless networks during times of peak usage and heavy congestion. Network access that can be delayed by a significant amount may also be relevant. For example, backing up of large databases may be delayed till nighttime when network congestion may be low and enough network capacity may be available. Algorithmic support from other wireless terminals and the operator's core-network may allow a wireless device to start, pause, and resume backups.

In another embodiment of the present invention, a method for routing in a wireless network is provided. The method, in some embodiments, includes a first wireless terminal determining whether to send data to a third wireless terminal via a second wireless terminal based on at least one of the following factors: whether signal-quality of transmissions made by the third wireless terminal and received by the first wireless terminal are above a first threshold (e.g. the threshold may range from 0 dB to 50 dB); and whether signal-quality of transmissions made by the second wireless terminal and received by the first wireless terminal are above a second threshold (e.g. the threshold may range from 0 dB to 50 dB). Moreover, in some embodiments, the first threshold may depend on signal-quality of transmissions made by the second wireless terminal and received by the first wireless terminal. Furthermore, in some embodiments, the second threshold may depend on signal-quality of transmissions made by the third wireless terminal and received by the first wireless terminal. Such an approach is believed to mitigate hidden-node problems in some applications.

In another embodiment of the present invention, a method for routing in a wireless network is provided. The method, in some embodiments, includes a first wireless terminal determining whether to send data to a third wireless terminal via a second wireless terminal based on at least one of the following factors: whether signal-quality of transmissions made by the third wireless terminal and received by the first wireless terminal are above (below) a first threshold; and whether signal-quality of transmissions made by the second wireless terminal and received by the first wireless terminal are above (below) a second threshold. Moreover, in some embodiments, the first threshold may depend on signal-quality of transmissions made by the second wireless terminal and received by the first wireless terminal. Furthermore, in some embodiments, the second threshold may depend on signal-quality of transmissions made by the third wireless terminal and received by the first wireless terminal. Such an approach is believed to mitigate hidden-node problems in some applications.

In another embodiment of the present invention, a method for routing in a wireless network is provided. The method, in some embodiments, includes a second wireless terminal determining whether to allow a first wireless terminal to send data to a third wireless terminal via the second wireless terminal based on at least one of the following factors: whether signal-quality of transmissions made by the third wireless terminal and received by the second wireless terminal are above a first threshold (e.g. the threshold may range from 0 dB to 50 dB); and whether signal-quality of transmissions made by the first wireless terminal and received by the second wireless terminal are above a second threshold (e.g. the threshold may range from 0 dB to 50 dB). Moreover, in some embodiments, the first threshold may depend on signal-quality of transmissions made by the first wireless terminal and received by the second wireless terminal. Furthermore, in some embodiments, the second threshold may depend on signal-quality of transmissions made by the third wireless terminal and received by the second wireless terminal. Such an approach is believed to mitigate hidden-node problems in some applications.

In another embodiment of the present invention, a method for routing in a wireless network is provided. The method, in some embodiments, includes a second wireless terminal determining whether to allow a first wireless terminal to send data to a third wireless terminal via the second wireless terminal based on at least one of the following factors: whether signal-quality of transmissions made by the third wireless terminal and received by the second wireless terminal are above (below) a first threshold; and whether signal-quality of transmissions made by the first wireless terminal and received by the second wireless terminal are above (below) a second threshold. Moreover, in some embodiments, the first threshold may depend on signal-quality of transmissions made by the first wireless terminal and received by the second wireless terminal. Furthermore, in some embodiments, the second threshold may depend on signal-quality of transmissions made by the third wireless terminal and received by the second wireless terminal. Such an approach is believed to mitigate hidden-node problems in some applications.

In another embodiment of the present invention, a method for routing in a wireless network is provided. The method, in some embodiments, includes a third wireless terminal determining whether to allow a first wireless terminal to send data to the third wireless terminal via a second wireless terminal based on at least one of the following factors: whether signal-quality of transmissions made by the first wireless terminal and received by the third wireless terminal are above a first threshold (e.g. the threshold may range from 0 dB to 50 dB); and whether signal-quality of transmissions made by the second wireless terminal and received by the third wireless terminal are above a second threshold (e.g. the threshold may range from 0 dB to 50 dB). Moreover, in some embodiments, the first threshold may depend on signal-quality of transmissions made by the second wireless terminal and received by the third wireless terminal. Furthermore, in some embodiments, the second threshold may depend on signal-quality of transmissions made by the first wireless terminal and received by the third wireless terminal. Such an approach is believed to mitigate hidden-node problems in some applications.

In another embodiment of the present invention, a method for routing in a wireless network is provided. The method, in some embodiments, includes a third wireless terminal determining whether to allow a first wireless terminal to send data to the third wireless terminal via a second wireless terminal based on at least one of the following factors: whether signal-quality of transmissions made by the first wireless terminal and received by the third wireless terminal are above (below) a first threshold; and whether signal-quality of transmissions made by the second wireless terminal and received by the third wireless terminal are above (below) a second threshold. Moreover, in some embodiments, the first threshold may depend on signal-quality of transmissions made by the second wireless terminal and received by the third wireless terminal. Furthermore, in some embodiments, the second threshold may depend on signal-quality of transmissions made by the first wireless terminal and received by the third wireless terminal. Such an approach is believed to mitigate hidden-node problems in some applications.

Some embodiments of the above invention may improve the performance of multi-hop wireless networks by enabling wireless terminals (e.g., a multi-hop-route-selector-module in the wireless terminals) to determine multi-hop routes based on one or more topological factors (e.g., signal-quality, path-loss, relative wireless direction, absolute wireless direction, etc.). A first wireless terminal (e.g., a topology-estimation-module in the first wireless terminal) may estimate the topology of nearby wireless terminals (e.g., a second wireless terminal, a third wireless terminal, etc.) to facilitate determination (e.g., by a multi-hop-route-selector-module in the first wireless terminal) of multi-hop routes (e.g. consisting of the first wireless terminal, a second wireless terminal, and a third wireless terminal). In some embodiments, topology estimation may provide the first wireless terminal an indication of the signal-quality (e.g., SINR of 10 dB, SINR of 20 dB, etc.) of wireless signals (e.g., beacon-frame, data-frames, management-frames, control-frames, etc.) received from nearby wireless terminals. In some embodiments, a wireless signal (e.g., beacon-frame, data-frames, management-frames, control-frames, etc.) may include an indication (e.g., data indicative of the absolute transmit power-level used by a second wireless terminal may be included in the wireless signal by the transmit-power-module in the second wireless terminal) of the absolute transmit power-level (e.g., 10 dBm, 20 dBm, etc.) used by a nearby wireless terminal (e.g., a second wireless terminal) when transmitting the wireless signal. When the first wireless terminal receives the wireless signal, based (e.g., ratio of the absolute transmit power-level and the signal-quality) on the indication of the absolute transmit power-level and the signal-quality (e.g., received-signal-strength-indication [RSSI], signal-to-noise-ratio [SNR], signal-to-interference-and-noise-ratio [SINR], channel-quality-indicator [CQI], etc.) with which the wireless signal was received at the first wireless terminal, the first wireless terminal (e.g., a topology-estimation-module in the first wireless terminal) may measure the path-loss (e.g., path-loss may range from 0 dB to 100 dB) or channel-loss (e.g., channel-loss may range from 0 dB to 100 dB) between the transmitter of the wireless signal and the first wireless terminal. The measured path-loss or channel-loss estimate may then be used instead of the signal-quality to select multi-hop routes. In some embodiments, the first wireless terminal may have several radio antennas. When the first wireless terminal receives a wireless signal (e.g., from a second wireless terminal), the first wireless terminal (e.g., a topology-estimation-module in the first wireless terminal) may measure the relative wireless direction (e.g., relative direction from which wireless signals transmitted by a second wireless terminal are received at the first wireless terminal with high signal-quality) of the transmitter (e.g., a second wireless terminal) of the wireless signal based on at least one of the following: the beam-forming weights used by the transmitter of the wireless signal; and the received signal at each of the radio antennas of the first wireless terminal (e.g., corresponding to the parameters used for maximal-ratio-combining at the first wireless terminal when receiving the wireless signal. In some embodiments, if the absolute orientation of the radio antennas of the first wireless terminal is known (e.g., in a general-purpose processor [e.g., CPU] in the first wireless terminal; in the computer program product being executed in the first wireless terminal; in the memory of the first wireless terminal, etc.), the first wireless terminal (e.g., a topology-estimation-module in the first wireless terminal) may determine the absolute wireless direction (e.g., by using the relative wireless direction of a second wireless terminal and the absolute orientation of the radio antennas of the first wireless terminal) of the transmitter of a wireless signal (e.g., a second wireless terminal) at the first wireless terminal.

Figure 8:
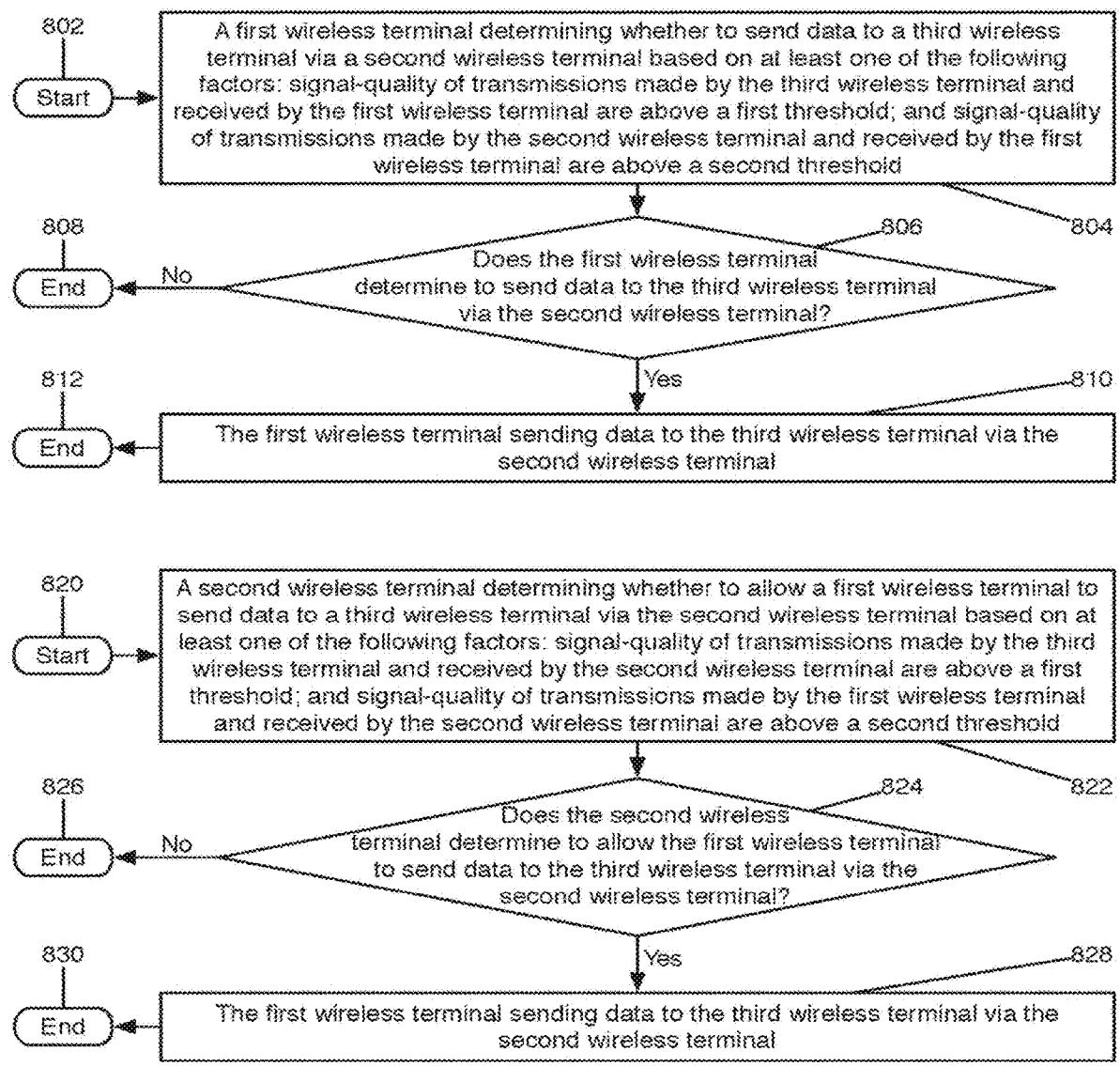
FIG. 8 is a flowchart of an example of a method for routing in a wireless network in accordance with an embodiment of the present invention.

FIG. 8 is a flowchart of a method for routing in a wireless network in accordance with an embodiment of the present invention. In step 804, a first wireless terminal determines whether to send data to a third wireless terminal via a second wireless terminal based on at least one of the following factors: whether signal-quality of transmissions made by the third wireless terminal and received by the first wireless terminal are above a first threshold; and whether signal-quality of transmissions made by the second wireless terminal and received by the first wireless terminal are above a second threshold. In step 806, the first wireless terminal makes the actual determination. If the first wireless terminal determines to send data to the third wireless terminal via the second wireless terminal, the first wireless terminal sends (wirelessly transmits) data to the third wireless terminal via the second wireless terminal in step 810.

Some embodiments of the above invention may improve the performance of multi-hop wireless networks by enabling wireless terminals (e.g., a multi-hop-route-selector-module in the wireless terminals) to determine efficient multi-hop routes. For example, a first wireless terminal may need to communicate with a third wireless terminal. Signal-quality (e.g., obtained by a topology-estimation-module in the first wireless terminal) of transmissions (e.g., wireless-signals, beacon-frames, data-frames, management-frames, control-frames, etc.) made by the third wireless terminal and received by the first wireless terminal may be above a first threshold (e.g., the first threshold is 0 dB). However, signal-quality of transmissions made by the third wireless terminal and received by the first wireless terminal may be low (e.g., SINR of less than 10 dB); thus, the first wireless terminal (e.g., a multi-hop-route-selector-module in the first wireless terminal) may determine to communicate with the third wireless terminal via a multi-hop route (instead of a single-hop route). Signal-quality of transmissions made by a second wireless terminal and received by the first wireless terminal may be above a second threshold (e.g., the second threshold is 30 dB). Signal-quality of transmissions made by a fourth wireless terminal and received by the first wireless terminal may be below the second threshold. The first wireless terminal (e.g., the multi-hop-route-selector-module in the first wireless terminal) may then determine (e.g., after obtaining at the first wireless terminal [e.g., from the topology-estimation-module in the first wireless terminal] the signal-quality of transmissions made by the second wireless terminal and the third wireless terminal [and received at the first wireless terminal]) to send wireless signals (e.g. data-frames) to the third wireless terminal via the second wireless terminal. Moreover, the first wireless terminal (e.g., the multi-hop-route-selector-module in the first wireless terminal) may then determine (e.g., after obtaining at the first wireless terminal [e.g., from the topology-estimation-module in the first wireless terminal] the signal-quality of transmissions made by the third wireless terminal and the fourth wireless terminal [and received at the first wireless terminal]) to not send wireless signals (e.g. data-frames) to the third wireless terminal via the fourth wireless terminal.

Again referring to FIG. 8, in step 822, a second wireless terminal determines whether to allow a first wireless terminal to send data to a third wireless terminal via the second wireless terminal based on at least one of the following factors: whether signal-quality of transmissions made by the third wireless terminal and received by the second wireless terminal are above a first threshold; and whether signal-quality of transmissions made by the first wireless terminal and received by the second wireless terminal are above a second threshold. In step 824, the second wireless terminal makes the actual determination. If the second wireless terminal determines to allow the first wireless terminal to send data to the third wireless terminal via the second wireless terminal, the first wireless terminal sends (wirelessly transmits) data to the third wireless terminal via the second wireless terminal in step 828.

Some embodiments of the above invention may improve the performance of multi-hop wireless networks by enabling wireless terminals (e.g., a multi-hop-route-selector-module in the wireless terminals) to determine efficient multi-hop routes. For example, a first wireless terminal and a fourth wireless terminal may need to communicate with a third wireless terminal via a second wireless terminal. Signal-quality (e.g., obtained by a topology-estimation-module in the second wireless terminal) of transmissions (e.g., wireless-signals, beacon-frames, data-frames, management-frames, control-frames, etc.) made by the third wireless terminal and received by the second wireless terminal may be above a first threshold (e.g., the first threshold is 30 dB). Signal-quality of transmissions made by the first wireless terminal and received by the second wireless terminal may be above a second threshold (e.g., the second threshold is 30 dB). Signal-quality of transmissions made by the fourth wireless terminal and received by the second wireless terminal may be below the second threshold. The second wireless terminal (e.g., the multi-hop-route-selector-module in the second wireless terminal) may then determine (e.g., after obtaining at the second wireless terminal [e.g., from the topology-estimation-module in the second wireless terminal] the signal-quality of transmissions made by the first wireless terminal and the third wireless terminal [and received at the second wireless terminal]) to allow the first wireless terminal to send wireless signals (e.g. data-frames) to the third wireless terminal via the second wireless terminal. Moreover, the second wireless terminal (e.g., the multi-hop-route-selector-module in the second wireless terminal) may then determine (e.g., after obtaining at the second wireless terminal [e.g., from the topology-estimation-module in the second wireless terminal] the signal-quality of transmissions made by the third wireless terminal and the fourth wireless terminal [and received at the second wireless terminal]) to disallow the fourth wireless terminal to send wireless signals (e.g. data-frames) to the third wireless terminal via the second wireless terminal.

Some embodiments of the above invention may mitigate hidden node problems by enabling wireless terminals to find efficient multi-hop wireless routes. Such efficient multi-hop wireless routes may consist of wireless terminals that can carrier-sense (e.g. SNR greater than 0 dB) each other. Moreover, such multi-hop routes may allow RTS and CTS wireless signals to be more effective (for the multi-hop route) because wireless terminals (comprising the multi-hop route) will at least be able to carrier-sense the RTS and CTS wireless signals. Channel measurement schemes that allow multiple interfering flows to happen in parallel when feasible may have more information (e.g. multi-hop routing information) available and thus may benefit from the above invention. Wireless terminals (comprising the multi-hop route) may also provide feedback to each other so that each wireless terminal could adjust its transmit power-level to facilitate the above embodiment (e.g. a first wireless terminal adjusting its transmit power-level to satisfy a first threshold at a second wireless terminal and a second threshold at a third wireless terminal).

In some embodiments, transmit power-level used by a first wireless terminal to transmit RTS frames may depend on a parameter (e.g., such as a parameter that depends on the gap between the average SINR required to decode the RTS frame and the SINR at which the RTS frame is received at a receiver). Furthermore, the transmit power-level used by the first wireless terminal to transmit RTS frames may indicate to other wireless terminals to not transmit in parallel and may mitigate interference from the other wireless terminals.

In another embodiment of the present invention, a method for managing vehicular traffic is provided. The method, in some embodiments, includes a first wireless terminal sending a beacon. The method further includes a second wireless terminal receiving the beacon and sending a part of the beacon to a traffic-light controller. In addition, the method further includes the traffic-light controller receiving the part of the beacon and using it to do at least one of the following: monitor vehicles, regulate vehicles, route vehicles, control vehicles, monitor people, regulate people, route people, control people, and control traffic lights. Moreover, the first wireless terminal may be one of the following: a vehicle, a device embedded in a vehicle, a person, and a device carried by a person. Furthermore, the second wireless terminal may be co-located with the traffic-light controller. Also, the traffic-light controller may communicate with other traffic-light controllers to better manage vehicular traffic. In addition, the beacon may include information about at least one of the following: type of the first wireless terminal, intention of the first wireless terminal, and number of wireless terminals near the first wireless terminal. Instead of beacons, the first wireless terminal may use other means of wireless communication signaling to communicate with the second wireless terminal and the traffic-light controller.

Figure 9:
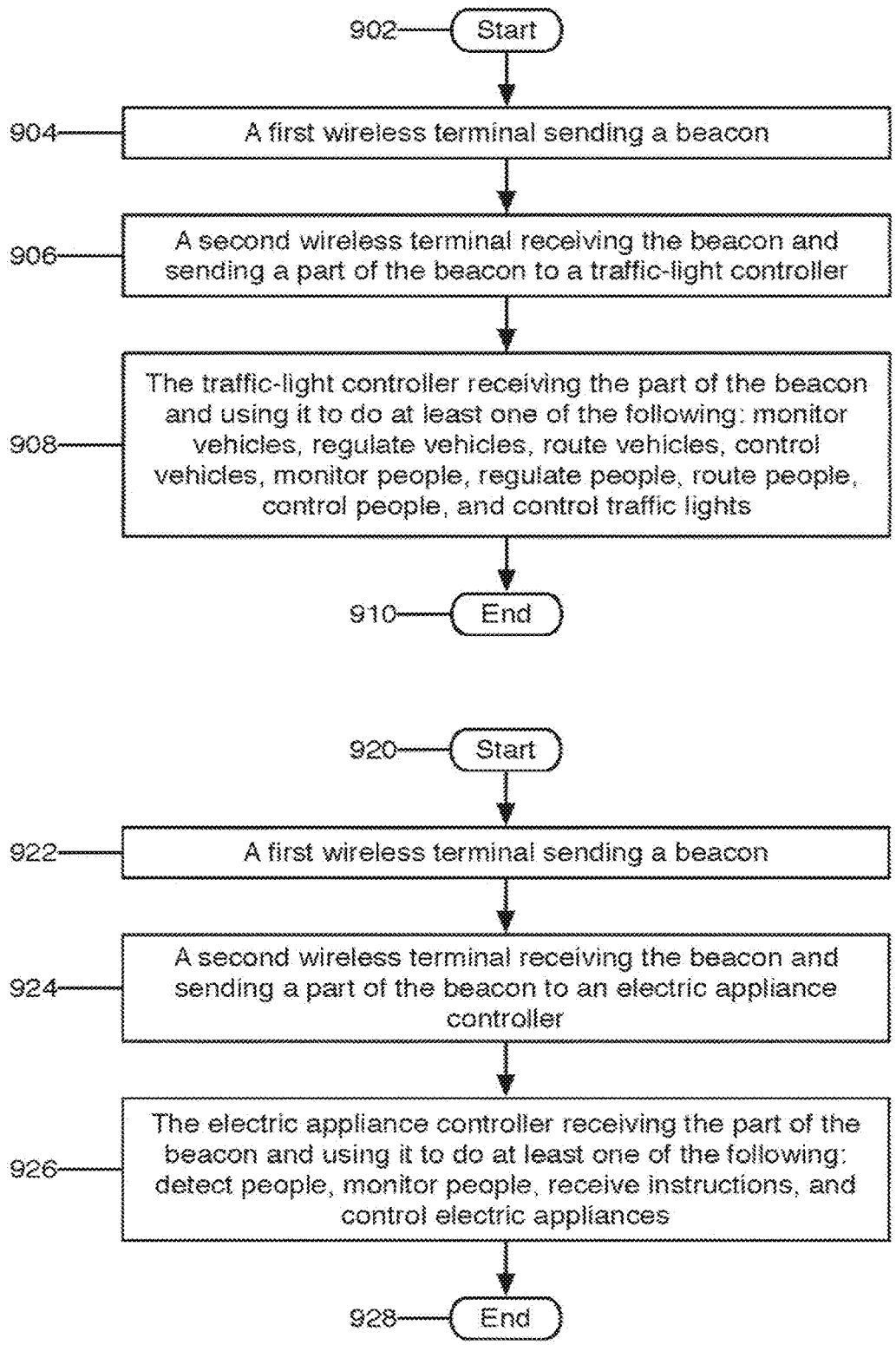
FIG. 9 is a flowchart of an example of a method for managing vehicular traffic and a method for conserving energy in accordance with an embodiment of the present invention.

FIG. 9 is a flowchart of a method for managing vehicular traffic and a method for conserving energy in accordance with an embodiment of the present invention. In step 904, a first wireless terminal sends (wirelessly transmits) a beacon. In step 906, a second wireless terminal receives the beacon and sends a part of the beacon to a traffic-light controller. In step 908, the traffic-light controller receives the part of the beacon and uses it to do at least one of the following: monitor vehicles, regulate vehicles, route vehicles, control vehicles, monitor people, regulate people, route people, control people, and control traffic lights.

Figure 10:
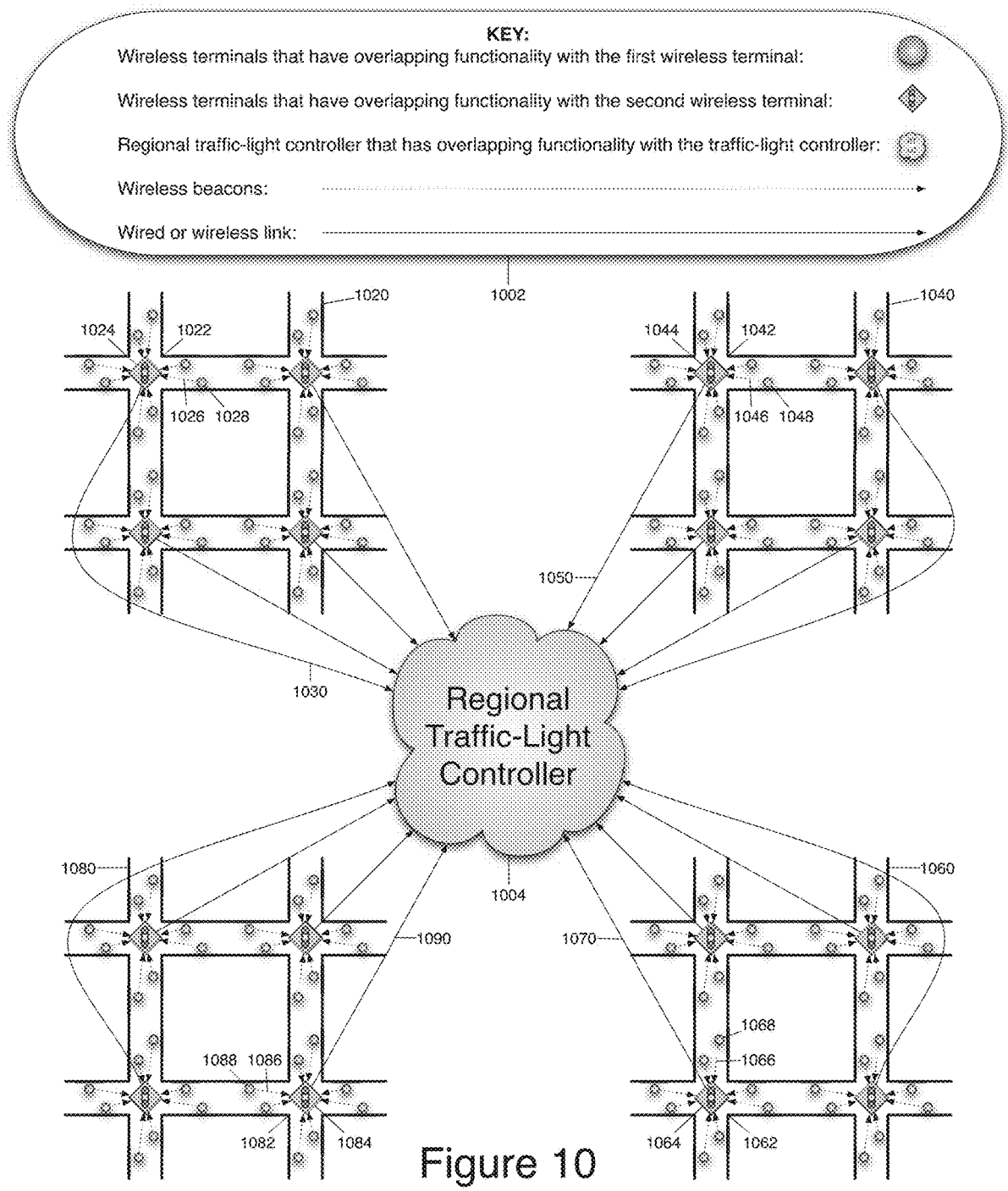
FIG. 10 is a diagrammatic view of an example of a transportation system where the transportation system has the ability to detect the presence of vehicles in accordance with an embodiment of the present invention.

FIG. 10 is a generalized diagrammatic view of a transportation system where the transportation system has the ability to detect the presence of vehicles in accordance with an embodiment of the present invention. Key 1002 shows symbols corresponding to the first wireless terminal, the second wireless terminal, the traffic-light controller, wireless beacons, and wired/wireless links. The regional traffic-light controller has either a wired or wireless network connection with several traffic-lights and traffic-light intersections. Such a wired or wireless network connection may be used to exchange data between the regional traffic-light controller and the traffic-lights. Such data may be used to monitor, regulate, control, and route vehicular and pedestrian traffic.

Traffic-light intersection 1022 is one of several in the region. Traffic-lights 1024 regulate traffic at traffic-light intersection 1022. Traffic-lights 1024 and traffic-light intersection 1022, in this embodiment, are connected over a wired or wireless link 1030 to the regional traffic-light controller 1004. This link may be a cellular connection. Vehicle (or pedestrian) 1028 occasionally (e.g., periodically) transmits beacons 1026. These could be received by the traffic-lights 1024. Traffic-lights 1024 may collect beacons from other nearby vehicles and pedestrians as well. While vehicles may be installed with wireless subsystems, pedestrians may be carrying mobile wireless devices. Beacons transmitted by vehicles and pedestrians may be used to monitor, regulate, control, and route vehicles, automobiles, pedestrians, animals, and machines. Beacons may also include intention of a vehicle or pedestrian, such as an intent to turn left, turn right, compass heading, urgency, emergency, and other special situations. Wireless terminals that have overlapping functionality with the first wireless terminal could aggregate information about nearby vehicles or pedestrians and include that information in the beacons that they transmit. Wireless terminals that have overlapping functionality with the first wireless terminal could aggregate information about nearby vehicles or pedestrians in a specific direction and include that information in the beacons that they transmit. Moreover, traffic-lights may use crowd-sourcing techniques when aggregating information collected from beacons to reduce errors. Traffic-lights may also include confidence values and sample sizes for the gathered information to indicate reliability information. After collecting and aggregating the information received via beacons and other wireless communication signaling from nearby vehicles and pedestrians, traffic-lights and traffic-light intersections could send the information to the regional traffic-light controller. The traffic-lights may retain and send only certain parts of beacons and use dimensionality reduction techniques without causing loss of useful information. While sending entire chunks of information gathered from the various vehicles and pedestrians to the regional traffic-light controller may be useful, choosing useful parts may help save network bandwidth. The regional traffic-light controller may receive localized real-time information from vehicles and pedestrians in this way over wired and wireless links. The regional traffic-light controller may then use this information to communicate with other traffic-light controllers to come up with a better traffic routing schedule given the current levels of congestion, needs of vehicles and pedestrians, time of day, complexity of solution, safety of implementation and deployment of new routing schedule, and reliability of information gathered. If a better traffic and pedestrian routing schedule is established for a localized region or a large-scale region, it could sent to the traffic-lights via the wired or wireless link. Traffic-lights may then work according to the new routing schedule. This may reduce traffic congestion on the roads. Moreover, this entire process could be repeated occasionally to adapt the traffic routing schedule to the changing conditions.

In another embodiment of the present invention, a method for conserving energy is provided. The method, in some embodiments, includes a first wireless terminal sending a beacon. The method further includes a second wireless terminal receiving the beacon and sending a part of the beacon to an electric appliance controller. In addition, the method further includes the electric appliance controller receiving the part of the beacon and using it to do at least one of the following: detect people, monitor people, receive instructions, and control electric appliances. Moreover, the first wireless terminal could be one of the following: a person or a device carried by a person. Furthermore, the second wireless terminal could also be the electric appliance controller. Also, the electric appliance controller could better conserve energy by using at least one of the following characteristics of the first wireless terminal: type, needs, and number.

FIG. 9 is a flowchart of a method for managing vehicular traffic and a method for conserving energy in accordance with an embodiment of the present invention. In step 922, a first wireless terminal sends a beacon. In step 924, a second wireless terminal receives the beacon and sends a part of the beacon to an electric appliance controller. In step 926, the electric appliance controller receives the part of the beacon and uses it to do at least one of the following: detect, monitor, regulate, guide, give instructions to, receive instructions from, and control people, animals, wireless terminals, electric appliances, machines, other electric appliance controllers, electric grids, off-site power plants, and on-site power generation mechanisms.

In another embodiment of the present invention, a method for relaying in a wireless network is provided. In a multi-hop wireless network, wireless terminals (e.g., a first wireless terminal, a second wireless terminal, etc.) comprising a multi-hop wireless route may incur delays (e.g., decoding-delays, processing-delays, etc.) when relaying wireless-signals on the multi-hop wireless route. Some embodiments of the above invention may reduce the delays (e.g., decoding-delays, processing-delays, etc.) incurred by the wireless terminals (e.g., a first wireless terminal, a second wireless terminal, etc.) when relaying wireless-signals on the multi-hop wireless route. Moreover, some embodiments of the above invention may facilitate co-existence (e.g., for scheduling purposes, for routing purposes, etc.) amongst wireless devices comprising one or more multi-hop wireless routes. The method, in some embodiments, includes a first wireless terminal (e.g., a fast-relay-module in the first wireless terminal) calculating a first value (e.g., the first value is 1-byte in size, the first value is 4-bytes in size, etc.). The method further includes the first wireless terminal transmitting a wireless-signal (e.g., beacon-frames, data-frames, management-frames, control-frames, etc.) along with the first value (e.g., data indicative of the first value may be included in the wireless signal by the fast-relay-module in the first wireless terminal) to a second wireless terminal. In addition, the method further includes the second wireless terminal (e.g., a fast-relay-module in the second wireless terminal) receiving the wireless-signal (from the first wireless terminal) and using the first value to do at least one of the following: determining whether to relay the wireless-signal, choosing next recipient of the wireless-signal, determining how to schedule the wireless-signal, determining how to route the wireless-signal, and calculating a second value to replace the first value in the wireless-signal. Moreover, in some embodiments, the first value (e.g., computed by the fast-relay-module in the first wireless terminal) and the second value (e.g., computed by the fast-relay-module in the second wireless terminal) may be based on (e.g., indicative of, hash function of, etc.) at least one of the following: source address (e.g., source MAC-address, source IP-address, etc.) of the wireless-signal (e.g., obtained from the MAC-header of the wireless-signal, obtained from the IP-header of the wireless-signal, etc.), destination address (e.g., destination MAC-address, destination IP-address, etc.) of the wireless-signal (e.g., obtained from the MAC-header of the wireless-signal, obtained from the IP-header of the wireless-signal, etc.), relay address (e.g., relay MAC-address, relay IP-address, etc.) of the wireless-signal (e.g., obtained from the MAC-header of the wireless-signal, obtained from the IP-header of the wireless-signal, etc.), and traffic class (e.g., voice traffic, video traffic, best-effort traffic, background traffic, delay-sensitive traffic, jitter-sensitive traffic, etc.) of the wireless-signal (e.g., obtained from the MAC-header of the wireless-signal, obtained from the IP-header of the wireless-signal, etc.). Furthermore, in some embodiments, the first value and the second value may be included (e.g., by the fast-relay-module in the first wireless terminal, by the fast-relay-module in the second wireless terminal, etc.) in the physical-layer portion (e.g., physical-layer preamble, physical-layer header, etc.) of the wireless-signal.

Figure 11:
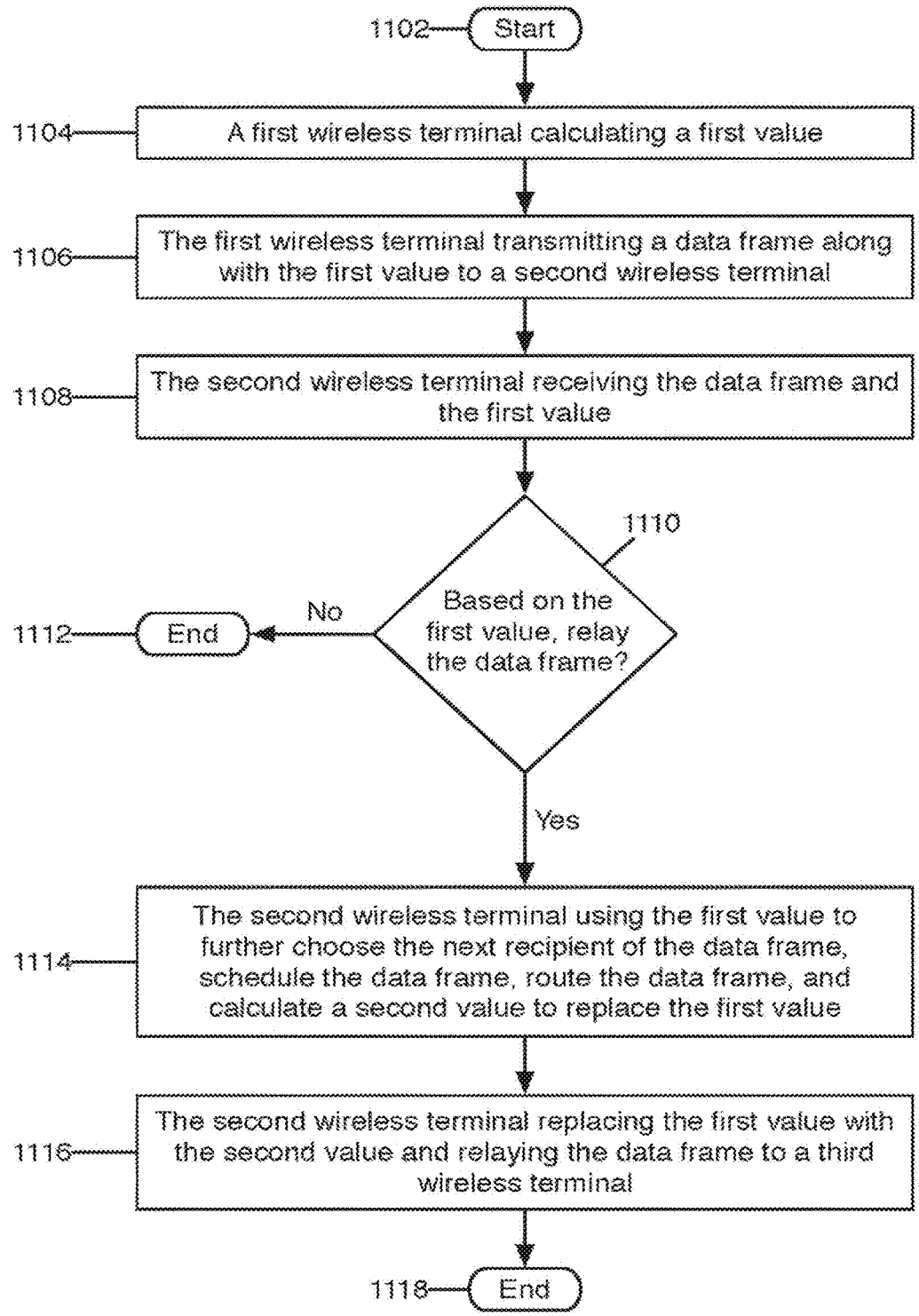
FIG. 11 is a flowchart of an example of a method for relaying data in a wireless network in accordance with an embodiment of the present invention.

FIG. 11 is a flowchart of a method for relaying in a wireless network in accordance with an embodiment of the present invention. In step 1104, a first wireless terminal calculates a first value. In step 1106, the first wireless terminal transmits a data frame along with the first value to a second wireless terminal. In step 1108, the second wireless terminal receives the data frame and the first value. In step 1110, the second wireless terminal determines whether to relay the data frame based on the first value. In step 1114, the second wireless terminal uses the first value to further choose the next recipient of the data frame, schedule the data frame, route the data frame, and calculate a second value to replace the first value. In step 1116, the second wireless terminal replaces the first value with the second value and relays the data frame to a third wireless terminal.

Some embodiments of the above invention may, for example, enable fast relaying of data frames by computing (e.g., in the fast-relay-module in the first wireless terminal) the first value based on (e.g., indicative of, hash function of, etc.) certain parameters (e.g., the source medium-access control (MAC) address [e.g., corresponding to the first wireless terminal]; relay MAC-address [e.g., corresponding to the second wireless terminal]; destination MAC-address [e.g., corresponding to the third wireless terminal]; and traffic class [e.g., corresponding to the data frame]; etc.) and then including (e.g., data indicative of the first value may be included in the data frame by the fast-relay-module in the first wireless terminal) the first value in the physical-layer header. Furthermore, in some embodiments, the first value may be small in size (e.g., 1-byte, 4-bytes, etc.), may be modulated using the base-rate (e.g., the lowest physical-layer rate in the IEEE 802.11n standard), and may be indicative of cross-layer information (e.g., scheduling information, routing information, etc.); thus, the first value may reduce processing-delays (e.g., the first value may be processed quickly due to its small size [e.g., by utilizing look-up tables in the fast-relay-module in the second wireless terminal]), reduce decoding-delays (e.g., the first value may be decoded quickly and/or accurately due to its base-rate modulation [e.g., by utilizing a fast decoder that may require special conditions {e.g., works only for base-rate modulation-schemes; requires high SINR to decode; etc.} in the fast-relay-module in the second wireless terminal]), and reduce scheduling and/or routing delays (e.g., due to faster MAC-layer response times [e.g., due to lower processing-delays, decoding-delays, etc.], readily available cross-layer information [e.g., scheduling information, routing information, etc.], etc.).

In some embodiments, in order to determine whether to relay, the second wireless terminal (e.g. the fast-relay-module in the second wireless terminal) may use one or more topological factors (e.g., signal-quality, path-loss, relative wireless direction, absolute wireless direction, etc.). The second wireless terminal (e.g., a topology-estimation-module in the second wireless terminal) may estimate the topology of nearby wireless terminals (e.g., the first wireless terminal, the third wireless terminal, etc.) to facilitate determination (e.g., by the fast-relay-module in the second wireless terminal) of whether to relay (e.g. relay immediately; relay after a delay of 100 us; relay when enable-relay-indicator is '1'; do not relay and terminate multi-hop wireless route; etc.). In some embodiments, topology estimation may provide the second wireless terminal an indication of the signal-quality (e.g., SINR of 10 dB, SINR of 20 dB, etc.) of wireless signals (e.g., beacon-frame, data-frames, management-frames, control-frames, etc.) received from nearby wireless terminals. In some embodiments, a wireless signal (e.g., beacon-frame, data-frames, management-frames, control-frames, etc.) may include an indication (e.g., data indicative of the absolute transmit power-level used by the first wireless terminal may be included in the wireless signal by a transmit-power-module in the first wireless terminal) of the absolute transmit power-level (e.g., 10 dBm, 20 dBm, etc.) used by a nearby wireless terminal (e.g., the first wireless terminal) when transmitting the wireless signal. When the second wireless terminal receives the wireless signal, based (e.g., ratio of the absolute transmit power-level and the signal-quality) on the indication of the absolute transmit power-level and the signal-quality (e.g., received-signal-strength-indication [RSSI], signal-to-noise-ratio [SNR], signal-to-interference-and-noise-ratio [SINR], channel-quality-indicator [CQI], etc.) with which the wireless signal was received at the second wireless terminal, the second wireless terminal (e.g., the topology-estimation-module in the second wireless terminal) may measure the path-loss (e.g., path-loss may range from 0 dB to 100 dB) or channel-loss (e.g., channel-loss may range from 0 dB to 100 dB) between the transmitter (e.g. the first wireless terminal) of the wireless signal and the second wireless terminal. The measured path-loss or channel-loss estimate may then be used to facilitate determination (e.g., by the fast-relay-module in the second wireless terminal) of whether to relay (e.g. relay immediately; relay after a delay of 100 us; relay when enable-relay-indicator is '1'; do not relay and terminate multi-hop wireless route; etc.). In some embodiments, the second wireless terminal may have several radio antennas. When the second wireless terminal receives a wireless signal (e.g., from the first wireless terminal), the seocnd wireless terminal (e.g., the topology-estimation-module in the second wireless terminal) may measure the relative wireless direction (e.g., relative direction from which wireless signals transmitted by the first wireless terminal are received at the second wireless terminal with high signal-quality) of the transmitter (e.g., the first wireless terminal) of the wireless signal based on at least one of the following: the beam-forming weights used by the transmitter of the wireless signal; and the received signal at each of the radio antennas of the second wireless terminal (e.g., corresponding to the parameters used for maximal-ratio-combining at the second wireless terminal when receiving the wireless signal. In some embodiments, if the absolute orientation of the radio antennas of the second wireless terminal is known (e.g., in a general-purpose processor [e.g., CPU] in the second wireless terminal; in the computer program product being executed in the second wireless terminal; in the memory of the second wireless terminal, etc.), the second wireless terminal (e.g., the topology-estimation-module in the second wireless terminal) may determine the absolute wireless direction (e.g., by using the relative wireless direction of the first wireless terminal and the absolute orientation of the radio antennas of the second wireless terminal) of the transmitter of a wireless signal (e.g., the first wireless terminal) at the second wireless terminal.

In some embodiments, the second wireless terminal (e.g., having full-duplex capabilities and participating in wormhole routing) may relay (e.g., the fast-relay-module in the second wireless terminal may relay) and jam (e.g., a full-duplex-jammer-module in the second wireless terminal may jam) if wireless space is available (e.g., when the second wireless terminal is scheduled to transmit wireless signals); otherwise, the second wireless terminal (e.g., the fast-relay-module in the second wireless terminal) may end the wormhole (e.g., by delaying relaying by 100 us; by delaying relaying till enable-relay-indicator is '1'; etc.) and wait to schedule at the next feasible opportunity (e.g., wait till the second wireless terminal is scheduled to transmit wireless signals).

In some embodiments, a device may allocate space in a data-frame (e.g., MAC-header, IP-header, the first value, the second value, etc.) for real-time protocol feedback (e.g. some aspects of real-time transport control protocol [RTCP] feedback) from the device to facilitate multi-hop wireless routing and scheduling. In some embodiments, the allocated space (e.g. a byte in the data-frame) may not be encrypted so that it can be snooped by lower layers (e.g. MAC layer). In some embodiments, other cross-layer collaboration may be possible with this extension.

In another embodiment of the present invention, a method for enhancing social interaction is provided. Users of mobile terminals often desire to interact socially with others (e.g., others in physical proximity), but identifying these potential interactions is difficult due to the large number of potential interactions. This problem may be mitigated by some embodiments of the following method. The method, in some embodiments, includes a first wireless terminal (e.g., a social-interaction-module in the first wireless terminal) transmitting a first data (e.g., the first data is 1-byte in size, the first data is 4-bytes in size, etc.). The method further includes a second wireless terminal (e.g., a social-interaction-module in the second wireless terminal) receiving the first data. In addition, the method further includes the second wireless terminal (e.g., the social-interaction-module in the second wireless terminal) determining whether the first data and a second data (e.g., the second data is 1-byte in size, the second data is 4-bytes in size, etc.) are a match. Furthermore, the method further includes the second wireless terminal (e.g., the social-interaction-module in the second wireless terminal) requesting communication with the first wireless terminal (e.g., the social-interaction-module in the first wireless terminal) if a match (i.e. between the first data and the second data) exists. Additionally, the method further includes the first wireless terminal (e.g., the social-interaction-module in the first wireless terminal) accepting the second wireless terminal's request (e.g., a request from the social-interaction-module in the second wireless terminal) to establish communication. In some embodiments, the first wireless terminal (e.g., the social-interaction-module in the first wireless terminal) may cause a change in the display (e.g. of the first wireless terminal) and present a user (e.g. of the first wireless terminal) with an option to select between accepting and rejecting the second wireless terminal's request (e.g., the request from the social-interaction-module in the second wireless terminal) to establish communication.

In the above embodiment, the second wireless terminal may determine whether the first data and the second data are a match based on at least one of the following factors: information about the first data, user-profile corresponding to the first data, information about the second data, user-profile corresponding to the second data, and a second user-adjustable parameter. Moreover, the second wireless terminal may request communication with the first wireless terminal if a match exists and if the operator of the second wireless terminal chooses to do so. Furthermore, the second wireless terminal may transmit the second data when requesting communication with the first wireless terminal. Also, the first wireless terminal may accept the second wireless terminal's request to establish communication based on at least one of the following factors: information about the first data, user-profile corresponding to the first data, information about the second data, user-profile corresponding to the second data, a first user-adjustable parameter, and choice of the operator of the first wireless terminal.

Figure 12:
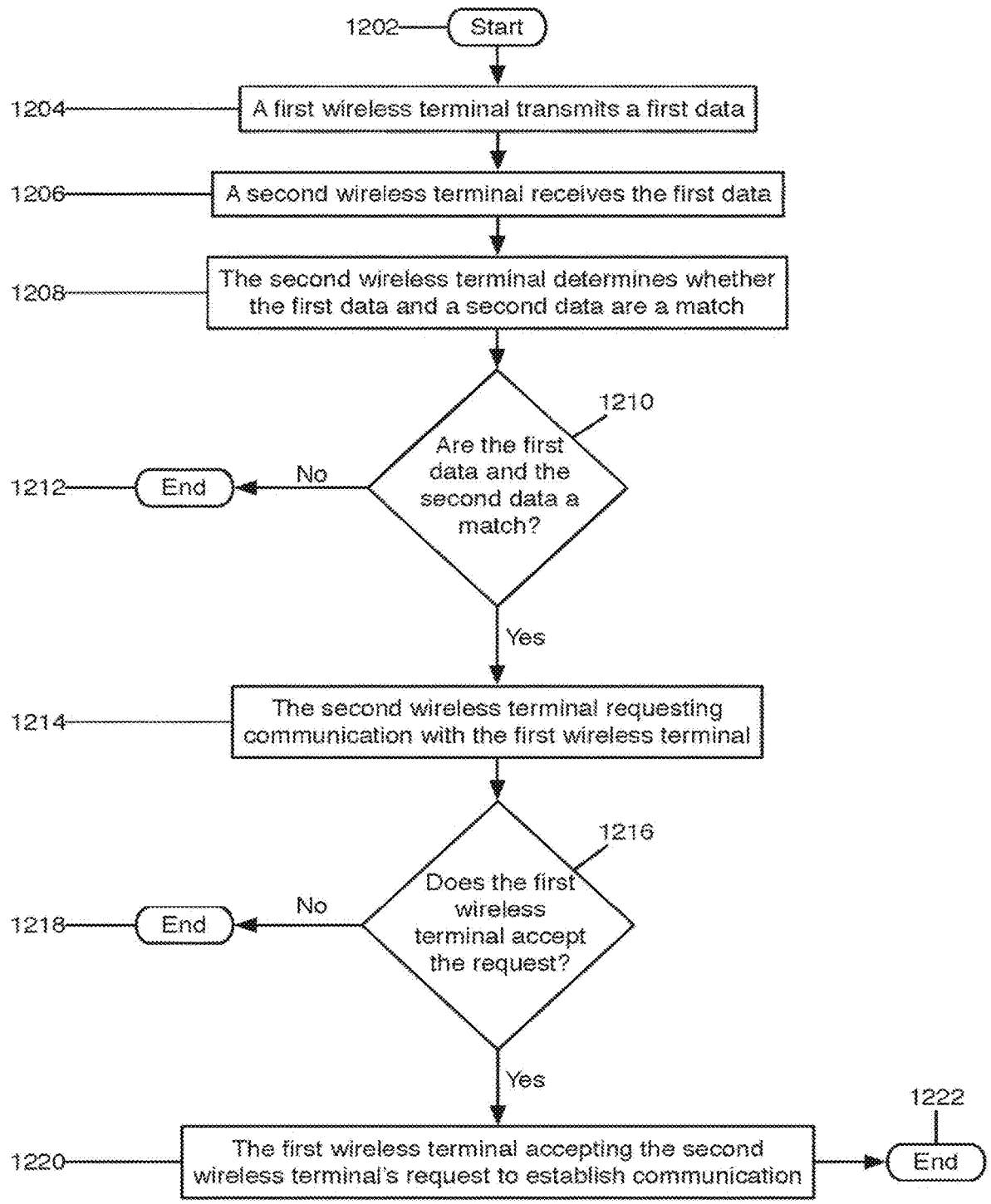
FIG. 12 is a flowchart of an example of a method for facilitating social interaction in accordance with an embodiment of the present invention.

FIG. 12 is a flowchart of a method for enhancing social interaction in accordance with an embodiment of the present invention. In step 1204, a first wireless terminal transmits a first data. In step 1206, a second wireless terminal receives the first data. In step 1208, the second wireless terminal determines whether the first data and a second data are a match. In step 1210, the second wireless terminal decides whether the first data and the second data match. In step 1214, the second wireless terminal requests communication with the first wireless terminal. In step 1216, the first wireless terminal decides whether to accept the request from the second wireless terminal. In step 1220, the first wireless terminal accepts the second wireless terminal's request to establish communication.

The above embodiment may enhance social interaction between human beings, other animals, intelligent machines, and other devices. In some embodiments, wireless terminals (e.g., a social-interaction-module in a wireless terminal) may use occasional beaconing to send out the end-user's Person ID (PID). Wireless terminals (e.g., a social-interaction-module in a wireless terminal), in some embodiments, may also receive PIDs by receiving beacons. In some embodiments, wireless terminals (e.g., a social-interaction-module in a wireless terminal) may try to check whether received PIDs are a match for the user using a local cache (e.g., in a general-purpose processor [e.g., CPU] in a wireless terminal; in the computer program product being executed in a wireless terminal; in the memory of a wireless terminal, etc.). In some embodiments, end-users may also configure level of socialness (e.g., in a social-interaction-module in a wireless terminal via a user-interface [e.g., keyboard, touch-screen, etc.]) depending on nature and habits to control how many PIDs are considered a match (e.g., by a social-interaction-module in a wireless terminal). In some embodiments, checking local cache (e.g., data is retrieved from the local cache by a social-interaction-module in a wireless terminal when checking for matches) first may be useful in some situations, such as college campuses, where engineers may mostly hang around each other. In some embodiments, if received PIDs are not found (e.g., by a social-interaction-module in a wireless terminal) in the local cache, wireless terminals may send PIDs to an Internet-based or cloud-based server. Server could return brief information on each of the close matches. A user may then decide whether the user wants to engage (e.g., a social-interaction-module in a wireless terminal may present a display [e.g., screen or tactile] to the user, receive an input from the user to select whether the user wants to engage, and act in response to receiving the input from the user). Another user may similarly decide whether to engage. In some embodiments, wireless traffic may be exchanged between terminals (e.g., between social-interaction-modules in wireless terminals) to establish this engagement. Furthermore, in some embodiments, an indication (e.g., a green light displayed on the screen of the wireless terminals of the users) may show that both are interested in engaging.

In some embodiments, wireless terminals (e.g. social-interaction-modules in wireless terminals) may use one or more topological factors (e.g., signal-quality, path-loss, relative wireless direction, absolute wireless direction, GPS, assisted-GPS, cellular-tower-triangulation, etc.) to find approximate locations of each other and to help users (i.e. those interested in engaging) to find each other. A first wireless terminal (e.g., a topology-estimation-module in the first wireless terminal) may estimate the topology of nearby wireless terminals (e.g., a second wireless terminal, a third wireless terminal, etc.) to find the locations of nearby wireless terminals. In some embodiments, topology estimation may provide the first wireless terminal an indication of the signal-quality (e.g., SINR of 10 dB, SINR of 20 dB, etc.) of wireless signals (e.g., beacon-frame, data-frames, management-frames, control-frames, etc.) received from nearby wireless terminals. In some embodiments, a wireless signal (e.g., beacon-frame, data-frames, management-frames, control-frames, etc.) may include an indication (e.g., data indicative of the absolute transmit power-level used by a second wireless terminal may be included in the wireless signal by the transmit-power-module in the second wireless terminal) of the absolute transmit power-level (e.g., 10 dBm, 20 dBm, etc.) used by a nearby wireless terminal (e.g., a second wireless terminal) when transmitting the wireless signal. When the first wireless terminal receives the wireless signal, based (e.g., ratio of the absolute transmit power-level and the signal-quality) on the indication of the absolute transmit power-level and the signal-quality (e.g., received-signal-strength-indication [RSSI], signal-to-noise-ratio [ SNR], signal-to-interference-and-noise-ratio [ SINR], channel-quality-indicator [CQI], etc.) with which the wireless signal was received at the first wireless terminal, the first wireless terminal (e.g., a topology-estimation-module in the first wireless terminal) may measure the path-loss (e.g., path-loss may range from 0 dB to 100 dB) or channel-loss (e.g., channel-loss may range from 0 dB to 100 dB) between the transmitter of the wireless signal and the first wireless terminal. The measured path-loss or channel-loss estimate may then be used instead of the signal-quality to select multi-hop routes. In some embodiments, the first wireless terminal may have several radio antennas. When the first wireless terminal receives a wireless signal (e.g., from a second wireless terminal), the first wireless terminal (e.g., a topology-estimation-module in the first wireless terminal) may measure the relative wireless direction (e.g., relative direction from which wireless signals transmitted by a second wireless terminal are received at the first wireless terminal with high signal-quality) of the transmitter (e.g., a second wireless terminal) of the wireless signal based on at least one of the following: the beam-forming weights used by the transmitter of the wireless signal; and the received signal at each of the radio antennas of the first wireless terminal (e.g., corresponding to the parameters used for maximal-ratio-combining at the first wireless terminal when receiving the wireless signal. In some embodiments, if the absolute orientation of the radio antennas of the first wireless terminal is known (e.g., in a general-purpose processor [e.g., CPU] in the first wireless terminal; in the computer program product being executed in the first wireless terminal; in the memory of the first wireless terminal, etc.), the first wireless terminal (e.g., a topology-estimation-module in the first wireless terminal) may determine the absolute wireless direction (e.g., by using the relative wireless direction of a second wireless terminal and the absolute orientation of the radio antennas of the first wireless terminal) of the transmitter of a wireless signal (e.g., a second wireless terminal) at the first wireless terminal.

In some embodiments, if a first user tries to engage without getting an indication (e.g., a green light is not displayed on the screen of the wireless terminal of the first user) and gets rejected by a second user (e.g. when the first user approaches the second user), the first user's wireless terminal (e.g., a social-interaction-module in the first user's wireless terminal) could ban people (or PID) updates on the first user's wireless terminal for some amount of time. In some embodiments, wireless terminals (e.g., a social-interaction-module in the first user's wireless terminal; a social-interaction-module in the second user's wireless terminal; etc.) may be able to detect whether they have approached (e.g., a topology-estimation-module in the first user's wireless terminal may first sense gradually increasing proximity to the second user's wireless terminal; next, the topology-estimation-module in the first user's wireless terminal may sense that the second user's wireless terminal is stationary for some period of time [e.g., 1-second, 10-seconds, etc.]; in this way, the topology-estimation-module in the first user's wireless terminal may enable it to detect the action of approaching the second user's wireless terminal) each other in recent times (e.g., 30-seconds, 60-seconds, etc.). In some embodiments, however, occasional beaconing (e.g., with the PID in the beacon-frames) could still happen on the first user's wireless terminal, and if a third user wants to meet the first user, the first user's wireless terminal (e.g., the social-interaction-module in the first user's wireless terminal) may allow that. In some embodiments, offender (e.g. the first user) initiated approaches may not be allowed (at least aided by offender's wireless terminal) till ban time has elapsed.

Some embodiments of the above invention may distract end-users in some environments.

Thus, in some embodiments, a wireless terminal may (e.g. after obtaining mobility data [e.g., by interrogating accelerometer, GPS, etc.]) disable (e.g., set a register or variable that gates social interaction in the social-interaction-module in the first wireless terminal) most such social interaction functionality when vehicular motion (e.g. vehicular motion at 60 km/hr) is detected (e.g. end-user could potentially be driving the vehicle while using the wireless terminal for social functionality). Special wireless terminals (such as those installed in a bus/train) fixed inside trains and buses may appear stationary to other wireless terminals being used by people. Presence (e.g., detected by a topology-estimation-module in a user's wireless terminal) of such relatively stationary wireless terminals may be used to detect motion of buses and trains. Social interaction functionality may be enabled in such situations for passengers when relatively stationary wireless terminals (e.g. the type installed in a bus/train) are detected using features of the above embodiment. Using features of the above embodiment, transport companies could block social interaction functionality for devices owned by drivers of trains and buses to mitigate distractions.

Figure 13:
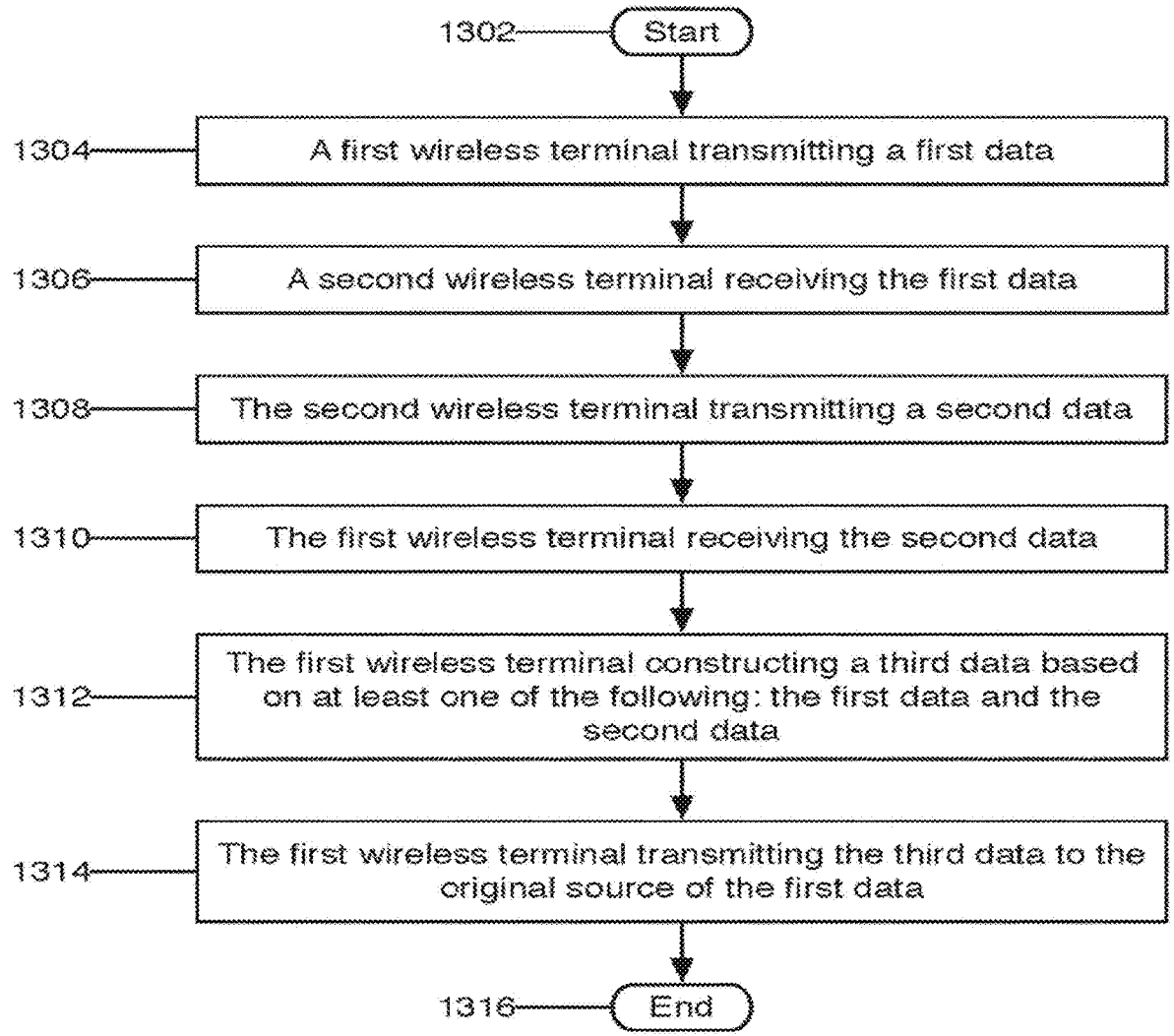
FIG. 13 is a flowchart of an example of a method for operating a wireless network in accordance with an embodiment of the present invention.

In another embodiment of the present invention, a method for improving the performance of a wireless network is provided. Overhead in networks having a shared medium and no centralized control can be a problem, and relatively large amounts of bandwidth can be consumed coordinating operation of the network participants. This problem is particularly acute in multi-hop networks, as the number of participants may be large relative to single-hop networks. FIG. 13 illustrates a method that, in some applications, reduces overhead. The method, in some embodiments, includes a first wireless terminal (e.g., a frame-reconstruction-module in the first wireless terminal) transmitting a first data (e.g. 1000-bytes in size, 1500-bytes in size). The method further includes a second wireless terminal receiving the first data. In addition, the method further includes the second wireless terminal transmitting a second data (e.g. MAC-layer ACK-frame). Furthermore, the method further includes the first wireless terminal (e.g., the frame-reconstruction-module in the first wireless terminal) receiving the second data. Additionally, the method further includes the first wireless terminal (e.g., the frame-reconstruction-module in the first wireless terminal) constructing a third data (e.g. TCP-layer ACK-frame) based on at least one of the following: the first data and the second data. Moreover, the method further includes the first wireless terminal (e.g., the frame-reconstruction-module in the first wireless terminal) transmitting the third data to the original source of the first data (e.g. the original source of the first data may be the first wireless terminal; the original source of the first data may be a server connected to the Internet that is reachable via the first wireless terminal; etc.). Moreover, the second data may be a medium-access-control (MAC) acknowledgement (ACK). Furthermore, the third data may be a transmission-control-protocol (TCP) acknowledgement (ACK).

FIG. 13 is a flowchart of a method for improving the performance of a wireless network in accordance with an embodiment of the present invention. In step 1304, a first wireless terminal transmits a first data. In step 1306, a second wireless terminal receives the first data. In step 1308, the second wireless terminal transmits a second data. In step 1310, the first wireless terminal receives the second data. In step 1312, the first wireless terminal constructs a third data based on at least one of the following: the first data and the second data. In step 1314, the first wireless terminal transmits the third data to the original source of the first data.

The above invention, in some embodiments, is expected to allow intelligent reconstruction of responses and reduce consumption of wireless network resources. It is expected to facilitate medium-access-control (MAC) acknowledgement (ACK) aided transmission-control-protocol (TCP) acknowledgment (ACK) reconstruction. This may help reduce network congestion, improve spectral efficiency, and increase total network throughput, though other applications are also envisioned. For example, a first wireless terminal (e.g., the frame-reconstruction-module in the first wireless terminal) may snoop (e.g., snooped frame-reconstruction-helper-values may be obtained by the frame-reconstruction-module in the first wireless terminal from a network-interface-card buffer; snooped frame-reconstruction-helper-values may then be stored by the frame-reconstruction-module in the first wireless terminal in an array in memory; etc.) frame-reconstruction-helper-values (e.g., a first IP-source-address; a first IP-destination-address; a first IP-total-length; a first TCP-source-port; a first TCP-destination-port; a first TCP-sequence-number; etc.) from the IP and TCP headers of an (encapsulated) TCP segment (e.g., the first wireless terminal obtains the TCP segment from an originator of the TCP segment [e.g. the originator of the TCP segment may be the first wireless terminal; the originator of the TCP segment may be a server connected to the Internet that is reachable via the first wireless terminal; etc.]; the encapsulated TCP segment is destined for a second wireless terminal; etc.) before wirelessly sending the TCP segment to the second wireless terminal. The first wireless terminal (e.g., the frame-reconstruction-module in the first wireless terminal) may then obtain the snooped frame-reconstruction-helper-values (e.g., snooped frame-reconstruction-helper-values may be stored by the frame-reconstruction-module in the first wireless terminal in an array in memory; snooped frame-reconstruction-helper-values may then be obtained by the frame-reconstruction-module in the first wireless terminal from the array in memory; etc.) and use the snooped frame-reconstruction-helper-values to reconstruct the corresponding (e.g., the (encapsulated) TCP ACK that the second wireless terminal may have sent back [in some embodiments] to the first wireless terminal) TCP ACK (e.g., by using the first IP-source-address as the IP-destination-address in the IP-header of the corresponding TCP ACK; by using the first IP-destination-address as the IP-source-address in the IP-header of the corresponding TCP ACK; by using the first TCP-source-port as the TCP-destination-port in the TCP-header of the corresponding TCP ACK; by using the first TCP-destination-port as the TCP-source-port in the TCP-header of the corresponding TCP ACK; etc.). In some embodiments, if the first wireless terminal receives the MAC ACK for the (encapsulated) TCP segment from the second wireless terminal, the first wireless terminal (e.g., the frame-reconstruction-module in the first wireless terminal) may send the reconstructed TCP ACK to the originator of the TCP segment (e.g. the originator of the TCP segment may be the first wireless terminal; the originator of the TCP segment may be a server connected to the Internet that is reachable via the first wireless terminal; etc.). Moreover, the second wireless terminal (e.g., a frame-suppression-module in the second wireless terminal) may refrain from sending the TCP ACK because of (in response to) the TCP ACK reconstruction service provided by the first wireless device. This refraining (e.g., by the frame-suppression-module in the second wireless terminal) may save network bandwidth and improve total network throughput because the TCP ACK does not need to be transmitted over the wireless spectrum. The gains are expected to become bigger in a multi-hop wireless network setting wherein there are other intermediate relay wireless terminals between the first wireless terminal and the second wireless terminal. In such a multi-hop setting, TCP ACK reconstruction may save transmission of TCP ACKs at each of the relay wireless terminals as well. The first wireless terminal may also request the original source of the first data for assistance (e.g. request original source of the first data to place pertinent IP and TCP information in an unencrypted location within the frame containing the first data; etc.). This may be useful, in some systems, for TCP ACK reconstruction and calculation of checksums. In particular, it could be useful in cellular networks because TCP and IP headers may often be encrypted along with the rest of the data payload using SIM cards and other secure keys. Moreover, it could be useful for IPsec tunneling and other protocols that encrypt the TCP and IP headers and affect TCP ACK reconstruction by intermediate nodes.

In another embodiment of the present invention, H-antennas may use the magnetic portion of the electromagnetic waves to modulate and demodulate information (e.g., bits of data, bytes of data, etc.) onto wireless-signals. In some embodiments, H-antennas may often see path loss exponents of 6 or more and this may be useful for multi-hop wireless networks (e.g., to facilitate aggressive spatial reuse). In some embodiments, H-antennas may be surface-mounted on walls of buildings using several mechanisms (e.g., mixing several small-size H-antennas with wall-paint and then applying a coat of the wall-paint on a wall). In some embodiments, H-antennas may be non-uniformly applied on walls of buildings (e.g., resulting in multi-hop wireless routes of varying reliability) and may increase reliability (e.g., of multi-hop wireless routes) by applying special techniques (e.g., crowdsourcing, network-coding, etc.). In some embodiments, H-antennas may consist of special materials (e.g., ferroelectric materials, pyroelectric materials, etc.) to facilitate operation in civilian settings (e.g., on a wall of a building).

In another embodiment of the present invention, a method for improving the performance of a wireless network is provided. The method, in some embodiments, includes a first wireless terminal transmitting a first data. In addition, the method further includes a second wireless terminal transmitting a second data at a first power level while (e.g., simultaneously) receiving the first data. Furthermore, the method further includes the second wireless terminal mitigating the effects of transmitting the second data to decode the first data.

In the above embodiment, the second wireless terminal may transmit the second data at the first power level while receiving the first data based on at least one of the following: the second data is predetermined (e.g., predetermined to the second wireless device); the second data depends on the first data (e.g., on the physical-layer rate of the first data; on the signal-to-interference-and-noise-ratio when receiving the first data at the second wireless device); the first power level is predetermined (e.g., predetermined to the second wireless device); the first power level is based on one or more signal-to-interference-and-noise-ratios (e.g., on the signal-to-interference-and-noise-ratio when receiving the first data at the second wireless device); and the first power level is based on the physical-layer rate (e.g., modulation scheme, coding scheme, number of spatial streams, bandwidth of spectrum used, etc.) of the first data.

In the above embodiment, the second wireless terminal may mitigate the effects of transmitting the second data to decode the first data based on at least one of the following: the second wireless terminal also transmits a third data that may be dependent on the first data (e.g., on the analog waveform corresponding to the first data; on the digital samples corresponding to the first data; etc.) and/or the second data (e.g., on the analog waveform corresponding to the second data; on the digital samples corresponding to the second data; etc.); the second wireless terminal mathematically removes (e.g., by subtracting the digital samples corresponding to the second data from the digital samples corresponding to the sum of the first data and the second data) the effects of transmitting the second data to decode the first data; and the second wireless terminal algorithmically removes (e.g., by applying a filter that exploits the structure of the predetermined second data to isolate the first data from the second data) the effects of transmitting the second data to decode the first data.

In the above embodiment, the second data may indicate (e.g., explicitly indicate via the contents of the second data; implicitly indicate via the physical-layer rate of the second data; implicitly indicate via the power-level of the second data; etc.) at least one of the following to the first wireless terminal: the signal-to-interference-and-noise-ratio at the second wireless terminal (e.g., when receiving the first data); information about the first data (e.g., the signal-to-interference-and-noise-ratio when receiving the first data at the second wireless terminal); and information about the decoding of the first data (e.g., decoding of the first data 100% successful; decoding of the first data 50% successful; decoding of a first fragment of the first data successful; decoding of a second fragment of the first data unsuccessful; etc.) at the second wireless terminal.

In the above embodiment, the second data may indicate (e.g., explicitly indicate via the contents of the second data; implicitly indicate via the physical-layer rate of the second data; implicitly indicate via the power-level of the second data; etc.) at least one of the following to a third wireless terminal: the signal-to-interference-and-noise-ratio at the second wireless terminal (e.g., when receiving the first data); information about the first data (e.g., the signal-to-interference-and-noise-ratio when receiving the first data at the second wireless terminal); and information about the decoding of the first data (e.g., decoding of the first data 100% successful; decoding of the first data 50% successful; decoding of a first fragment of the first data successful; decoding of a second fragment of the first data unsuccessful; etc.) at the second wireless terminal.

Figure 14:
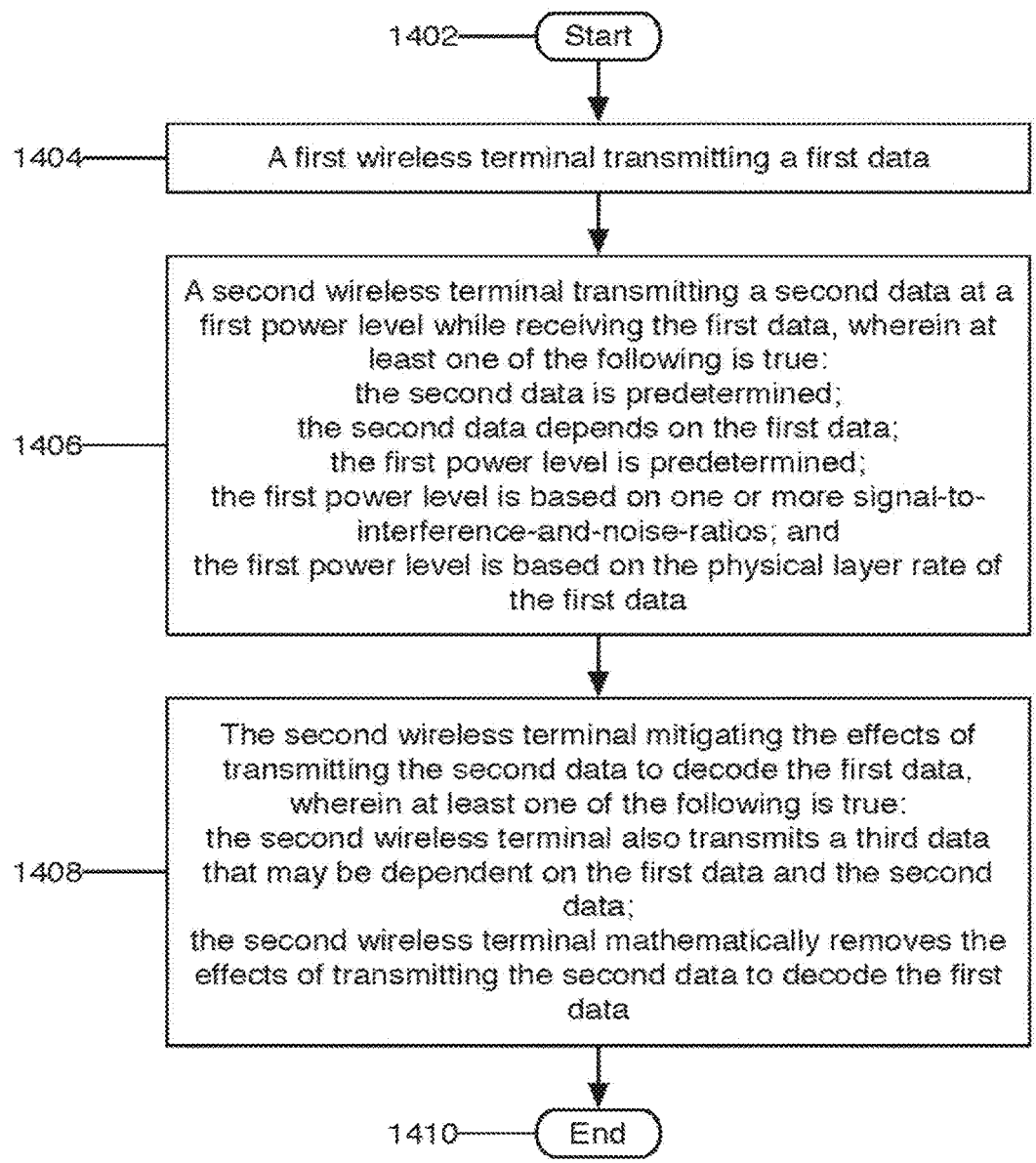
FIG. 14 is a flowchart of an example of a method for operating a wireless network in accordance with an embodiment of the present invention.

FIG. 14 is a flowchart of a method for improving the performance of a wireless network in accordance with an embodiment of the present invention. In step 1404, in this embodiment, a first wireless terminal transmits a first data. In step 1406, a second wireless terminal transmits a second data at a first power level while receiving the first data, based on least one of the following: the second data is predetermined (e.g., predetermined to the second wireless device); the second data depends on the first data (e.g., on the physical-layer rate of the first data; on the signal-to-interference-and-noise-ratio when receiving the first data at the second wireless device); the first power level is predetermined (e.g., predetermined to the second wireless device); the first power level is based on one or more signal-to-interference-and-noise-ratios (e.g., on the signal-to-interference-and-noise-ratio when receiving the first data at the second wireless device); and the first power level is based on the physical-layer rate (e.g., modulation scheme, coding scheme, number of spatial streams, bandwidth of spectrum used, etc.) of the first data. In step 1408, the second wireless terminal mitigates the effects of transmitting the second data to decode the first data, based on at least one of the following: the second wireless terminal also transmits a third data that may be dependent on the first data (e.g., on the analog waveform corresponding to the first data; on the digital samples corresponding to the first data; etc.) and/or the second data (e.g., on the analog waveform corresponding to the second data; on the digital samples corresponding to the second data; etc.); the second wireless terminal mathematically removes (e.g., by subtracting the digital samples corresponding to the second data from the digital samples corresponding to the sum of the first data and the second data) the effects of transmitting the second data to decode the first data; and the second wireless terminal algorithmically removes (e.g., by applying a filter that exploits the structure of the predetermined second data to isolate the first data from the second data) the effects of transmitting the second data to decode the first data.

In one example scenario, a transmitter is transmitting frames to a receiver. In this example, the above embodiment may be used by the receiver to transmit a protection signal as soon as it starts receiving an RTS-like frame or data frame from the transmitter. Such a protection signal (e.g., a frame encoding a command to other devices to stop transmitting; a wireless signal encoding a command to other devices to stop transmitting; etc.) may prevent other nodes in the vicinity of the receiver from transmitting and causing interference for the receiver. A pre-calculated signal may be used and may readily be subtracted from what is received from the desired transmitter. Signal strength of protection signal may be selected (e.g., by a protection-signal-generator-module in a wireless device) based on absolute transmit power levels of beacons, received power of beacons from the transmitter and other nodes, topology of nearby nodes, physical-layer rate being used by the transmitter, estimated SINR at the receiver, signal strength and quality at which RTS and/or data frames are received from the transmitter, and estimates of path-losses to nearby nodes and the transmitter. Physical-layer rates are selected based on combinations of antenna configurations, spectrum allocations, spatial streams, modulations, and coding schemes. The receiver may use a different IFS value to transmit wireless communication signaling to nearby nodes to indicate the physical-layer rate being used by the transmitter (and thus the rate that the receiver will have to decode). Potential interferers may respond by determining whether to transmit (and interfere with the receiver) based on the protection signal and other wireless communication signaling. This could be considered as an intelligent way to do carrier sensing. Instead of having on-off scheduling, in some embodiments, wireless nodes may make multi-dimensional decisions based on several factors, such as topology, activity, schedules, needs, traffic patterns, and physical-layer rates being used by other wireless nodes.

Although the method, wireless device and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A method of relaying data on a multi-hop network, the method comprising:
receiving one or more parameters for determining a set of potential nodes for relaying data based on at least signal quality of communications channels associated with the set of potential nodes;
relaying, with at least a first node of a plurality of nodes, data between a cellular base station and a second node, wherein the first node communicates with the cellular base station with at least a first wireless communications channel, and the first node communicates with the second node with a second wireless communications channel;
relaying, with the second node, data between the first node and one or more cellular devices, wherein the second node communicates with the one or more cellular devices with a third wireless communications channel such that the one or more cellular devices are in communication with the cellular base station by way of at least the first, second, and third wireless communications channels;
obtaining a channel measurement associated with the second wireless communications channel;
connecting the second node to a third node in a multi-hop network based at least on the channel measurement associated with the second wireless communications channel; and
relaying, with the third node, data between the second node and the cellular base station, wherein the third node communicates with the second node with at least a fourth wireless communications channel, wherein the third node communicates with the cellular base station with at least a fifth wireless communications channel, and wherein the one or more cellular devices are in communication with the cellular base station by way of at least the third, fourth, and fifth wireless communications channels after said connecting the second node to the third node.

2. The method of claim 1, wherein the third node relays data between the second node and a fourth node, wherein the third node communicates with the fourth node with at least a sixth wireless communications channel.

3. The method of claim 1, wherein the first wireless communications channel is in communication with another node.

4. The method of claim 1, wherein the channel measurement comprises at least one of the group consisting of: channel quality of the second wireless communications channel, a signal to noise ratio of the second wireless communications channel, and a receive signal strength indication of the second wireless communications channel.

5. The method of claim 1, further comprising storing routing information associated with the first node in the second node.

6. The method of claim 1, further comprising storing routing information associated with the second node in the first node.

7. The method of claim 1, further comprising storing routing information associated with the second node in the third node.

8. The method of claim 1, further comprising storing routing information associated with the third node in the second node.

9. The method of claim 1, further comprising determining rate of transmission of data packets associated with the data relayed by the second node.

10. The method of claim 1, further comprising determining one or more transmission time slots for data packets associated with the data relayed by the second node.

11. The method of claim 1, further comprising:
encrypting the data with a security key based on a cellular-security identifier associated with a first cellular device of the one or more cellular devices to create encrypted data; and
at least one of the group consisting of:
transmitting the encrypted data from at least one of the plurality of nodes to at least another node;
transmitting the encrypted data from at least one of the plurality of nodes to at least the cellular base station;
transmitting the encrypted data from the cellular base station to at least one of the plurality of nodes;
transmitting the encrypted data from the first cellular device to at least one of the plurality of nodes; and
transmitting the encrypted data from at least one of the plurality of nodes to the first cellular device.

12. The method of claim 1, further comprising:
encrypting the data with a security key based on a cellular-security identifier associated with the second node to create encrypted data; and
at least one of the group consisting of:
transmitting the encrypted data from at least one of the plurality of nodes to at least another node;
transmitting the encrypted data from at least one of the plurality of nodes to at least the cellular base station; and
transmitting the encrypted data from the cellular base station to at least one of the plurality of nodes.

13. An apparatus that relays data on a multi-hop network, the apparatus comprising:
a plurality of nodes comprising at least first, second and third nodes in a multi-hop network;

the first node relays data between a cellular base station and a second node, wherein the first node communicates with the cellular base station with at least a first wireless communications channel, and the first node communicates with the second node with a second wireless communications channel;

the second node relays data between the first node and one or more cellular devices, wherein the second node communicates with the one or more cellular devices with a third wireless communications channel such that the one or more cellular devices are in communication with the cellular base station by way of at least the first, second, and third wireless communications channels when the second node relays data between the first node and the one or more cellular devices; and a module executing on one or more computer processors that receives one or more parameters for determining a set of potential nodes for relaying data based on at least signal quality of communications channels associated with the set of potential nodes, obtains a channel measurement associated with the second wireless communications channel, and directs the second node to connect to the third node in the multi-hop network based at least on the channel measurement, wherein the third node relays data between the second node and the cellular base station, wherein the third node communicates with the second node with at least a fourth wireless communications channel, and wherein the third node communicates with the cellular base station with at least a fifth wireless communications channel, and wherein the one or more cellular devices are in communication with the cellular base station by way of at least the third, fourth, and fifth wireless communications channels after the module directs the second node to connect to the third node.

14. The apparatus of claim 13, further comprising:
a first cellular device of the one or more cellular devices configured to encrypt the data with a security key based on a cellular-security identifier associated with the first cellular device to create encrypted data; and
at least one of the group consisting of:
  at least one of the plurality of nodes configured to transmit the encrypted data to at least another node;
  at least one of the plurality of nodes configured to transmit the encrypted data to at least the cellular base station;
  the cellular base station configured to transmit the encrypted data to at least one of the plurality of nodes;
  the first cellular device configured to transmit encrypted data to at least one of the plurality of nodes; and
  at least one of the plurality of nodes configured to transmit the encrypted data to the first cellular device.

15. The apparatus of claim 13, wherein the third node relays data between the second node and a fourth node, wherein the third node communicates with the fourth node with at least a sixth wireless communications channel.

16. The apparatus of claim 13, wherein the first wireless communications channel is in communication with another node.

17. The apparatus of claim 13, wherein channel measurement comprises at least one of the group consisting of: channel quality of the second wireless communications channel, a signal to noise ratio of the second wireless communications channel, and a receive signal strength indication of the second wireless communications channel.

18. The apparatus of claim 13, wherein the module directs storage of routing information associated with the first node in the second node.

19. The apparatus of claim 13, wherein the module directs storage of routing information associated with the second node in the first node.

20. The apparatus of claim 13, wherein routing information associated with the second node is stored in the third node.

21. The apparatus of claim 13, wherein routing information associated with the third node is stored in the second node.

22. The apparatus of claim 13, wherein the module determines a rate of transmission of data packets associated with the data relayed by the second node.

23. The apparatus of claim 13, wherein the module determines one or more transmission time slots for data packets associated with the data relayed by the second node.

24. The apparatus of claim 13, further comprising:
one or more computer processors that encrypt the data with a security key based on a cellular-security identifier associated with the second node to create encrypted data; and
at least one of the group consisting of:
  at least one of the plurality of nodes configured to transmit the encrypted data to at least another node;
  at least one of the plurality of nodes configured to transmit the encrypted data to at least the cellular base station; and
  at least the cellular base station configured to transmit the encrypted data to at least one of the plurality of nodes.

* * * * *